United States Patent
Moriya et al.

(10) Patent No.: US 7,889,216 B2
(45) Date of Patent: *Feb. 15, 2011

(54) IMAGE DISPLAY DEVICE, ELECTRONIC APPARATUS, AND PIXEL LOCATION DETERMINING METHOD

(75) Inventors: Hidekuni Moriya, Suwa (JP); Takumi Aragaki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 1071 days.

This patent is subject to a terminal disclaimer.

(21) Appl. No.: 11/537,939

(22) Filed: Oct. 2, 2006

(65) Prior Publication Data

US 2007/0103491 A1    May 10, 2007

(30) Foreign Application Priority Data

| Oct. 13, 2005 | (JP) | ............................ 2005-298803 |
| Oct. 18, 2005 | (JP) | ............................ 2005-303431 |
| Feb. 24, 2006 | (JP) | ............................ 2006-047875 |
| Mar. 6, 2006  | (JP) | ............................ 2006-060144 |

(51) Int. Cl.
G09G 5/02 (2006.01)

(52) U.S. Cl. ........................................ 345/694; 345/88
(58) Field of Classification Search .................. 345/87, 345/88, 89, 204, 690
See application file for complete search history.

(56) References Cited

U.S. PATENT DOCUMENTS

| 4,754,323 | A  | * | 6/1988  | Kaji et al. ..................... 348/256 |
| 4,929,061 | A  | * | 5/1990  | Tominaga et al. ............. 349/70 |
| 6,888,604 | B2 |   | 5/2005  | Rho et al. |
| 6,989,876 | B2 |   | 1/2006  | Song et al. |
| 2005/0117092 | A1 | | 6/2005 | Park et al. |
| 2005/0140907 | A1 | | 6/2005 | Yun |

(Continued)

FOREIGN PATENT DOCUMENTS

JP    A-2001-306023    11/2001

(Continued)

OTHER PUBLICATIONS

Zhang et al.; "A Spatial Extension of CIELAB for Digital Color Image Production;" Stanford University.

(Continued)

*Primary Examiner*—Stephen G Sherman
(74) *Attorney, Agent, or Firm*—Oliff & Berridge, PLC

(57) ABSTRACT

An image display device displays an image by using a plurality of display pixels, each display pixel including four sub-pixels corresponding to different colors. The four sub-pixels forming each of the display pixels are located such that two sub-pixels having a smaller level of luminance are located at edges of the display pixel, each of the two sub-pixels being located at either edge of the display pixel, and such that two other sub-pixels are located at a central portion of the display pixel so that an absolute value of a difference between a luminance added value, which is a value obtained by adding luminance levels of one of the sub-pixels located at the edges of the display pixel and an adjacent pixel, and a luminance added value, which is a value obtained by adding luminance levels of the other sub-pixel located at the edge of the display pixel and an adjacent pixel, is reduced.

10 Claims, 49 Drawing Sheets

U.S. PATENT DOCUMENTS

| | | | |
|---|---|---|---|
| 2005/0162600 A1 | 7/2005 | Rho et al. | |
| 2005/0236950 A1* | 10/2005 | Maeda et al. | 313/112 |
| 2005/0253795 A1* | 11/2005 | Moriya et al. | 345/88 |
| 2007/0085863 A1* | 4/2007 | Moriya et al. | 345/694 |
| 2007/0091043 A1 | 4/2007 | Rho et al. | |
| 2007/0257944 A1* | 11/2007 | Miller et al. | 345/694 |
| 2007/0268208 A1 | 11/2007 | Okada et al. | |

FOREIGN PATENT DOCUMENTS

| | | |
|---|---|---|
| JP | A-2004-078218 | 3/2004 |
| JP | A-2004-152737 | 5/2004 |
| WO | WO 2006/018926 A1 | 2/2006 |

OTHER PUBLICATIONS

M. Kanazawa et al.; "Color Error from RGB-Stripe Pixel Structure;" IS&T/SID Tenth Color Imaging Science & Technical Research Laboratories; pp. 261-266.

* cited by examiner

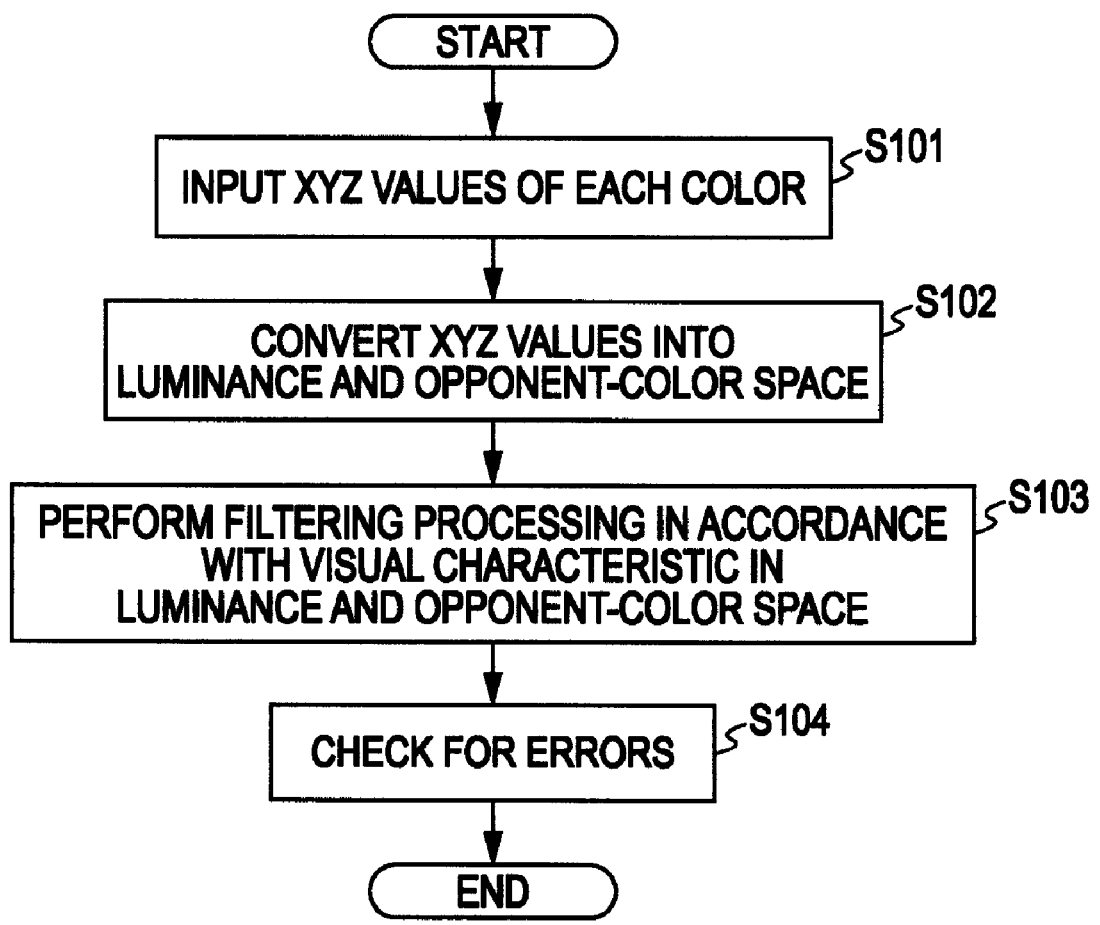

R G B C

R G C B

R B G C

R B C G

R C G B

R C B G

G R B C

G R C B

G B R C

G C R B

B R G C

B G R C

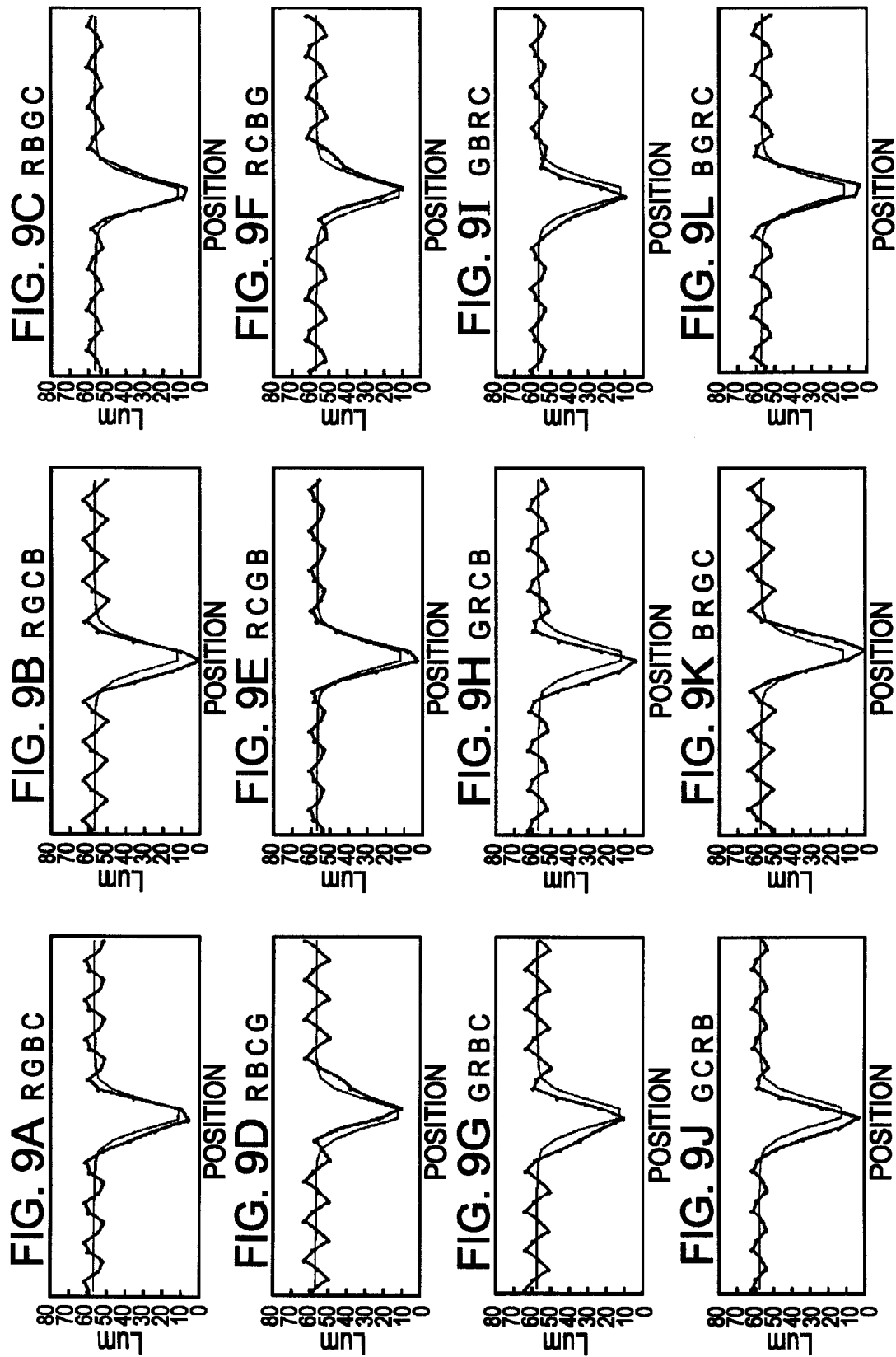

FIG. 10A

| COLOR | Lum | R/Y | B/Y |
|---|---|---|---|
| Red | 0.27 | −0.10 | −0.09 |
| Green | 0.59 | 0.03 | −0.35 |
| Blue | 0.01 | 0.02 | 0.51 |
| Cyan | 0.14 | 0.04 | −0.07 |

FIG. 10B

| FIRST COLOR | SECOND COLOR | FIRST COLOR Lum | SECOND COLOR Lum | LUMINANCE ADDED VALUE |
|---|---|---|---|---|
| R | G | 0.27 | 0.59 | 0.86 |
| R | B | 0.27 | 0.01 | 0.28 |
| R | C | 0.27 | 0.14 | 0.41 |
| G | B | 0.59 | 0.01 | 0.60 |
| G | C | 0.59 | 0.14 | 0.73 |
| B | C | 0.01 | 0.14 | 0.15 |

FIG. 10C

| LEFT SET | RIGHT SET | LUMINANCE ADDED VALUE | LUMINANCE ADDED VALUE | ABSOLUTE VALUE OF DIFFERENCE |
|---|---|---|---|---|
| B(R) | (G)C | 0.28 | 0.73 | 0.45 |
| B(G) | (R)C | 0.60 | 0.41 | 0.19 |

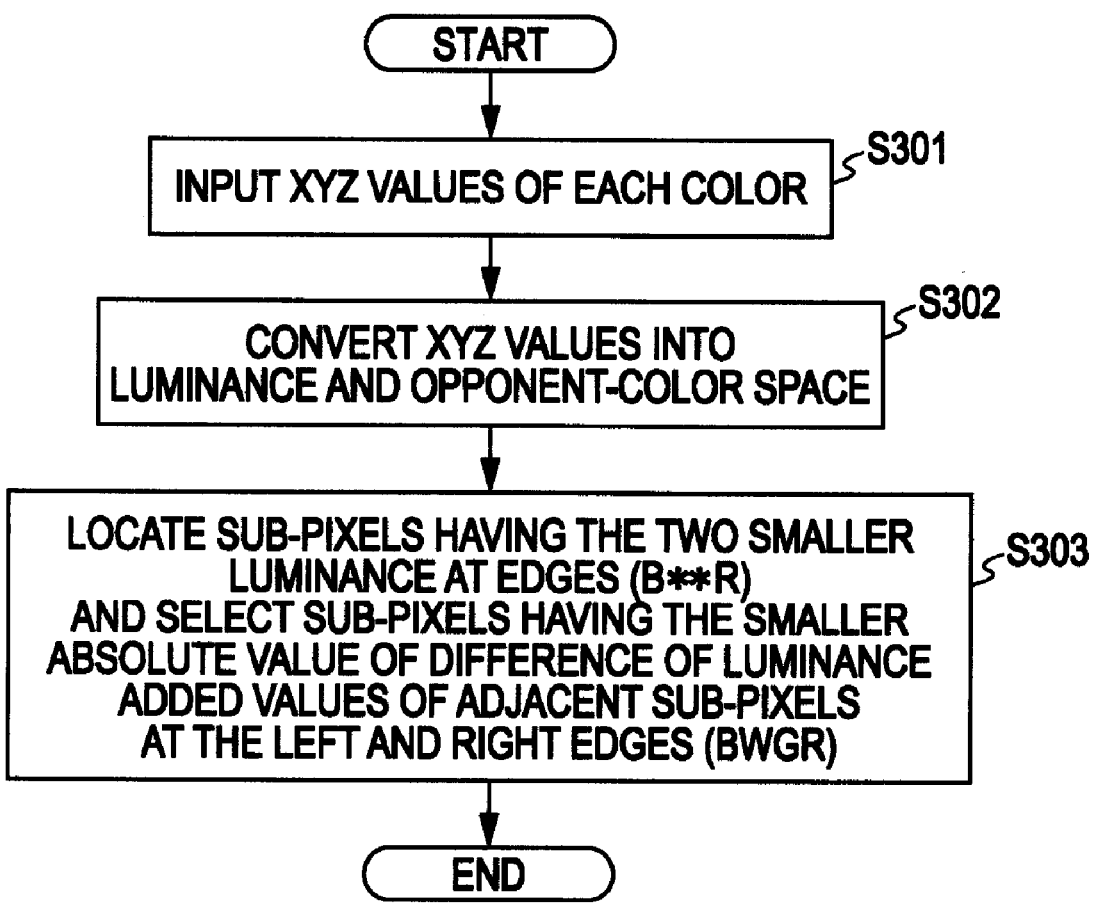

FIG. 14A

| COLOR | Lum | R/G | B/Y |
|---|---|---|---|
| Red | 0.15 | −0.05 | −0.06 |
| Green | 0.26 | 0.04 | −0.15 |
| Blue | 0.01 | 0.02 | 0.22 |
| White | 0.58 | −0.01 | −0.01 |

FIG. 14B

| FIRST COLOR | SECOND COLOR | FIRST COLOR Lum | SECOND COLOR Lum | LUMINANCE ADDED VALUE |
|---|---|---|---|---|
| R | G | 0.15 | 0.26 | 0.41 |
| R | B | 0.15 | 0.01 | 0.16 |
| R | W | 0.15 | 0.58 | 0.73 |
| G | B | 0.26 | 0.01 | 0.27 |
| G | W | 0.26 | 0.58 | 0.84 |
| B | W | 0.01 | 0.58 | 0.59 |

FIG. 14C

| LEFT SET | RIGHT SET | LUMINANCE ADDED VALUE | LUMINANCE ADDED VALUE | ABSOLUTE VALUE OF DIFFERENCE |
|---|---|---|---|---|
| B(G) | (W)R | 0.27 | 0.73 | 0.46 |
| B(W) | (G)R | 0.59 | 0.41 | 0.18 |

RGBW

R G B W

RGWB

RBGW

RBWG

RWGB

RWBG

GRBW

GRWB

GBRW

GWRB

BRGW

BGRW

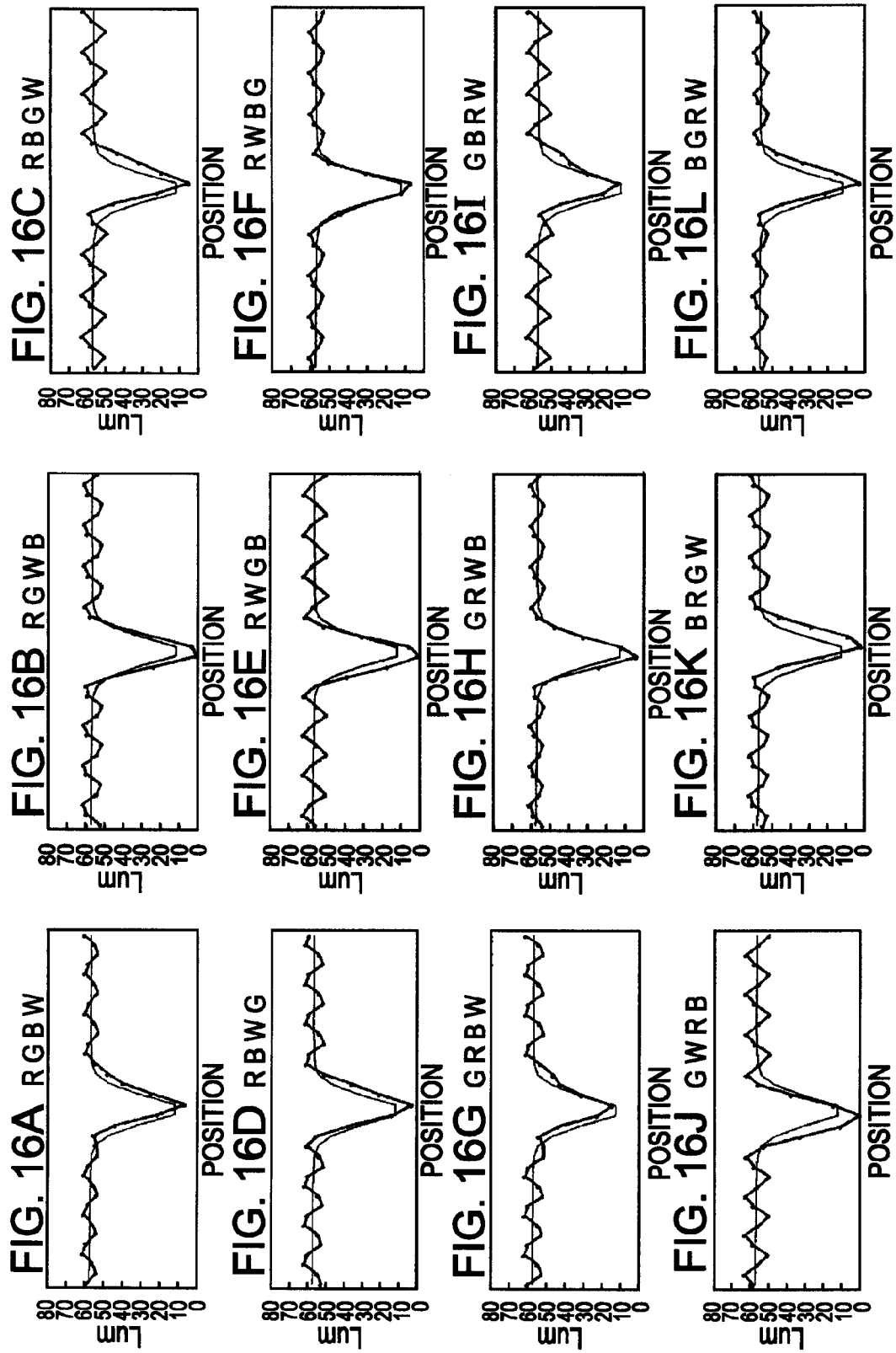

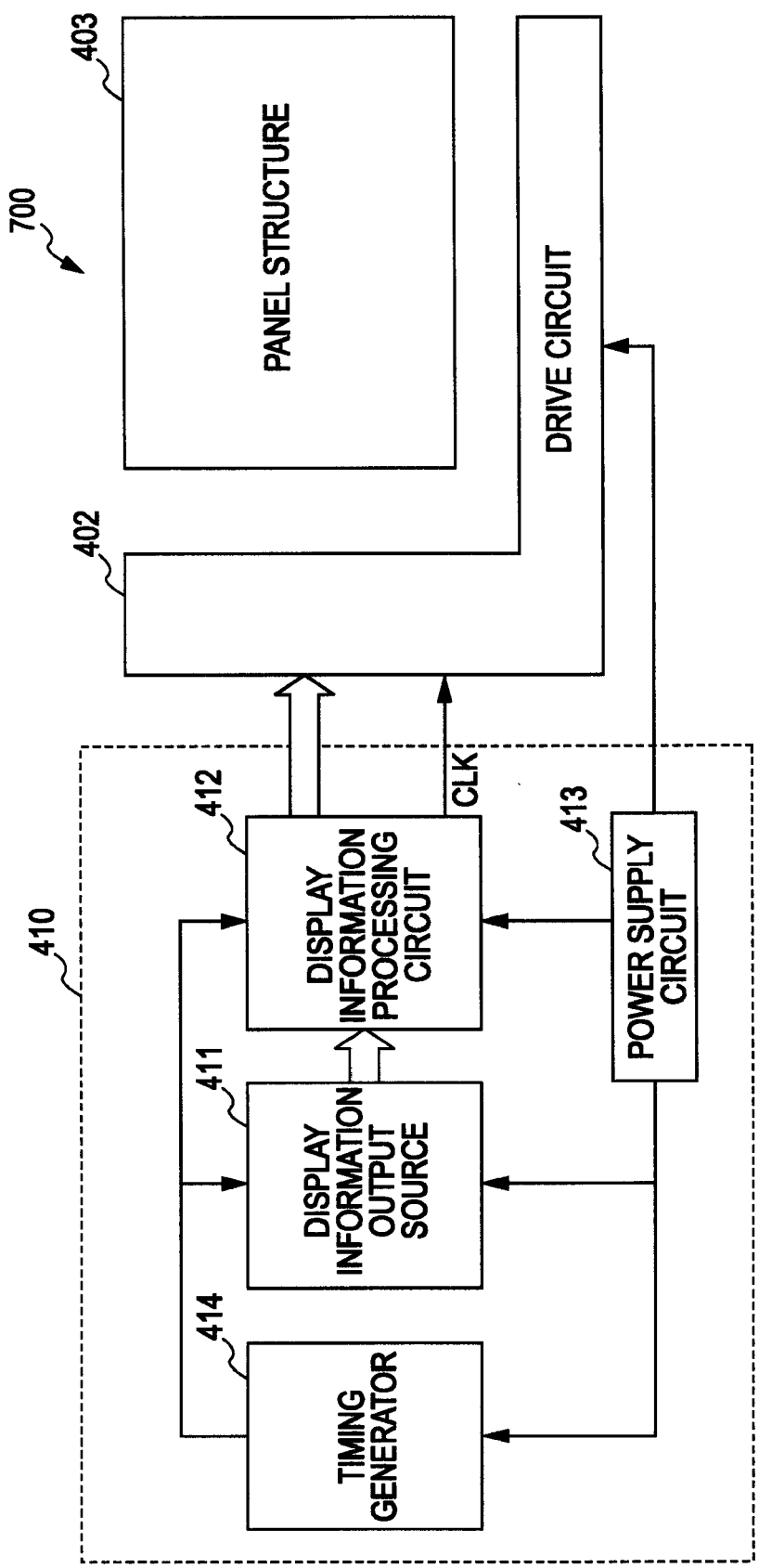

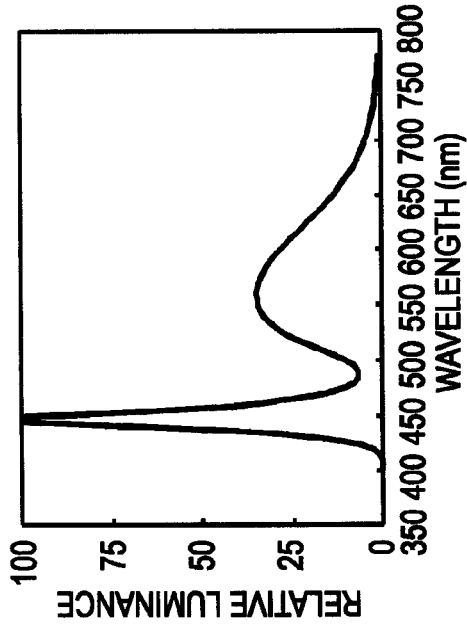
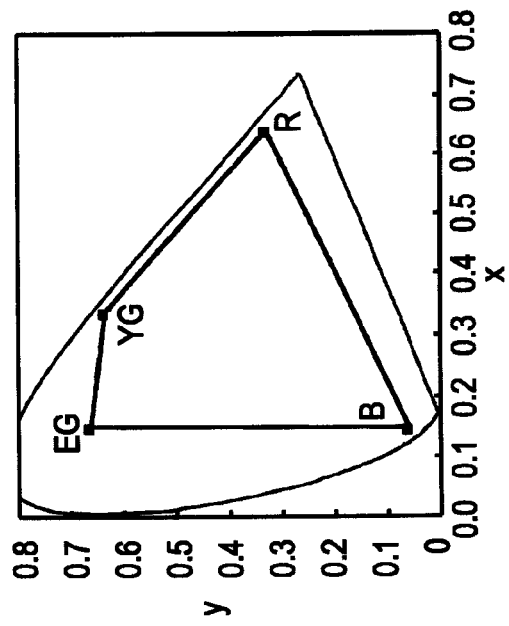
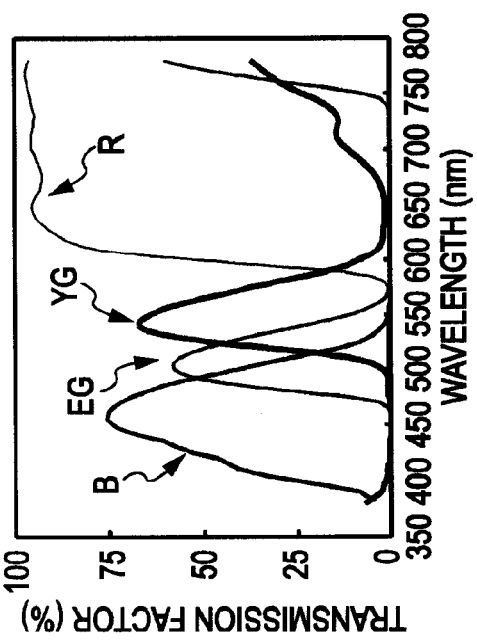
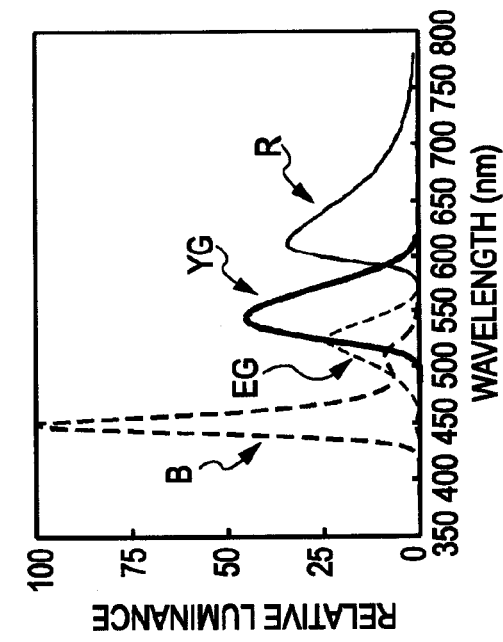

FIG. 25A

| COLOR | Lum | R/G | B/Y |
|---|---|---|---|
| R | 0.2422 | −0.11 | −0.07 |
| YG | 0.4838 | 0.01 | −0.28 |
| B | 0.0002 | 0.01 | 0.47 |
| EG | 0.1424 | 0.03 | −0.08 |

FIG. 25B

| FIRST COLOR | SECOND COLOR | FIRST COLOR Lum | SECOND COLOR Lum | LUMINANCE ADDED VALUE |
|---|---|---|---|---|
| R | YG | 0.24 | 0.48 | 0.726 |
| R | B | 0.24 | 0.00 | 0.242 |
| R | EG | 0.24 | 0.14 | 0.385 |
| YG | B | 0.48 | 0.00 | 0.484 |
| YG | EG | 0.48 | 0.14 | 0.626 |
| B | EG | 0.00 | 0.14 | 0.143 |

FIG. 25C

| LEFT SET | RIGHT SET | LUMINANCE ADDED VALUE | LUMINANCE ADDED VALUE | ABSOLUTE VALUE OF DIFFERENCE |
|---|---|---|---|---|
| B(R) | (YG)EG | 0.242 | 0.626 | 0.384 |
| B(YG) | (R)EG | 0.484 | 0.385 | 0.099 |

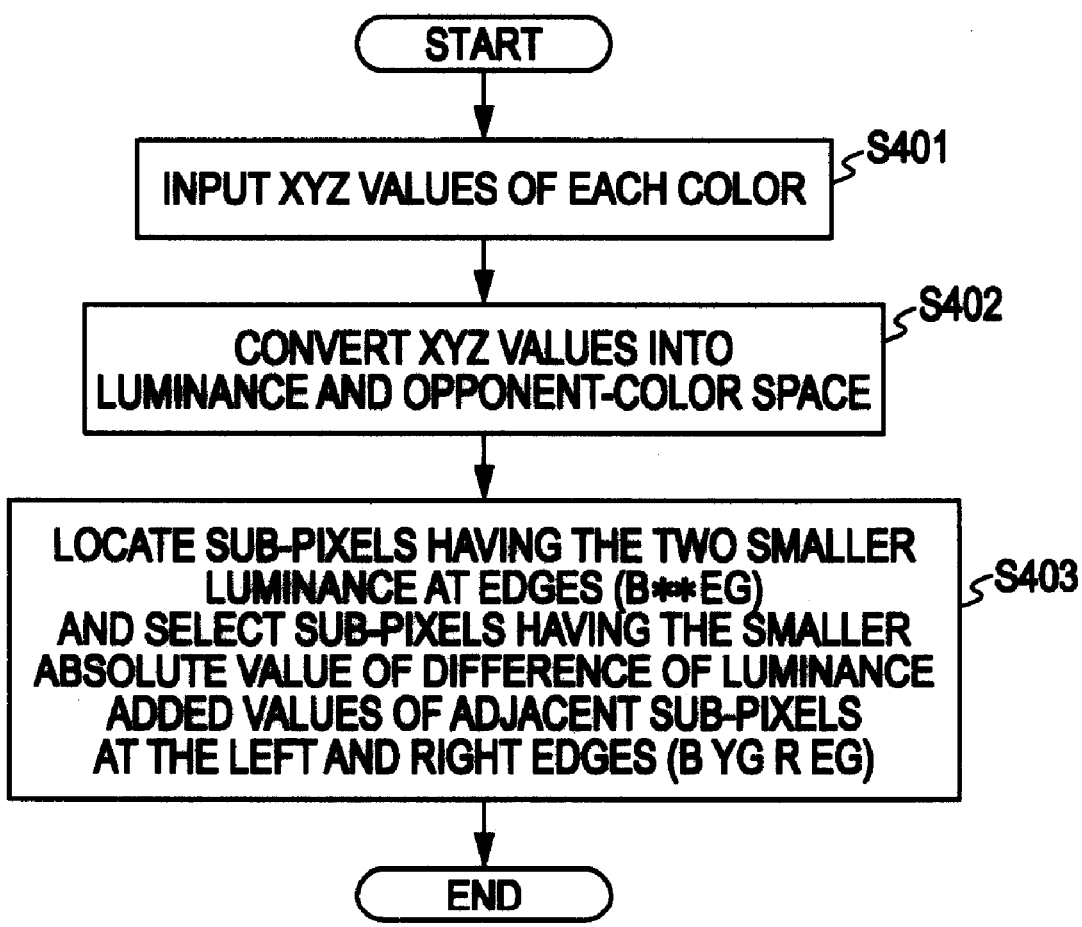

FIG. 28A

| COLOR | Lum | R/G | B/Y |
|---|---|---|---|
| R | 0.2422 | −0.11 | −0.07 |
| YG | 0.5197 | 0.02 | −0.30 |
| B | 0.0000 | 0.01 | 0.47 |
| EG | 0.1119 | 0.03 | −0.06 |

FIG. 28B

| FIRST COLOR | SECOND COLOR | FIRST COLOR Lum | SECOND COLOR Lum | LUMINANCE ADDED VALUE |
|---|---|---|---|---|
| R | YG | 0.24 | 0.52 | 0.762 |
| R | B | 0.24 | 0.00 | 0.242 |
| R | EG | 0.24 | 0.11 | 0.354 |
| YG | B | 0.52 | 0.00 | 0.520 |
| YG | EG | 0.52 | 0.11 | 0.632 |
| B | EG | 0.00 | 0.11 | 0.112 |

FIG. 28C

| LEFT SET | RIGHT SET | LUMINANCE ADDED VALUE | LUMINANCE ADDED VALUE | ABSOLUTE VALUE OF DIFFERENCE |
|---|---|---|---|---|
| B(R) | (YG)EG | 0.242 | 0.632 | 0.389 |
| B(YG) | (R)EG | 0.520 | 0.354 | 0.166 |

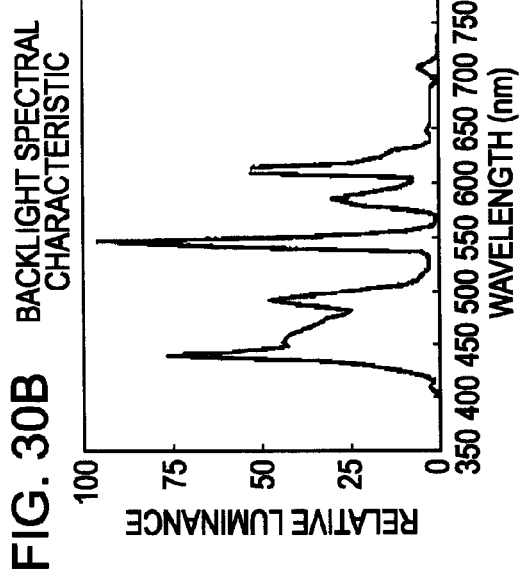
FIG. 30B BACKLIGHT SPECTRAL CHARACTERISTIC
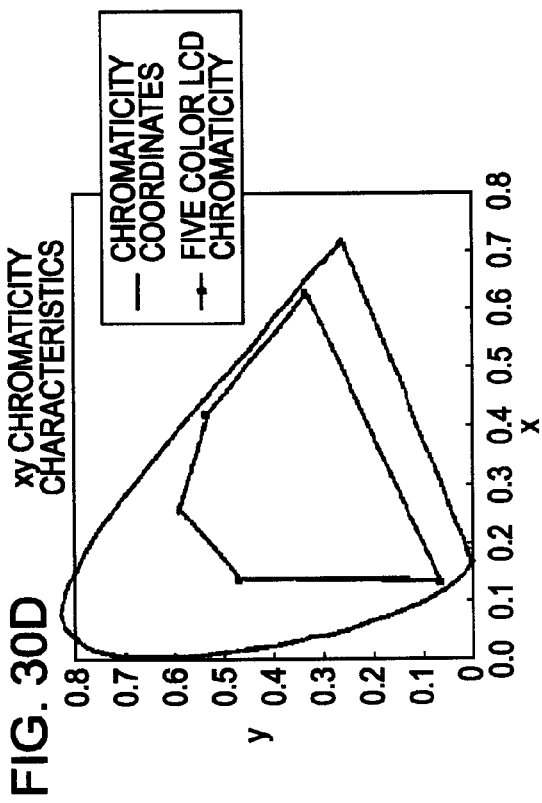
FIG. 30D xy CHROMATICITY CHARACTERISTICS
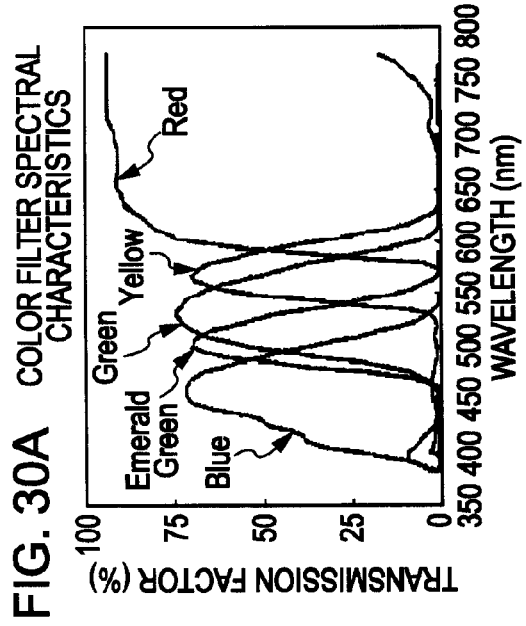
FIG. 30A COLOR FILTER SPECTRAL CHARACTERISTICS
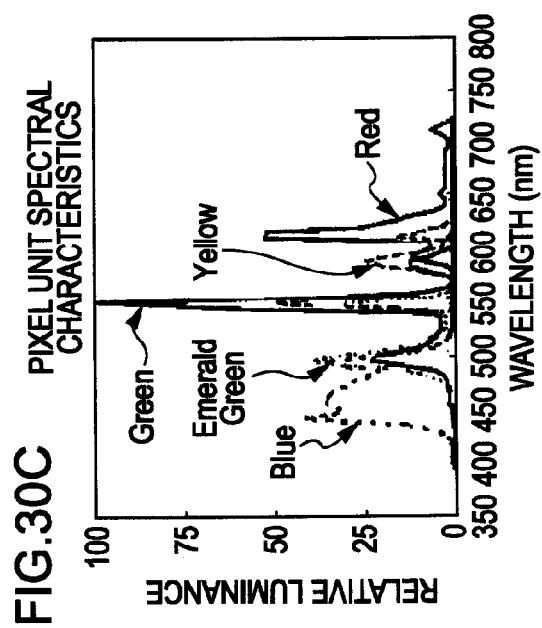
FIG. 30C PIXEL UNIT SPECTRAL CHARACTERISTICS

FIG. 36A

LUMINANCE AND OPPONENT-COLOR SPACE COMPONENTS

| COLOR | Lum | R/G | B/Y |
|---|---|---|---|
| Red | 0.26 | −0.09 | −0.09 |
| Green | 0.35 | 0.05 | −0.18 |
| Blue | 0.01 | 0.02 | 0.45 |
| Emerald Green | 0.11 | 0.04 | −0.01 |
| Yellow | 0.30 | −0.02 | −0.16 |

FIG. 36B

TWO-COLOR LUMINANCE ADDED VALUE

| FIRST COLOR | SECOND COLOR | FIRST COLOR Lum | SECOND COLOR Lum | LUMINANCE ADDED VALUE |
|---|---|---|---|---|
| R | Y | 0.01 | 0.30 | 0.31 |
| R | R | 0.01 | 0.26 | 0.29 |
| EG | Y | 0.11 | 0.30 | 0.41 |
| EG | R | 0.11 | 0.26 | 0.37 |
| . | . | . | . | . |
| . | . | . | . | . |

FIG. 36C

ABSOLUTE VALUE OF DIFFERENCE OF LUMINANCE ADDED VALUES

| LEFT SET | RIGHT SET | LUMINANCE ADDED VALUE | LUMINANCE ADDED VALUE | ABSOLUTE VALUE OF DIFFERENCE |
|---|---|---|---|---|
| B(Y) | (R)EG | 0.31 | 0.37 | 0.06 |
| B(R) | (Y)EG | 0.29 | 0.41 | 0.12 |

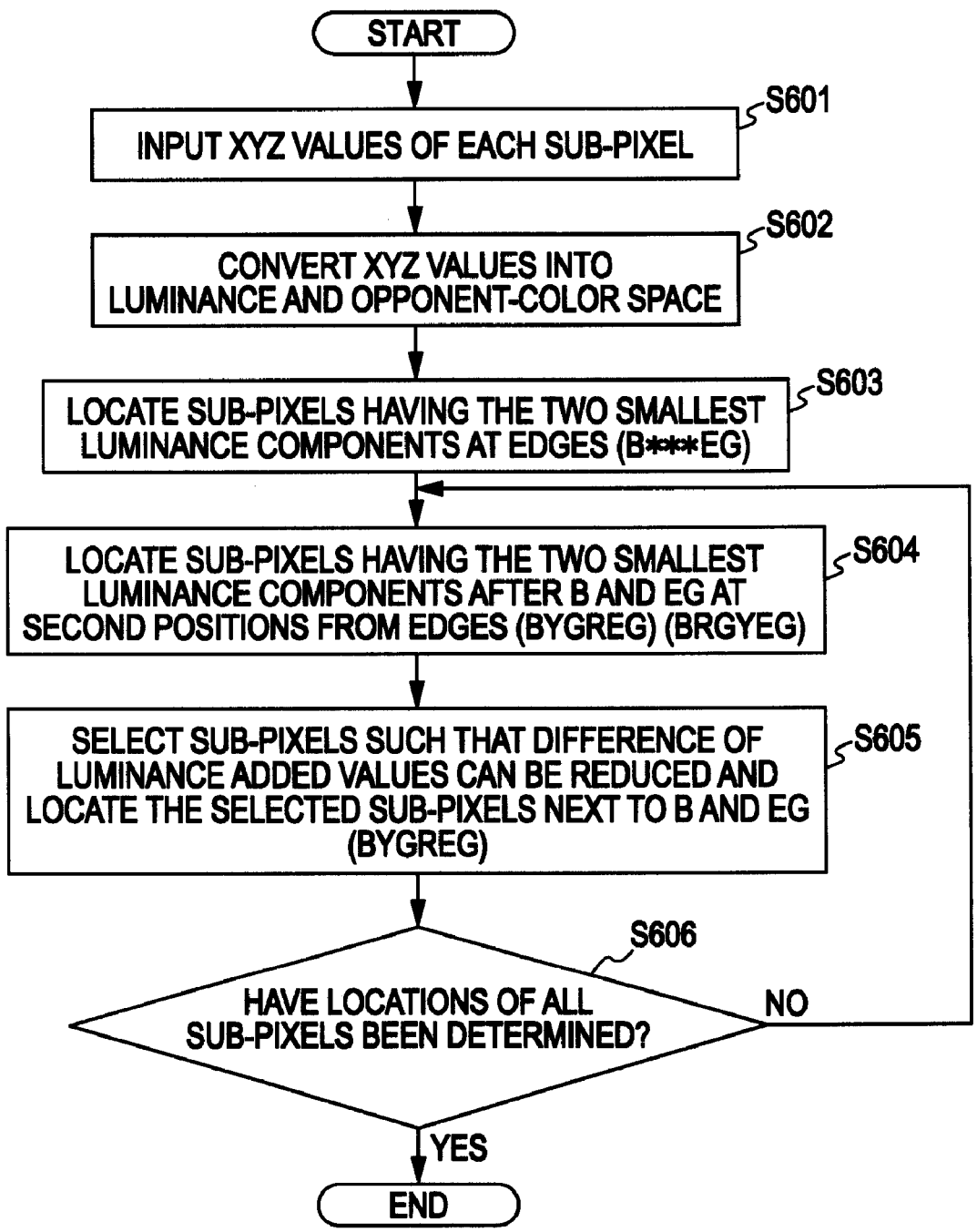

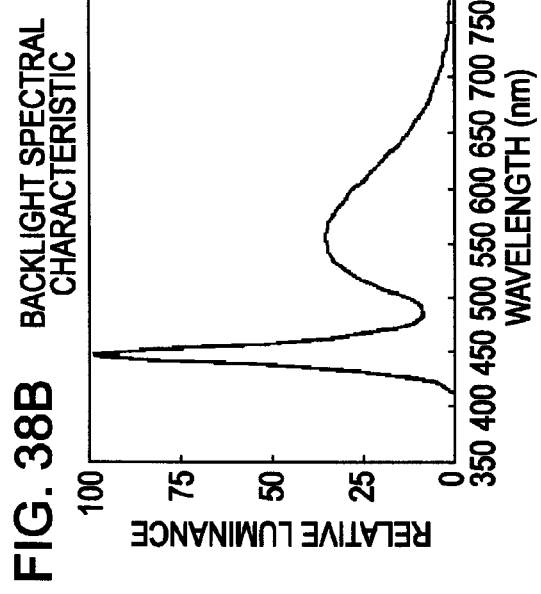
FIG. 38A COLOR FILTER SPECTRAL CHARACTERISTICS
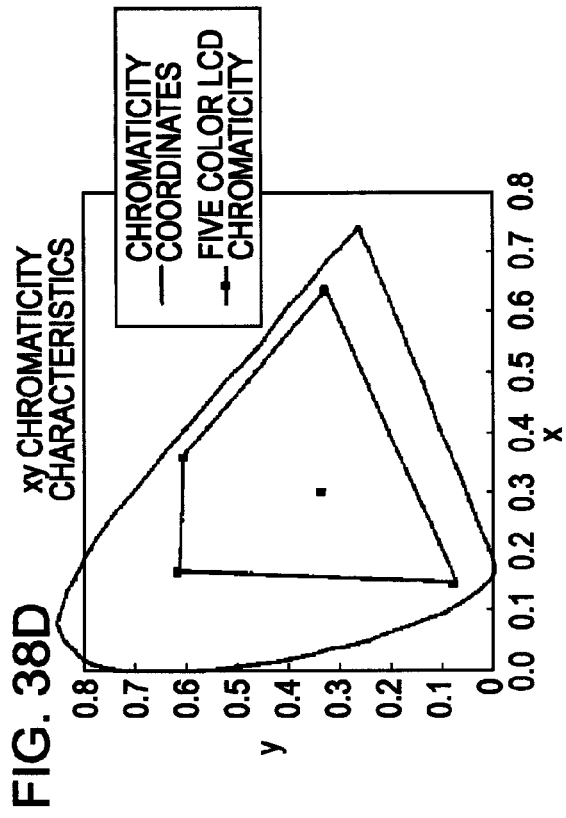
FIG. 38B BACKLIGHT SPECTRAL CHARACTERISTIC
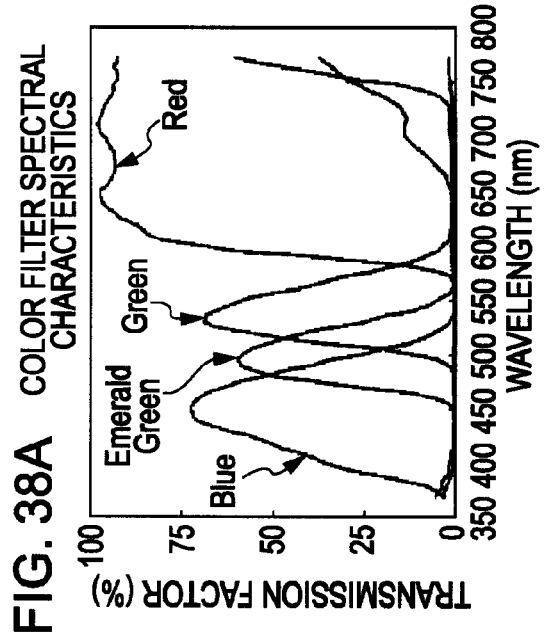
FIG. 38C PIXEL UNIT SPECTRAL CHARACTERISTICS
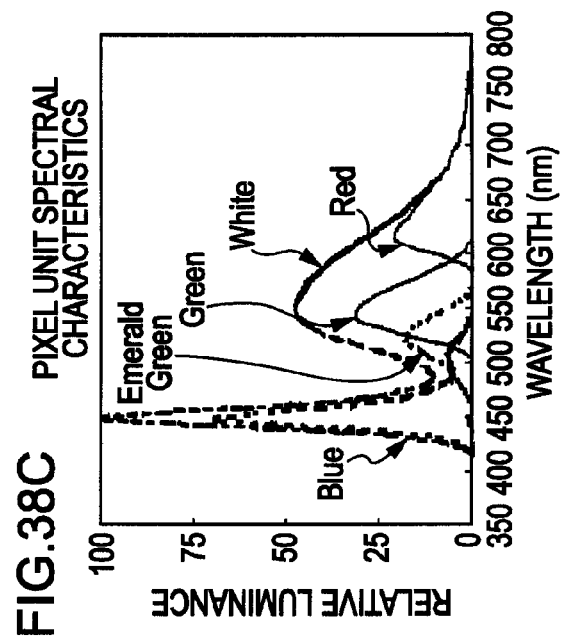
FIG. 38D xy CHROMATICITY CHARACTERISTICS

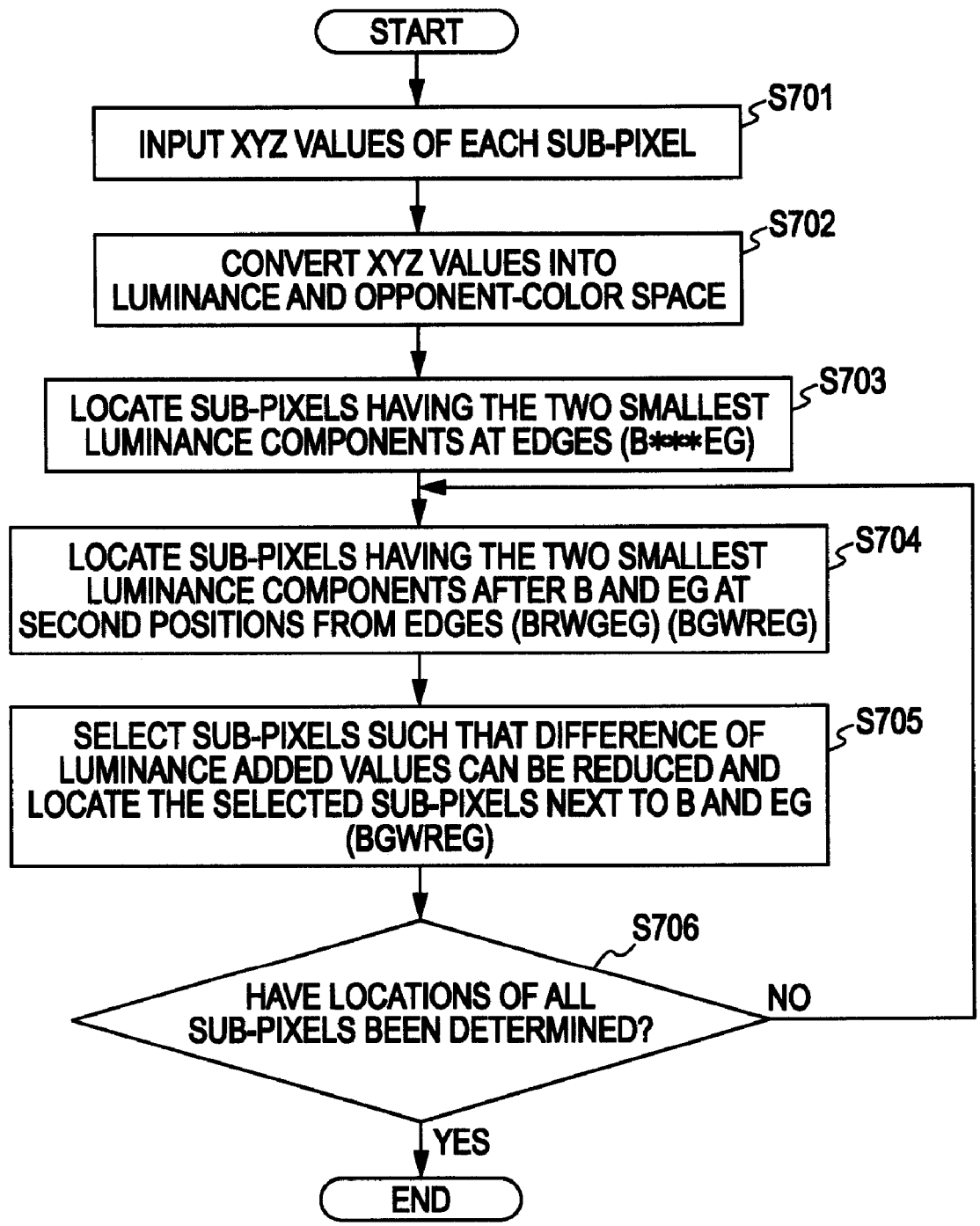

FIG. 40A

LUMINANCE AND OPPONENT-COLOR SPACE COMPONENTS

| COLOR | Lum | R/G | B/Y |
|---|---|---|---|
| Red | 0.12 | −0.04 | −0.04 |
| Green | 0.22 | 0.02 | −0.13 |
| Blue | 0.01 | 0.01 | 0.21 |
| Emerald Green | 0.07 | 0.02 | −0.03 |
| White | 0.58 | −0.01 | −0.01 |

FIG. 40B

TWO-COLOR LUMINANCE ADDED VALUE

| FIRST COLOR | SECOND COLOR | FIRST COLOR Lum | SECOND COLOR Lum | LUMINANCE ADDED VALUE |
|---|---|---|---|---|
| B | R | 0.01 | 0.12 | 0.13 |
| B | G | 0.01 | 0.22 | 0.23 |
| EG | G | 0.07 | 0.22 | 0.29 |
| EG | R | 0.07 | 0.12 | 0.19 |
| . | . | . | . | . |
| . | . | . | . | . |

FIG. 40C

ABSOLUTE VALUE OF DIFFERENCE
OF LUMINANCE ADDED VALUES

| LEFT SET | RIGHT SET | LUMINANCE ADDED VALUE | LUMINANCE ADDED VALUE | ABSOLUTE VALUE OF DIFFERENCE |
|---|---|---|---|---|
| B(R) | (G)EG | 0.13 | 0.29 | 0.16 |
| B(G) | (R)EG | 0.23 | 0.19 | 0.04 |

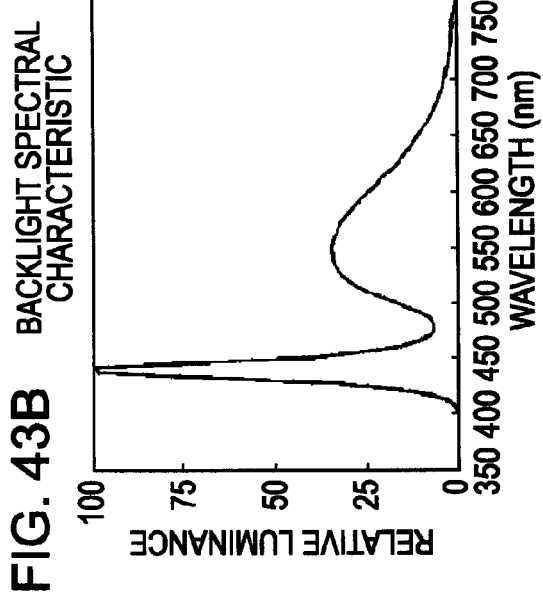
FIG. 43A COLOR FILTER SPECTRAL CHARACTERISTICS
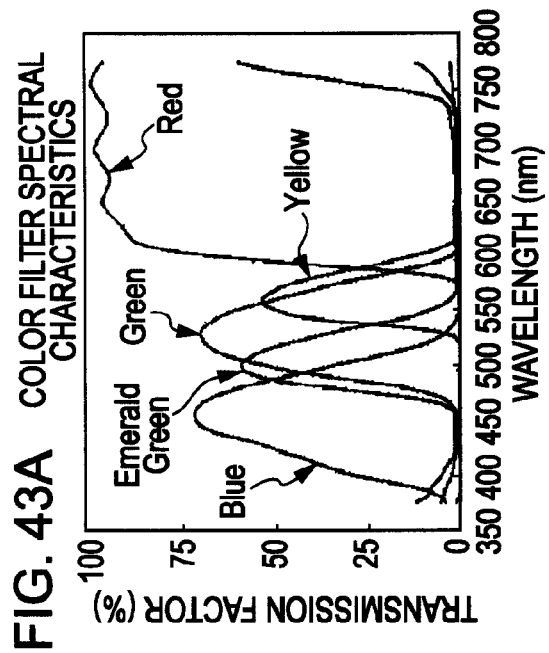
FIG. 43C PIXEL UNIT SPECTRAL CHARACTERISTICS
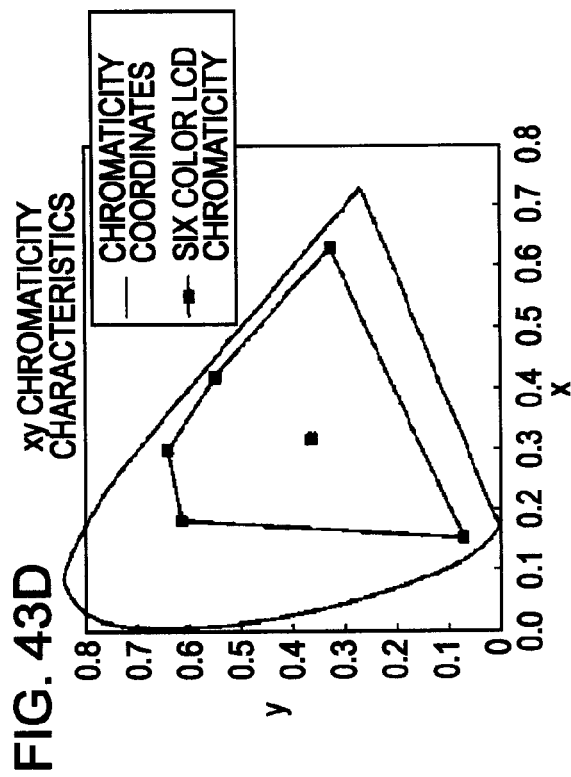
FIG. 43B BACKLIGHT SPECTRAL CHARACTERISTIC
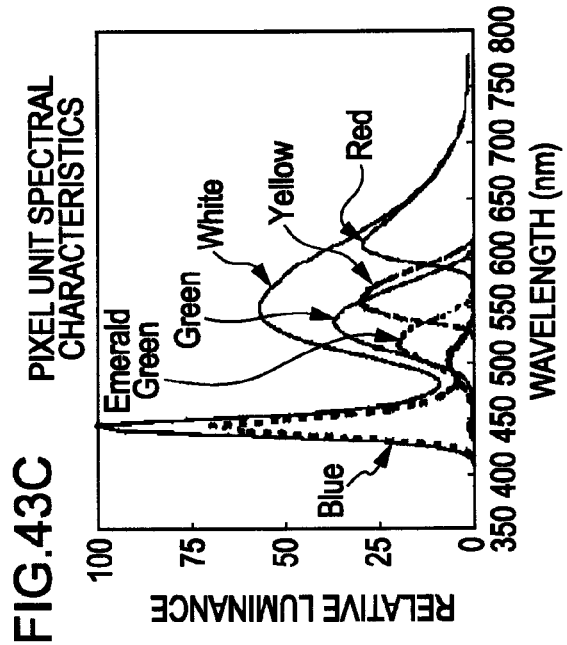
FIG. 43D xy CHROMATICITY CHARACTERISTICS

FIG. 44A
LUMINANCE AND OPPONENT-COLOR SPACE COMPONENTS

| COLOR | Lum | R/G | B/Y |
|---|---|---|---|
| Red | 0.11 | -0.04 | -0.04 |
| Green | 0.19 | 0.03 | -0.12 |
| Blue | 0.01 | 0.01 | 0.22 |
| Emerald Green | 0.06 | 0.02 | -0.03 |
| Yellow | 0.15 | 0.01 | -0.08 |
| White | 0.50 | -0.01 | 0.04 |

FIG. 44B  TWO-COLOR LUMINANCE ADDED VALUE

| FIRST COLOR | SECOND COLOR | FIRST COLOR Lum | SECOND COLOR Lum | LUMINANCE ADDED VALUE |
|---|---|---|---|---|
| B | (Y) | 0.01 | 0.15 | 0.16 |
| B | (R) | 0.01 | 0.11 | 0.12 |
| EG | (R) | 0.06 | 0.11 | 0.17 |
| EG | (Y) | 0.06 | 0.15 | 0.21 |

FIG. 44C  ABSOLUTE VALUE OF DIFFERENCE OF TWO LUMINANCE ADDED VALUES

| LEFT SET | RIGHT SET | LUMINANCE ADDED VALUE | LUMINANCE ADDED VALUE | ABSOLUTE VALUE OF DIFFERENCE |
|---|---|---|---|---|
| B(Y) | (R)EG | 0.16 | 0.17 | 0.01 |
| B(R) | (Y)EG | 0.12 | 0.21 | 0.09 |

FIG. 44D  THREE-COLOR LUMINANCE ADDED VALUE

| FIRST COLOR | SECOND COLOR | THIRD COLOR | FIRST COLOR Lum | SECOND COLOR Lum | THIRD COLOR Lum | LUMINANCE ADDED VALUE |
|---|---|---|---|---|---|---|
| B | Y | (W) | 0.01 | 0.15 | 0.50 | 0.66 |
| B | Y | (G) | 0.01 | 0.15 | 0.19 | 0.35 |
| EG | R | (G) | 0.06 | 0.11 | 0.19 | 0.36 |
| EG | R | (W) | 0.06 | 0.11 | 0.50 | 0.67 |

FIG. 44E  ABSOLUTE VALUE OF DIFFERENCE OF THREE LUMINANCE ADDED VALUES

| LEFT SET | RIGHT SET | LUMINANCE ADDED VALUE | LUMINANCE ADDED VALUE | ABSOLUTE VALUE OF DIFFERENCE |
|---|---|---|---|---|
| BY(W) | (G)REG | 0.66 | 0.36 | 0.30 |
| BY(G) | (W)REG | 0.35 | 0.67 | 0.32 |

DATA LINE DRIVE SIGNAL
SCANNING LINE DRIVE SIGNAL

DATA LINE DRIVE SIGNAL

IMAGE DISPLAY DEVICE, ELECTRONIC APPARATUS, AND PIXEL LOCATION DETERMINING METHOD

CROSS-REFERENCE TO RELATED APPLICATION

This application claims priority from Japanese Patent Application Nos. 2005-298803, 2005-303431, 2006-047875 and 2006-060144, filed in the Japanese Patent Office on Oct. 13, 2005, Oct. 18, 2005, Feb. 24, 2006 and Mar. 6, 2006, respectively, the entire disclosures of which are hereby incorporated by reference in their entireties.

BACKGROUND

1. Technical Field

The present invention relates to image display devices, electronic apparatuses, and pixel location determining methods.

2. Related Art

Image display devices that can display images by using four or more colors (hereinafter also referred to as "multiple colors") are known. In this case, the "colors" are colors that can be displayed by sub-pixels, which are the smallest addressable unit for displaying images, and are not restricted to three colors, such as red, green, and blue. The image display devices can display various colors by using various combinations of sub-pixels having different colors. For example, image display devices that display images by using four colors, such as red, green, blue, and cyan (hereinafter simply referred to as "R", "G", "B", and "C", respectively, or collectively referred to as "RGBC"), are known.

In the above-described related art, however, the locations of the RGBC sub-pixels have been determined without thoroughly considering the influence of the locations of sub-pixels on the visual characteristics.

SUMMARY

An advantage of some aspects of the invention is that it provides an image display device in which the locations of pixels forming four or more colors are determined by thoroughly considering the influence of the locations of the pixels on the visual characteristics, and also provides an electronic apparatus including such an image display device and a pixel location determining method for determining the locations of the pixels.

According to an aspect of the invention, there is provided an image display device that displays an image by using a plurality of display pixels, each display pixel including four sub-pixels corresponding to different colors. The four sub-pixels forming each of the display pixels are located such that two sub-pixels having a smaller level of luminance are located at edges of the display pixel, each of the two sub-pixels being located at either edge of the display pixel and such that two other sub-pixels are located at a central portion of the display pixel so that the absolute value of the difference between a luminance added value, which is a value obtained by adding luminance levels of one of the sub-pixels located at the edges of the display pixel and an adjacent pixel, and a luminance added value, which is a value obtained by adding luminance levels of the other sub-pixel located at the edge of the display pixel and an adjacent pixel, is reduced.

With this configuration, luminance errors occurring in display images can be reduced, and also, the edge blurring phenomenon under visual observation can be reduced. Accordingly, the above-described image display device can display high-quality images.

It is preferable that the luminance and the luminance added value may be defined in a luminance and opponent-color space. It is also preferable that the luminance and the luminance added value may be defined based on a visual space characteristic in the luminance and opponent-color space. With this arrangement, the locations of the sub-pixels can be determined while considering the influence of the locations of the sub-pixels on visual characteristics.

It is preferable that the four sub-pixels may include red, green, blue, and cyan, and that the four sub-pixels may be located in the order of cyan, red, green, and blue.

It is also preferable that the four sub-pixels may include red, green, blue, and white, and that the four sub-pixels may be located in the order of blue, white, green, and red.

It is also preferable that the four sub-pixels may include red, yellowish green, emerald green, and blue, and that the four sub-pixels may be located in the order of blue, yellowish green, red, and emerald green.

It is preferable that color regions of the four sub-pixels may include, within a visible light region where hue changes according to a wavelength, a bluish hue color region, a reddish hue color region, and two hue color regions selected from among hues ranging from blue to yellow.

It is also preferable that color regions of the four sub-pixels may include a color region where a peak of a wavelength of light passing through the color region ranges from 415 to 500 nm, a color region where a peak of a wavelength of light passing through the color region is 600 nm or longer, a color region where a peak of a wavelength of light passing through the color region ranges from 485 to 535 nm, and a color region where a peak of a wavelength of light passing through the color region ranges from 500 to 590 nm.

It is preferable that the plurality of display pixels may be located linearly such that the same color is continuously arranged in the vertical direction of the image display device. That is, the display pixels are arranged in a stripe pattern. The vertical direction is the direction orthogonal to the scanning direction.

It is preferable that the plurality of display pixels may be located such that the sub-pixels corresponding to vertically adjacent display pixels are displaced from each other by at least one sub-pixel. With this arrangement, the number of display pixels in the horizontal direction can be reduced while suppressing deterioration in the quality of display images. Accordingly, the cost of the image display device can be reduced.

It is preferable that the horizontal width of the sub-pixel may be substantially one fourth the horizontal width of the display pixel. It is preferable that a color filter may be provided such that it is overlaid on the sub-pixels.

According to another aspect of the invention, there is provided an image display device that displays an image by using a plurality of display pixels, each display pixel including four or more sub-pixels corresponding to different colors. Each of the display pixels is located such that two sub-pixels having a level of luminance smaller than the average of levels of luminance of the four or more sub-pixels are located at edges of the display pixel, each of the two sub-pixels being located at either edge of the display pixel.

With this configuration, luminance errors occurring in display images can be reduced, and also, the edge blurring phenomenon under visual observation can be reduced. Accordingly, the above-described image display device can display high-quality images.

It is preferable that each of the display pixels may be located such that, among the four or more sub-pixels, a sub-pixel having a largest level of luminance is located at a center of the display pixel. With this arrangement, the value obtained by adding the differences of the luminance components around edge portions between an original image and a reproduction image can be decreased so that the luminance slope can be increased.

It is preferable that each of the display pixels may be located such that, among the four or more sub-pixels, two sub-pixels having a smaller level of luminance are located at edges of the display pixel, each of the two sub-pixels being located at either edge of the display pixel. With this arrangement, luminance errors in display images can be effectively reduced.

It is preferable that each of the display pixels may be located such that the luminance is decreased from the center toward the edges of the display pixel.

It is preferable that the display pixels may be located such that the absolute value of the difference between a luminance added value, which is a value obtained by adding luminance levels of a plurality of sub-pixels located at one side with respect to a center of the display pixel, and a luminance added value, which is a value obtained by adding luminance levels of a plurality of sub-pixels located at the other side with respect to the center of the display pixel is reduced. With this arrangement, the luminance slope at the left edge and the luminance slope at the right edge can be maintained substantially at the same level.

It is preferable that the horizontal width of the sub-pixel may be substantially one fifth the horizontal width of the display pixel if the display pixel includes five sub-pixels.

According to another embodiment of the invention, there is provided an electronic apparatus including one of the above-described image display devices and a power supply device that supplies a voltage to the image display device.

According to a further aspect of the invention, there is provided a pixel location determining method for determining locations of four sub-pixels corresponding to different colors in an image display device that displays an image by using a plurality of display pixels, each display pixel including the four sub-pixels. The pixel location determining method includes determining locations of two sub-pixels having a smaller level of luminance so that the two sub-pixels are located at edges of the display pixel, each of the two sub-pixels being located at either edge of the display pixel, and determining the locations of the two other sub-pixels at a central portion of the display pixel such that the absolute value of the difference between a luminance added value, which is a value obtained by adding luminance levels of one of the sub-pixels located at the edges of the display pixel and an adjacent pixel, and a luminance added value, which is a value obtained by adding luminance levels of the other sub-pixel located at the edge of the display pixel and an adjacent pixel, is reduced.

By applying the locations of the sub-pixels determined in the pixel location determining method to the image display device, luminance errors in display images can be reduced, and the edge blurring phenomenon recognized under observation can be reduced.

BRIEF DESCRIPTION OF THE DRAWINGS

The invention will be described with reference to the accompanying drawings, wherein like numbers reference like elements.

FIG. 5 is a flowchart illustrating sub-pixel error checking processing according to the first embodiment.

FIGS. 9A through 9L illustrate the results obtained from the sub-pixel error checking processing performed on the 12 candidates shown in FIGS. 8A through 8L, respectively.

FIGS. 10A through 10C illustrate specific examples of the luminance and luminance added values of the four RGBC colors.

FIG. 13 is a flowchart illustrating sub-pixel locating processing according to the second embodiment.

FIGS. 14A through 14C illustrate specific examples of the luminance and luminance added values of the four RGBW colors.

FIGS. 16A through 16L illustrate the results obtained from the sub-pixel error checking processing performed on the 12 candidates shown in FIGS. 15A through 15L, respectively.

FIG. 22 is a block diagram illustrating the schematic overall configuration of an electronic apparatus according to an embodiment of the invention.

FIGS. 24A through 24D illustrate examples of the display characteristics of the display unit according to a fourth embodiment of the invention.

FIGS. 25A through 25C illustrate specific examples of the luminance and luminance added values of the four R, YG, B, and EG colors.

FIG. 26 is a flowchart illustrating sub-pixel locating processing according to the fourth embodiment.

FIGS. 28A-28C illustrate specific examples of the luminance and luminance added values of the four R, YG, B, and EG colors.

FIGS. 30A through 30D illustrate examples of the display characteristics of the display unit according to the sixth embodiment.

FIGS. 36A through 36C illustrate specific examples of the luminance and luminance added values of R, G, B, EG, and Y colors.

FIG. 37 is a flowchart illustrating sub-pixel locating processing according to the sixth embodiment.

FIGS. 38A through 38D illustrate examples of the display characteristics of the display unit according to a seventh embodiment of the invention.

FIG. 39 is a flowchart illustrating sub-pixel locating processing according to the seventh embodiment.

FIGS. 40A through 40C illustrate specific examples of the luminance and luminance added values of R, G, B, EG, and W colors.

FIGS. 43A through 43D illustrate examples of the display characteristics of the display unit according to an eighth embodiment of the invention.

FIGS. 44A through 44E illustrate specific examples of the luminance and luminance added values of R, G, B, EG, Y, and W colors.

DESCRIPTION OF EXEMPLARY EMBODIMENTS

Preferred embodiments of the invention are described below with reference to the accompanying drawings.

First Embodiment

A first embodiment of the invention is described below.

Overall Configuration

Figure 1:
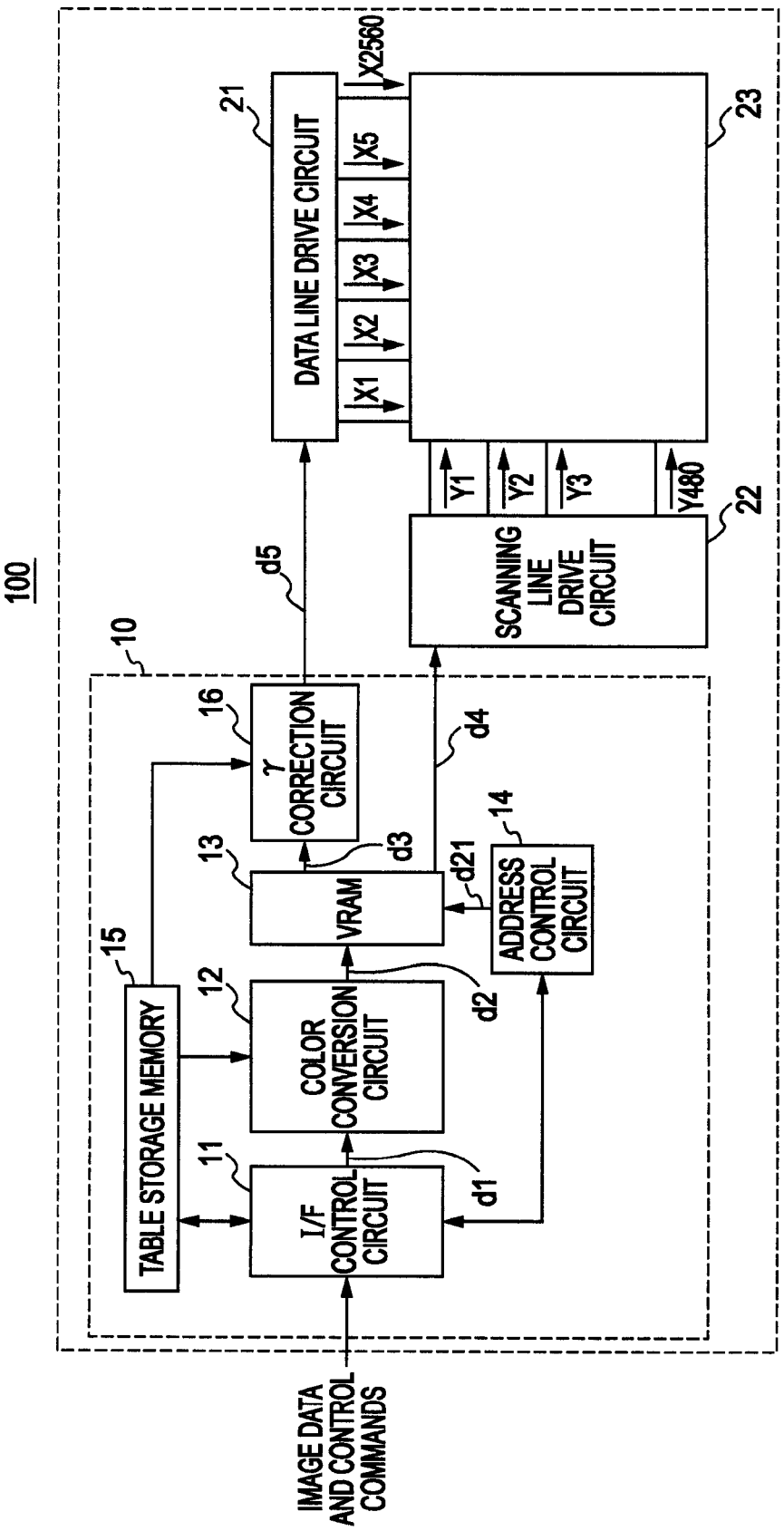
FIG. 1 is a block diagram illustrating the schematic configuration of an image display device according to a first embodiment of the invention.

FIG. 1 is a block diagram illustrating the schematic configuration of an image display device 100 according to the first embodiment of the invention. The image display device 100 includes an image processor 10, a data line drive circuit 21, a scanning line drive circuit 22, and a display unit 23. The image display device 100 can display images by using multiple colors, and more specifically, the image display device 100 can display four colors, such as RGBC colors.

The image processor 10 includes an interface (I/F) control circuit 11, a color conversion circuit 12, a video random access memory (VRAM) 13, an address control circuit 14, a table storage memory 15, and a gamma ($\gamma$) correction circuit 16. The I/F control circuit 11 obtains image data and control commands from an external source (for example, a camera) and supplies image data d1 to the color conversion circuit 12. Image data supplied from an external source is formed of data representing three colors, such as R, G, and B.

The color conversion circuit 12 performs processing on the image data d1 for converting from three colors into four colors. In this case, the color conversion circuit 12 performs image processing, such as color conversion, by referring to data stored in the table storage memory 15. Image data d2 subjected to image processing in the color conversion circuit 12 is written into the VRAM 13. The image data d2 written into the VRAM 13 is read out to the $\gamma$ correction circuit 16 as image data d3 on the basis of a control signal d21 output from the address control circuit 14, and is also read out to the scanning line drive circuit 22 as address data d4. The reason for supplying the image data d2 as the address data d4 is that the scanning line drive circuit 22 provides synchronization based on the address data. The $\gamma$ correction circuit 16 performs $\gamma$ correction on the obtained image data d3 by referring to the data stored in the table storage memory 15. The $\gamma$ correction circuit 16 then supplies image data d5 subjected to $\gamma$ correction to the data line drive circuit 21.

The data line drive circuit 21 supplies data line drive signals X1 through X2560 to the 2560 data lines. The scanning line drive circuit 22 supplies scanning line drive signals Y1 through Y480 to the 480 scanning lines. The data line drive circuit 21 and the scanning line drive circuit 22 drive the display unit 23 while being synchronized with each other. The display unit 23 is formed of a liquid crystal device (LCD) and displays images by using the four RGBC colors. The display unit 23 is a video graphics array (VGA)-size display having 480×640-unit pixels (hereinafter referred to as "display pixels"), each pixel having a set of the four RGBC pixels (such pixels are hereinafter referred to as "sub-pixels"). Accordingly, the number of data lines is 2560 (640×4=2560). The display unit 23 displays images, such as characters or video, when a voltage is applied to the scanning lines and data lines.

Figure 2:
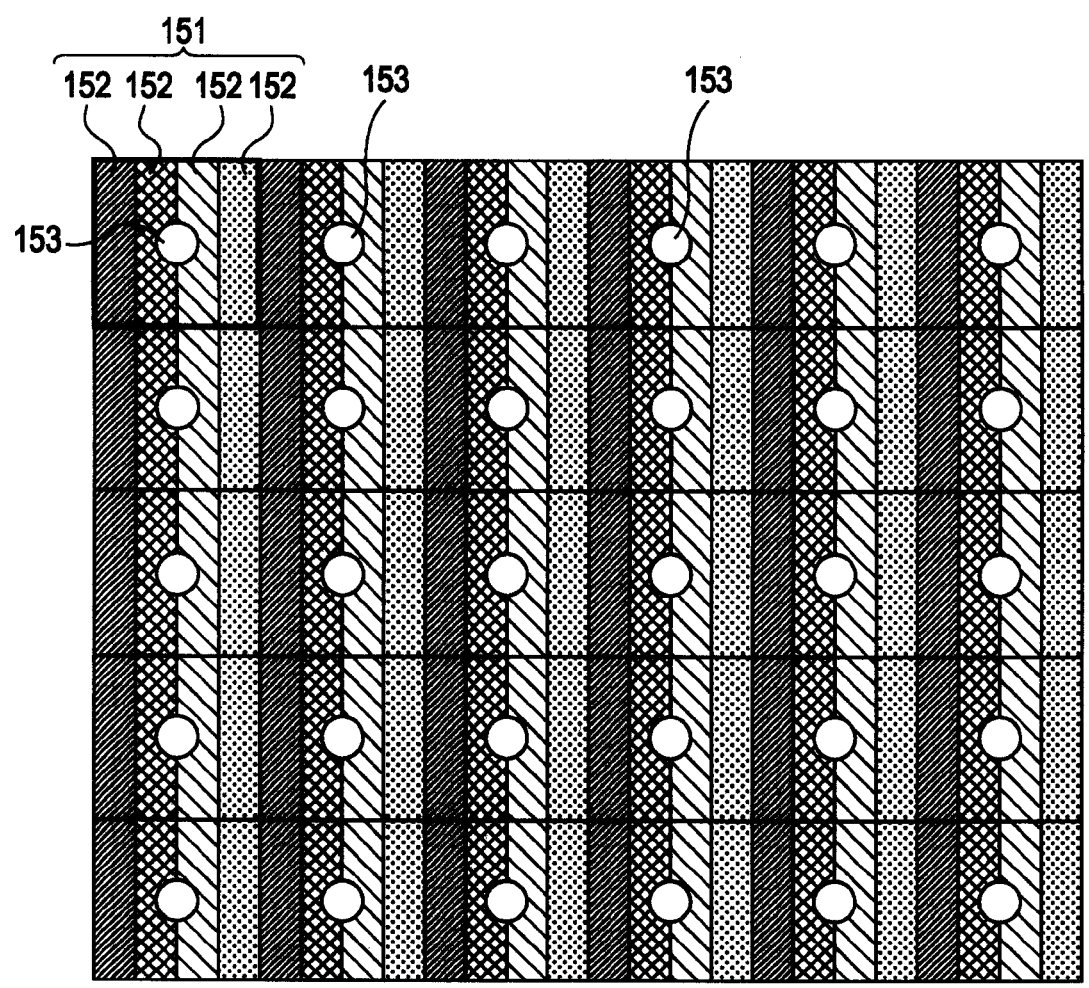
FIG. 2 schematically illustrates enlarged pixels of a display unit.

FIG. 2 is a schematic diagram illustrating the enlarged pixels of the display unit 23. White circles 153 indicate the positions of display pixels 151, and R, G, B, and C sub-pixels 152 are distinguished by different patterns of hatching. In this case, a plurality of columns of the display pixels 151 are disposed such that the same color is continuously arranged in the vertical direction, i.e., the display pixels 151 are disposed in a stripe pattern. The aspect ratio of the display pixels 151 is 1:1. Accordingly, when the length of the sub-pixel 152 in the vertical direction is 1, the width of the sub-pixel 152 in the horizontal direction becomes 0.25. In this specification, the vertical direction is the direction orthogonal to the scanning direction, and the horizontal direction is the direction parallel to the scanning direction. Details of specific locations of the sub-pixels 152 and a method for determining the locations of the sub-pixels 152 are described below.

Figure 3:
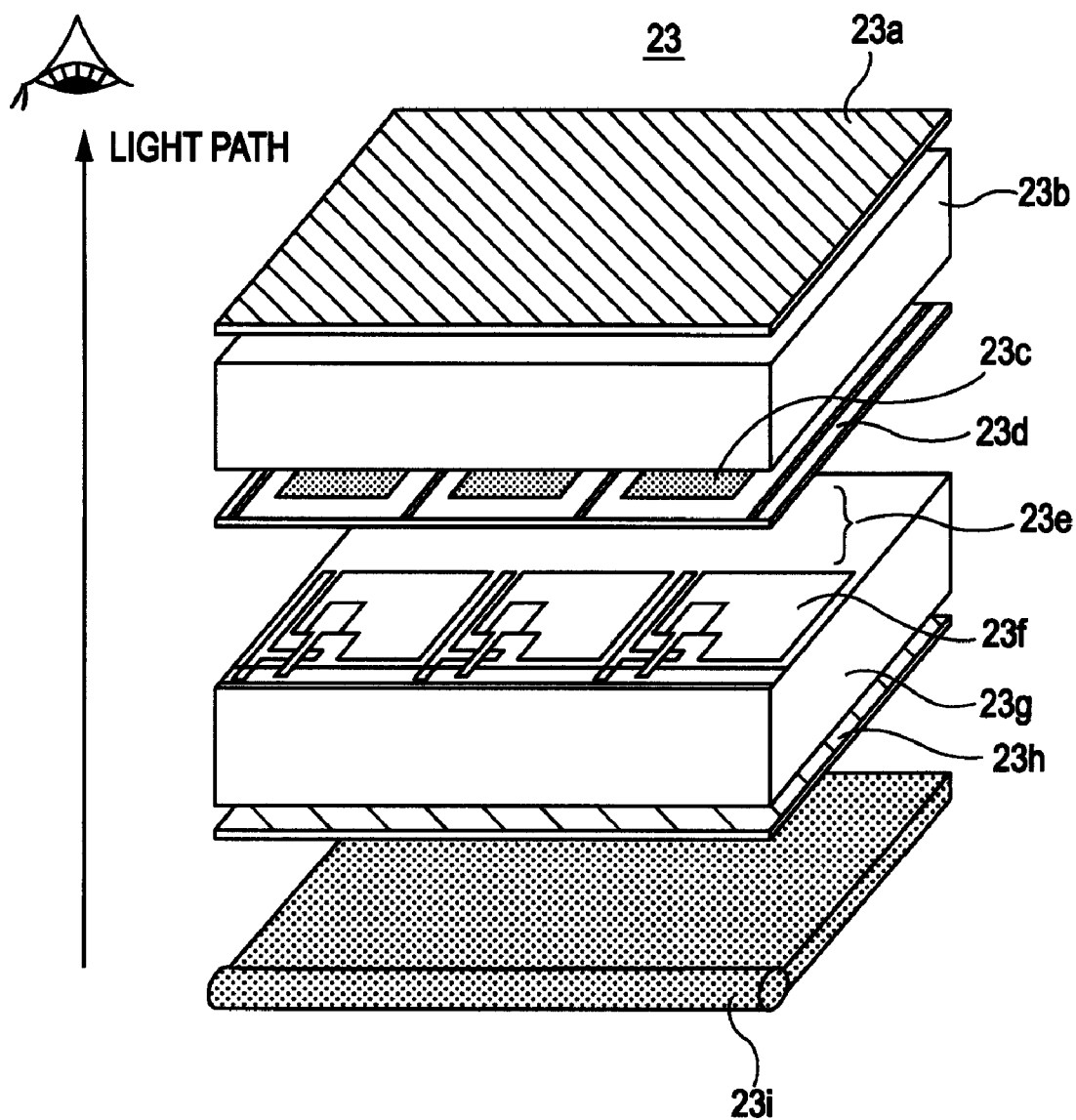
FIG. 3 is a perspective view illustrating the specific configuration of the display unit.

FIG. 3 is a perspective view illustrating the specific configuration of the display unit 23. A pixel electrode 23f is formed on the top surface of a thin-film transistor (TFT) array substrate 23g, and a common electrode 23d is formed on the bottom surface of a counter substrate 23b. A color filter 23c is formed between the counter substrate 23b and the common electrode 23d. An upper polarizer 23a is formed on the top surface of the counter substrate 23b, and a lower polarizer 23h and a backlight unit 23i are formed below the TFT array substrate 23g.

More specifically, the TFT array substrate 23g and the counter substrate 23b are formed of transparent substrates composed of, for example, glass or plastic. The pixel electrode 23f and the common electrode 23d are formed of transparent conductors composed of, for example, indium tin oxide (ITO). The pixel electrode 23f is connected to the TFTs disposed on the TFT array substrate 23g, and applies a voltage to a liquid crystal layer 23e between the common electrode 23d and the pixel electrode 23f in accordance with the switching of the TFTs. In the liquid crystal layer 23e, the orientation of the liquid crystal molecules is changed in accordance with the voltage applied to the liquid crystal disposed between the common electrode 23d and the pixel electrode 23f.

The amounts of light passing through the liquid crystal layer 23e and the upper and lower polarizers 23a and 23h are changed due to a change in the orientation of the liquid crystal molecules in accordance with the voltage applied to the liquid crystal layer 23e. Accordingly, the liquid crystal layer 23e controls the amount of light coming from the backlight unit 23i and allows a certain amount of light to pass through the liquid crystal layer 23e toward an observer. The backlight unit 23i includes a light source and an optical waveguide. In this configuration, light emitted from the light source is uniformly propagated inside the optical waveguide and is output from the display unit 23 in the direction indicated by the arrow in FIG. 3. The light source is composed of, for example, a fluorescent lamp or a white light emitting diode (LED), and the optical waveguide is composed of, for example, a resin, such as an acrylic resin. The display unit 23 configured as described above forms a transmissive-type liquid crystal display device in which light emitted from the backlight unit 23i is propagated in the direction indicated by the arrow shown in FIG. 3 and is output from the counter substrate 23b. That is, in the transmissive-type liquid crystal display device, liquid crystal display is implemented by utilizing light emitted from the light source of the backlight unit 23i.

Figure 4B:
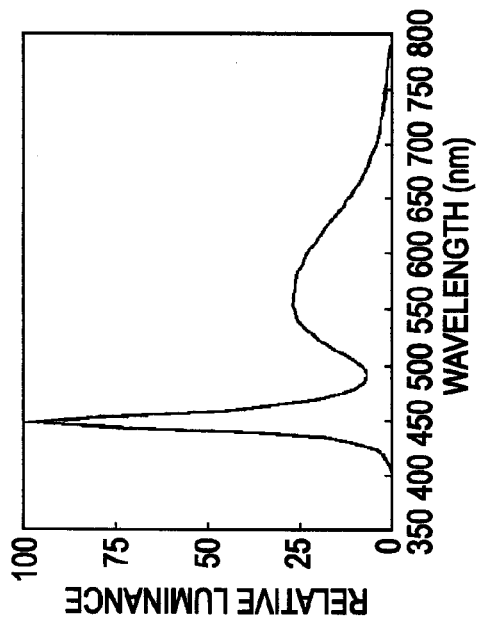
FIGS. 4A through 4D illustrate examples of the display characteristics of the display unit.
Figure 4D:
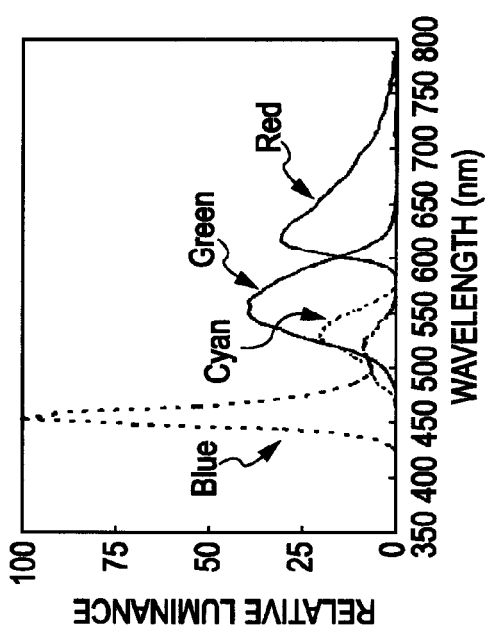
Figure 4A:
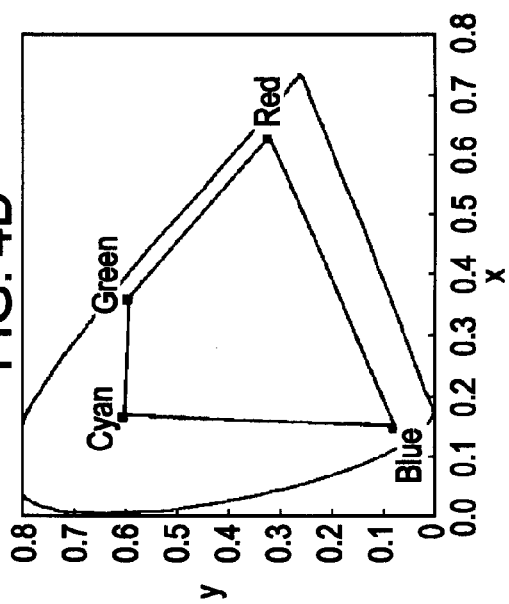
Figure 4C:
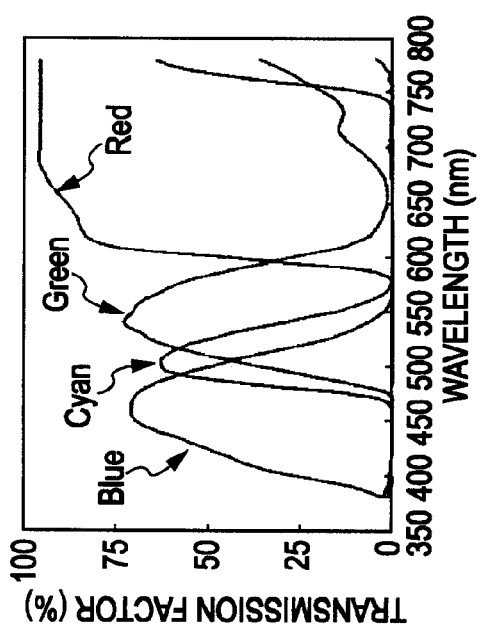

FIGS. 4A through 4D illustrate examples of display characteristics of the display unit 23. More specifically, FIG. 4A is a diagram illustrating the spectral characteristics of the color filter 23c of the display unit 23 in which the horizontal axis represents the wavelength (nm) and the vertical axis indicates the transmission factor (%). FIG. 4B is a diagram illustrating the light emission characteristic of the light source of the backlight unit 23i in which the horizontal axis indicates the wavelength (nm) and the vertical axis represents the relative luminance. FIG. 4C is a diagram illustrating the transmission characteristic of the color filter 23c together with the light emission characteristic of the backlight unit 23i, i.e., the light emission characteristics of the four colors. In FIG. 4C, the horizontal axis indicates the wavelength (nm) and the vertical axis designates the relative luminance. The liquid crystal layer 23e also controls the amount of light to pass through the display unit 23, however, the transmission characteristic of the liquid crystal layer 23e is not shown since it is substantially flat. FIG. 4D is a diagram illustrating tristimulus values of the four colors corresponding to the light emission characteristics of the four colors, the tristimulus values being calculated and plotted on an xy chromaticity diagram. The colors that can be reproduced by the display unit 23 are restricted to the range surrounded by the quadrilateral indicated in the diagram of FIG. 4D, and the quadrilateral corresponds to the color reproduction region of the display unit 23, and the vertices of the quadrilateral correspond to RGBC colors.

Sub-pixel Error Checking Method

In the first embodiment, the locations of the four RGBC sub-pixels are determined by thoroughly considering the influence of the pixel locations on the visual characteristics. The visual characteristics to be taken into consideration when determining the locations of the sub-pixels are described first, in other words, the influence on the visual characteristics when the locations of the sub-pixels are changed is described first.

FIG. 5 is a flowchart illustrating sub-pixel error checking processing for checking the occurrences of errors depending on the order of the RGBC sub-pixels (i.e., the display locations of the RGBC sub-pixels). In an image display device using sub-pixels, the pixels are disposed in a matrix, and light components having a plurality of different colors are emitted from adjacent pixels and are mixed so that a desired color can be reproduced and recognized by an observer as the desired color. In this case, depending on the locations of the pixels, edge blurring or color breakup (false color) may occur due to the visual characteristics. "Errors" to be checked by the sub-pixel error checking processing shown in FIG. 5 correspond to such edge blurring or color breakup. The sub-pixel error checking processing is executed by, for example, a computer.

In step S101, XYZ values of each of the RGBC colors are input. The XYZ values of each color can be determined by the spectral characteristics of the color filter 23c or the backlight unit 23i by simulations or actual measurement. Then, in step S102, the XYZ values are converted into a luminance and opponent-color space, and the luminance and opponent-color space is represented by Lum, R/G, and B/Y components.

In step S103, in the luminance and opponent-color space, filtering processing in accordance with the visual characteristics is performed, and details thereof are given below. Then, in step S104, the processing results are checked for errors, such as edge blurring and color breakup.

Figure 6:
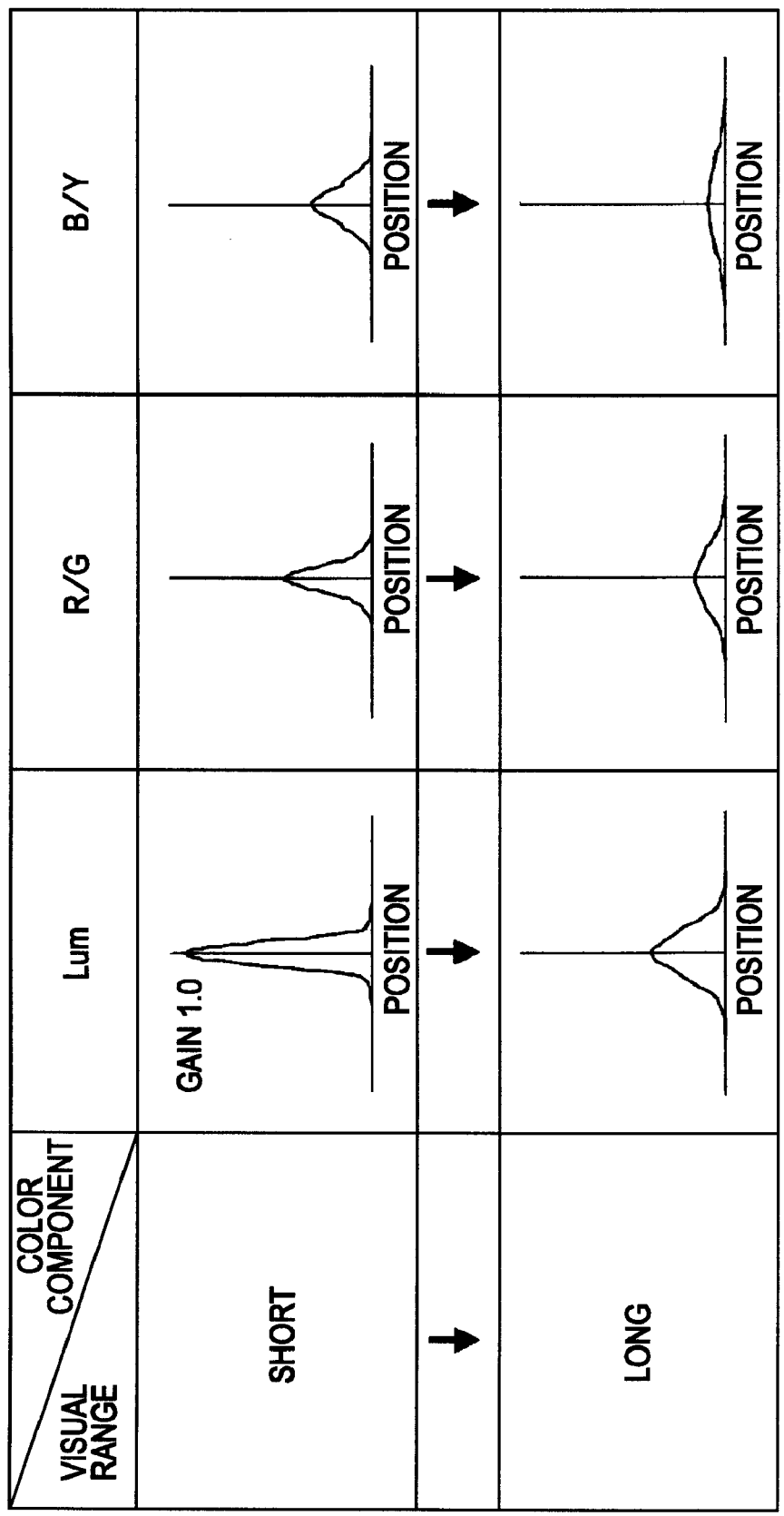
FIG. 6 illustrates the filtering characteristics with respect to the luminance/opponent-color components.

FIG. 6 illustrates the filtering characteristics with respect to the luminance/opponent-color components. In FIG. 6, the leftmost graphs indicate Lum components, the central graphs indicate R/G components, and the rightmost graphs indicate B/Y components. In all the graphs, the horizontal axis represents the position of an image, and the vertical axis designates a weight (more specifically, the relative value when the Lum component in a short visual range is 1). The upper graphs indicate the filtering characteristics when the visual range is short, and the lower graphs indicate the filtering characteristics when the visual range is long. FIG. 6 shows that the filtering characteristics have different amplitude characteristics and spreading widths for the luminance component and the opponent color components. The filtering characteristics are changed in accordance with the visual range since they are associated with the visual characteristics. FIG. 6 also shows that the amplitude of the R/G component is larger than that of the B/Y component.

Figure 7A:
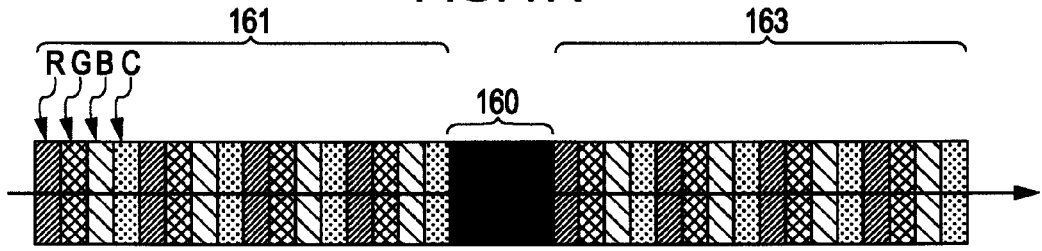
FIGS. 7A through 7D illustrate examples of the results obtained by the sub-pixel error checking processing.

FIGS. 7A through 7D illustrate examples of the results of the sub-pixel error checking processing indicated by the flowchart in FIG. 5. FIG. 7A illustrates a spatial pattern used for the sub-pixel error checking processing. More specifically, display pixels, each being arranged in the order of RGBC, are used, and a display pixel 160 positioned at the center of the spatial pattern is turned OFF (total shielding), while display pixel sets 161 and 163, each pixel set being positioned on either side of the display pixel 160, are turned ON (total transmission). That is, the spatial pattern, the central portion of which is displayed in black and the portions horizontally next to the central portion are displayed in white (hereinafter such a pattern is referred to as the "black and white pattern") is used. In this specification, the display order of "RGBC" of sub-pixels means that the sub-pixels are located in the order of R, G, B, and C from the left to the right or from the right to the left.

Figure 7B:
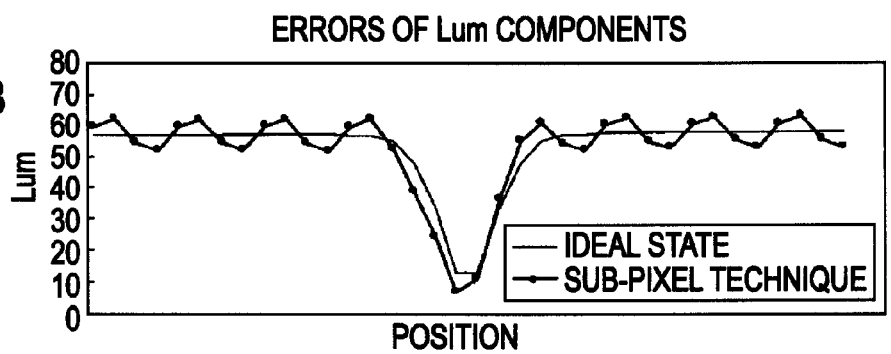
Figure 7C:
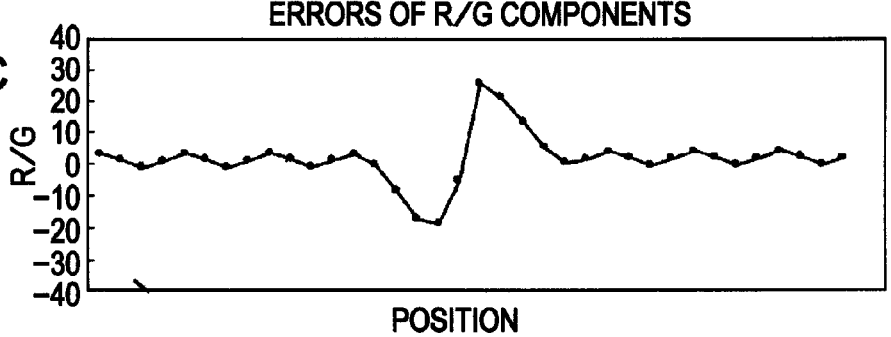
Figure 7D:
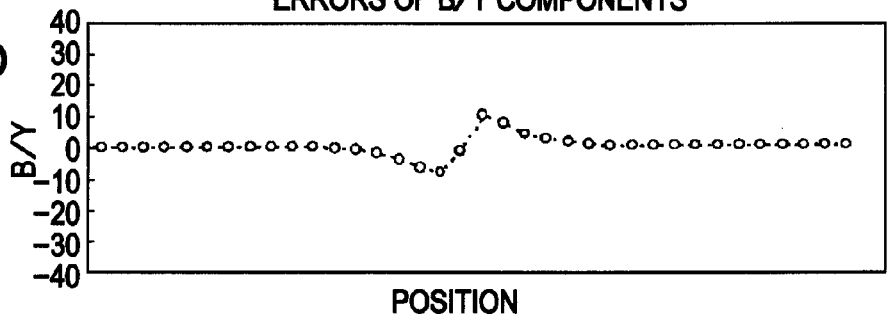
Figure 8A:
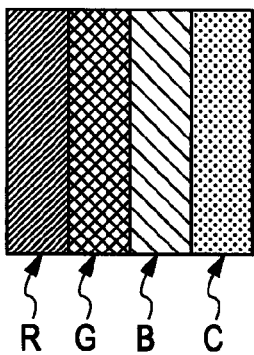
FIGS. 8A through 8L illustrate candidates for the pixel order of four RGBC sub-pixels.
Figure 8B:
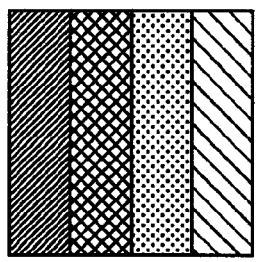
Figure 8C:
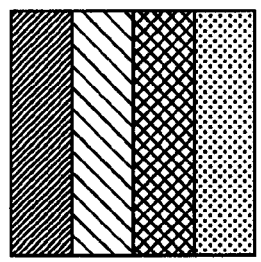
Figure 8D:
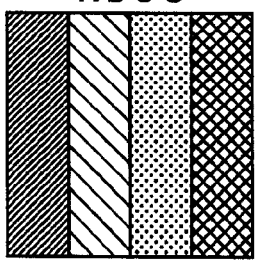
Figure 8E:
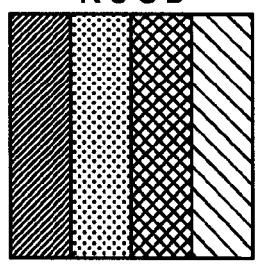
Figure 8F:
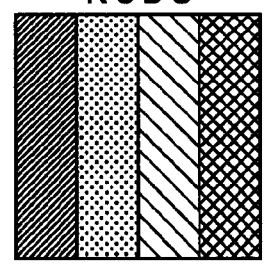
Figure 8G:
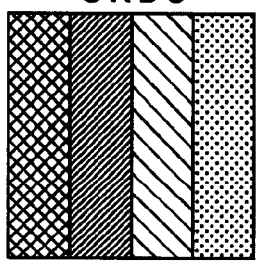
Figure 8H:
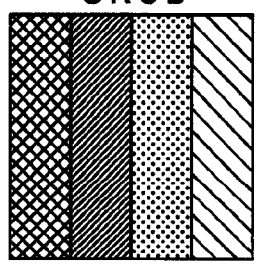
Figure 8I:
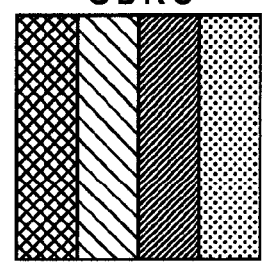
Figure 8J:
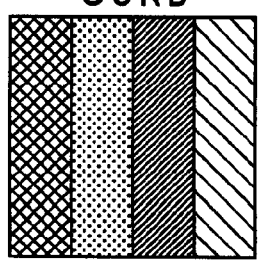
Figure 8K:
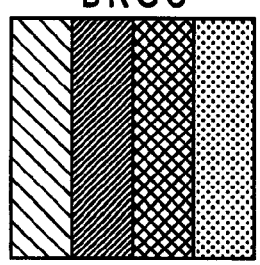
Figure 8L:
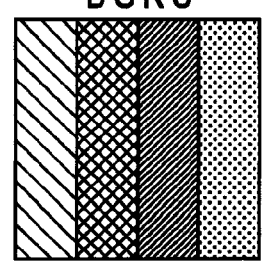

In FIGS. 7B, 7C, and 7D, the horizontal axes each designate the position of the image having the black and white pattern shown in FIG. 7A, and the vertical axes represent the Lum components, R/G components, and B/Y components, respectively. In FIG. 7B, the graph obtained by assuming that a plurality of different colors are fully mixed in a color space without using sub-pixels rather than an actual result obtained by measuring light emitted from a display unit in which pixels are disposed in a matrix is also shown. FIG. 7B reveals that the use of the sub-pixels causes the white color portions to deviate from the ideal state in the positive direction and in the negative direction since colors can be recognized in the white color portions under close observation. FIG. 7B also reveals that an increase in the luminance, which causes edge blurring, can be observed in the black color portion by being influenced by the surrounding sub-pixels. Concerning the R/G components and the B/Y components, the graphs have a regular pattern if errors do not occur (if the ideal state is maintained). However, FIGS. 7C and 7D show that an increase in the R/G components and the B/Y components, which causes color breakup, can be observed around the black color portion since the black color portion is influenced by the surrounding sub-pixels. For example, in the R/G components shown in FIG. 7C, the peak portion at the central right position is increased in the positive (red) direction, and also, red pixels appear under close observation of the black and white pattern. Such a considerable increase in the peak portion in the positive direction is due to the filtering processing reflecting the visual characteristics. Without the execution of filtering processing, such a change does not occur. That is, such color components do not exist by nature, but they can be visually seen.

By considering the results discussed with reference to FIGS. 5 through 7D, the sub-pixel error checking processing is now performed on various candidates for the location orders of the four RGBC sub-pixels.

FIGS. 8A through 8L illustrate candidates for the locations of the four RGBC sub-pixels. In this case, although the number of combinations of the RGBC sub-pixels is 24 (4×3×2×1=24), the actual number becomes one half that, i.e., 12, if the horizontal symmetrical characteristic is considered. That is, for example, "RGBC" and "CBGR" are considered to be the same order.

FIGS. 9A through 9L illustrate the results of the sub-pixel error checking processing performed on the 12 candidates shown in FIGS. 8A through 8L, respectively. In FIGS. 9A through 9L, the horizontal axes each indicate the position of an image having the black and white pattern, and the vertical axes represent the Lum component. The thick lines indicate the graphs obtained by performing the sub-pixel error checking processing, while the thin lines designate an ideal state in which a plurality of different colors are fully mixed in a color space without using sub-pixels. FIGS. 9A through 9L show that errors are relatively small when the pixel order "BGRC" shown in FIG. 9L is employed. The errors of the pixel orders "BRGC" shown in FIG. 9K appear to be small. However, the Lum component deviates from the ideal state from the central position of the black color portion asymmetrically in the horizontal direction, and thus, the actual errors are greater than those of the pixel location "BRGC" shown in FIG. 9K.

The reason for this is now described by considering the luminance Lum. The luminance Lum is defined in a luminance and opponent-color space, and is defined based on the visual space characteristic. The reason for considering the luminance Lum is as follows. If the luminance of sub-pixels located at the edges of black portion is high, the luminance becomes increased when a white color is displayed, and as a result of filtering processing on the white color and the black color, the luminance, which causes edge blurring, is increased. In other words, errors are increased. That is, it can be assumed that errors can be reduced if pixels having a small level of luminance are located at the edges of a display pixel.

After determining the sub-pixels located at the edges of the display pixel, the balance between the luminance level at the left edge and the luminance level at the right edge is considered. More specifically, the value obtained by adding the luminance levels of two adjacent sub-pixels at the left edge (hereinafter such value is referred to as the "luminance added value") and the value obtained by adding the luminance levels of two adjacent sub-pixels at the right edge are calculated. Then, the difference between the two luminance added values is obtained. Based on the difference, the balance between the luminance level at the left edge and the luminance level at the right edge is considered. This is because, if the balance of the luminance levels at the left and right edges is disturbed, edge blurring occurs only at one edge. The reason for considering the luminance added value of two sub-pixels rather than the luminance of a single sub-pixel, a set of two sub-pixels produces a greater influence on the surrounding sub-pixels rather than a single sub-pixel due to the filtering characteristic reflecting the visual characteristics. Thus, two sub-pixels are located at the central portion of a display pixel such that the absolute value of the difference of the two luminance added values obtained from the adjacent sub-pixels at the left edge and the adjacent sub-pixels at the right edge can be reduced. Then, errors can be reduced.

FIGS. 10A through 10C illustrate tables indicating specific examples of the luminance and luminance added values. In the table shown in FIG. 10A, the Lum component, the R/G component, and the B/Y component calculated from the XYZ values of each of the RGBC colors are indicated. In this specification, the luminance is used as the value corresponding to Y, and the chroma is used as the magnitude (intensity) of a color.

In the table shown in FIG. 10B, the value obtained by adding the luminance levels of two colors (first color and second color) selected from the RGBC colors, i.e., the luminance added value, is indicated. In FIG. 10C, the upper part indicates the absolute value of the difference of the two luminance added values when BR (left set) and GC (right set) are combined (i.e., the order is "BRGC"), and the lower part indicates the absolute value of the difference of the two luminance added values when BG (left set) and RC (right set) are combined (i.e., the order is "BGRC"). The reason for locating B and C at the edges is discussed later.

FIG. 10A shows that the luminance levels of B and C are smaller than those of the other colors. Accordingly, it can be assumed that, if the B sub-pixel and C sub-pixel are located at the edges of a display pixel, errors can be reduced. Referring back to FIGS. 9A through 9L, it can be seen that, if B and C are located at the edges, such as in the case shown in FIG. 9K or 9L, errors are smaller than a case where B and C are not located at the edges, such as that in FIG. 9F.

FIG. 10C shows that the absolute value of the difference of the luminance added values is smaller when BG (left set) and RC (right set) are combined than that when BR (left set) and GC (right set) are combined. Accordingly, it can be assumed that errors can be reduced if the order "BGRC" is employed rather than the order "BRGC". Referring back to FIGS. 9A through 9L, it can be seen that, if BG and RC are combined, such as in the case shown in FIG. 9L, errors are smaller than a case where BR and GC are combined, such as that in FIG. 9K.

This is because the two sub-pixels having smaller luminance levels are located at the edges of a display pixel and the two other sub-pixels are located at the central portion of the display pixel such that the difference between the luminance added value obtained from the left edge and the luminance added value obtained from the right edge.

The pixel order "CRGB" is reversed from the pixel order "BGRC". That is, the pixel order "CRGB" is the same as the pixel order "BGRC". Thus, the pixel order "CRGB" obtains the same result as that shown in FIG. 9L.

Sub-pixel Locating Method

The sub-pixel location determining method is described below while taking the above-described results and assumptions into consideration. In the first embodiment, two sub-pixels having smaller luminance levels are located at the edges of a display pixel, and the two other sub-pixels are located at the central portion such that the absolute value of the difference between the luminance added value obtained from the adjacent sub-pixels at the left edge and that obtained from the right edge can be decreased.

Figure 11:
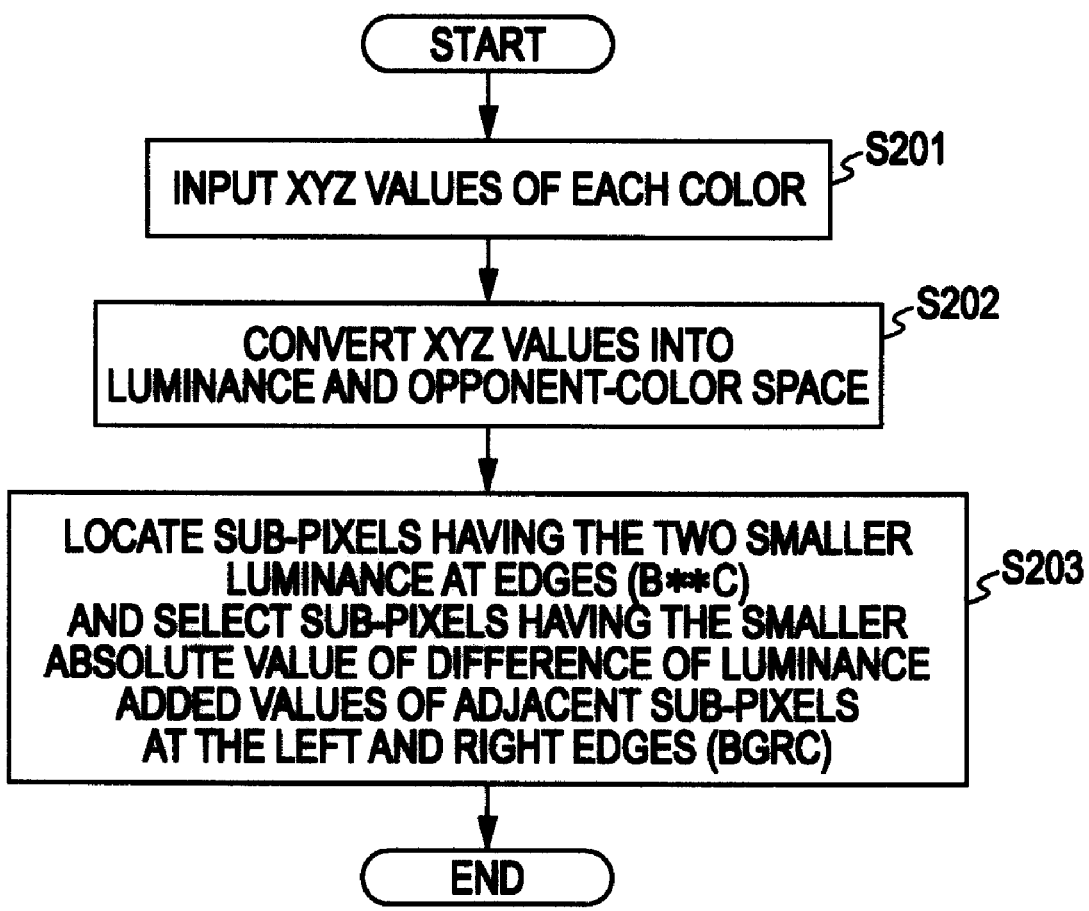
FIG. 11 is a flowchart illustrating sub-pixel locating processing according to the first embodiment.

FIG. 11 is a flowchart illustrating the sub-pixel locating processing executed by a program read by a computer or a program recorded on a recording medium. The sub-pixel locating processing is executed, for example, when the image display device 100 is designed.

In step S201, XYZ values of each of the RGBC colors are input. The XYZ values of each color can be determined by the spectral characteristics of the color filter 23c or the backlight unit 23i by simulations or actual measurement. Then, in step S202, the XYZ values are converted into a luminance and opponent-color space, and the luminance and opponent-color space is represented by Lum, R/G, and B/Y components.

In step S203, the locations of the RGBC sub-pixels are determined based on the results obtained in step S202. Based on the calculated levels of luminance Lum, sub-pixels having smaller luminance Lum are located at the edges of a display pixel. If the results shown in FIG. 10A are obtained, B and C having smaller levels of luminance Lum are located at the edges. Then, the luminance added value of the sub-pixel located at one of the edges and the adjacent sub-pixel is calculated, and the luminance added value of the sub-pixel located at the other edge and the adjacent sub-pixel is calculated. Then, the absolute value of the difference between the two luminance added values is calculated. Accordingly, a plurality of absolute values can be obtained for various combinations of sub-pixels, and the combination of sub-pixels having a smaller absolute value is selected. More specifically, two combinations, i.e., one combination BR and GC and the other combination BG and RC can be considered. If the results shown in FIG. 10C are obtained, the combination of BG and RC having a smaller absolute value is determined. BGRC is the same as CRGB. After step S203, the processing is completed.

According to the sub-pixel locating processing of the first embodiment, the locations of the RGBC sub-pixels can be determined by fully considering the visual characteristics. By applying the locations of the sub-pixels to the image display device 100, luminance errors occurring in display images can be reduced, and also, the edge blurring phenomenon recognized under close observation can be decreased. Thus, the image display device 100 can display high-quality images.

Although in the above-described example the locations of the sub-pixels "BGRC" are determined by the sub-pixel locating processing, the locations of the sub-pixels are not restricted to those described above. The locations selected in the above-described example are determined based on the results shown in FIGS. 10A through 10C, and if results other than those shown in FIGS. 10A through 10C are obtained, pixel locations different from the above-described locations are determined.

Second Embodiment

A second embodiment of the invention is described below. In the second embodiment, the composition of the multiple colors is different from that of the first embodiment. More specifically, in the second embodiment, instead of cyan (C), white (hereinafter simply referred to as "W" or "Wh") is used. That is, colors are represented by RGBW. In the second embodiment, an image display device similar to the image display device 100 is used, and an explanation thereof is thus omitted. Additionally, instead of a color layer, a transparent resin layer is used for the W sub-pixels.

Figure 12A:
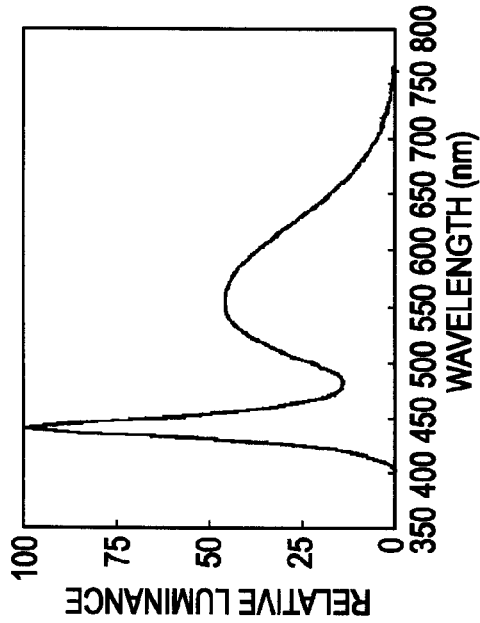
FIGS. 12A through 12D illustrate examples of the display characteristics of the display unit according to a second embodiment of the invention.
Figure 12B:
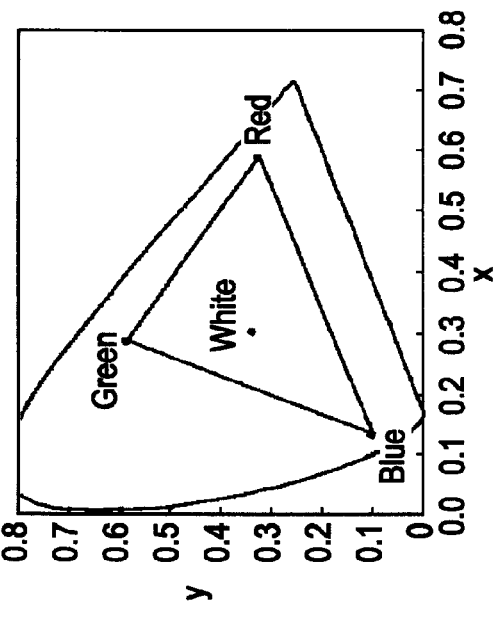
Figure 12C:
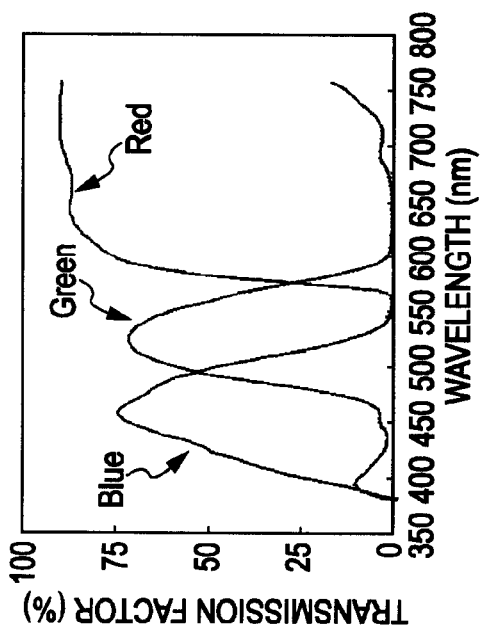
Figure 12D:
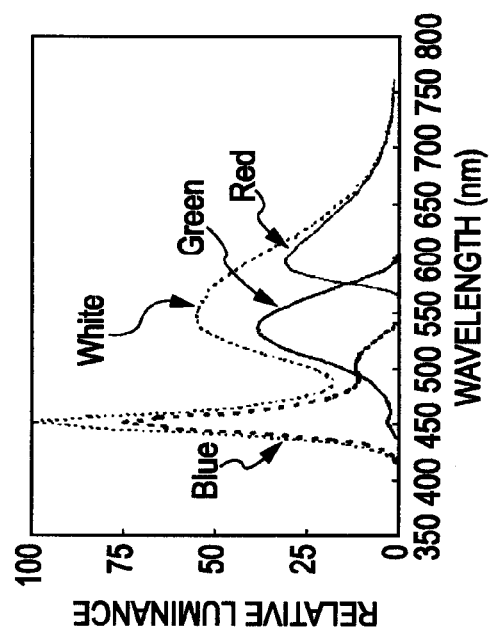
Figure 15A:
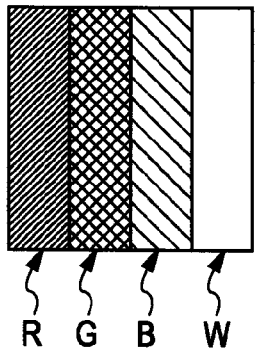
FIGS. 15A through 15L illustrate candidates for the pixel order of four RGBW sub-pixels.
Figure 15B:
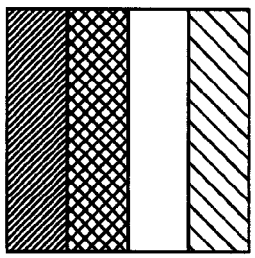
Figure 15C:
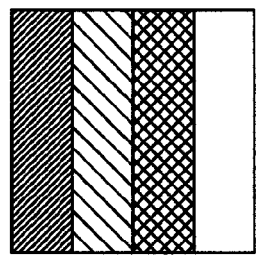
Figure 15D:
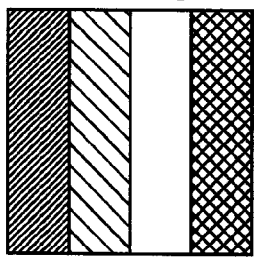
Figure 15E:
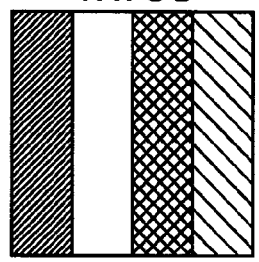
Figure 15F:
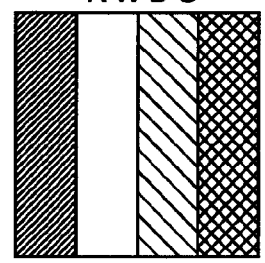
Figure 15G:
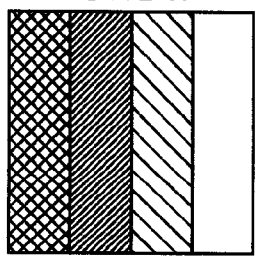
Figure 15H:
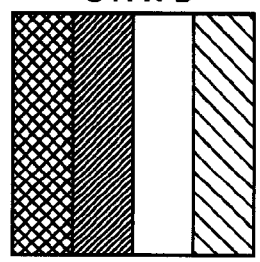
Figure 15I:
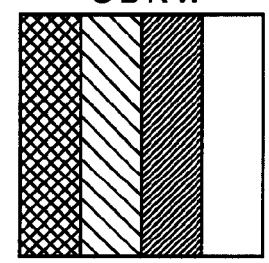
Figure 15J:
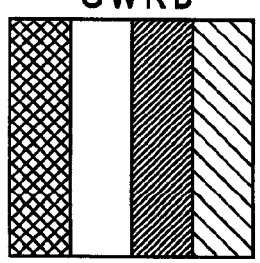
Figure 15K:
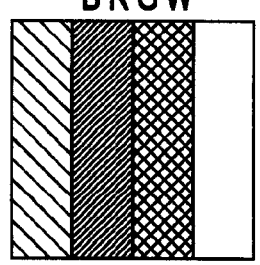
Figure 15L:
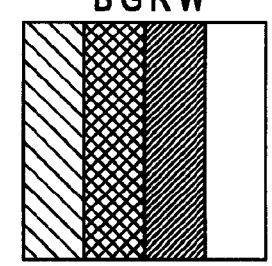

FIGS. 12A through 12D illustrate examples of display characteristics of the display unit 23. More specifically, FIG. 12A is a diagram illustrating the spectral characteristics of the color filter 23c of the display unit 23 in which the horizontal axis represents the wavelength (nm) and the vertical axis indicates the transmission factor (%). The color filter 23c is not used for the W sub-pixels. FIG. 12B is a diagram illustrating the light emission characteristic of the light source of the backlight unit 23i in which the horizontal axis indicates the wavelength (nm) and the vertical axis represents the relative luminance. FIG. 12C is a diagram illustrating the transmission characteristic of the four RGBW colors. In FIG. 12C, the horizontal axis indicates the wavelength (nm) and the vertical axis designates the relative luminance. In this case, since the color filter 23c is not used for the W sub-pixels, the spectral characteristic of the W sub-pixels exhibits substantially the same spectral characteristic of the backlight unit 23i. FIG. 12D is a diagram illustrating tristimulus values of the four colors with respect to the light emission characteristics of the four colors, the tristimulus values being calculated and plotted on an xy chromaticity diagram. FIG. 12D shows that the color reproduction region is indicated by a triangle instead of a quadrilateral. The vertices of the triangle correspond to RGB colors, and W is positioned inside the triangle. Although this color reproduction range is similar to that of the three RGB colors, the use of the four RGBW colors by adding the W color increases the transmission factor. Accordingly, the luminance on the surface of the display unit 23 can be increased.

The sub-pixel locating method according to the second embodiment is described below. As in the first embodiment, in the second embodiment, two sub-pixels having smaller levels of luminance are located at the edges of a display pixel, and the two other sub-pixels are located at the central portion such that the absolute value of the difference between the luminance added value obtained from the adjacent pixels located at the left edge and that obtained from the adjacent pixels located at the right edge.

FIG. 13 is a flowchart illustrating the sub-pixel locating processing on the RGBW sub-pixels. This processing is executed by a program read by a computer or a program recorded on a recording medium. The sub-pixel locating processing is executed, for example, when the image display device 100 is designed.

In step S301, XYZ values of each of the RGBW colors are input. The XYZ values of each color can be determined by the spectral characteristics of the color filter 23c or the backlight unit 23i by simulations or actual measurement. Then, in step S302, the XYZ values are converted into a luminance and opponent-color space, and the luminance and opponent-color space is represented by Lum, R/G, and B/Y components.

In step S303, the locations of RGBW are determined based on the levels of luminance Lum obtained in step S302. More specifically, the levels of luminance Lum and the luminance added values of RGBW are obtained, for example, the tables shown in FIGS. 14A through 14C are obtained.

FIGS. 14A through 14C illustrate tables indicating specific examples of the luminance and luminance added values. In the table shown in FIG. 14A, the Lum component, the R/G component, and the B/Y component calculated from the XYZ values of each of the RGBW colors are indicated. In the table shown in FIG. 14B, the value obtained by adding the luminance levels of two colors (first color and second color) selected from the RGBC colors, i.e., the luminance added value, is indicated. In FIG. 14C, the upper part indicates the absolute value of the difference of the two luminance added values when BG (left set) and WR (right set) are combined (i.e., the order is "BGWR"), and the lower part indicates the absolute value of the difference of the two luminance added values when BW (left set) and GR (right set) are combined (i.e., the order is "BWGR").

FIG. 14A shows that the luminance levels of B and R are smaller than those of the other colors. FIG. 14C shows that the absolute value of the difference of the luminance added values is smaller when BW (left set) and GR (right set) are combined than that when BG (left set) and WR (right set) are combined. Accordingly, it can be assumed that errors can be reduced if the order "BWGR" is employed rather than the order "BGWR".

Referring back to the flowchart in FIG. 13, in step S303, the locations of the RGBW sub-pixels are determined. If the results shown in FIG. 14A are obtained, the B and R sub-pixels are located at the edges of a display pixel. Then, the luminance added value of the adjacent sub-pixels located at the left edge and the luminance added value of the adjacent sub-pixels located at the right edge are obtained, and the absolute value of the difference between the two luminance added values is calculated. Then, the combination of sub-pixels having a smaller absolute value is selected. More specifically, a combination of BG and WR and a combination of BW and GR can be considered, and if the results shown in FIG. 14C are obtained, the combination of BW and GR having the smaller absolute value of the difference of the luminance added values is selected. Then, the pixel order "BWGR" is determined. BWGR and RGWB are the same order. After step S303, the processing is completed.

The results obtained by the RGBW sub-pixel locating processing are compared with those of the sub-pixel error checking processing performed on candidates for the pixel orders of the four RGBW pixels.

FIGS. 15A through 15L illustrate candidates for the pixel order of the four RGBW sub-pixels. In this case, although the number of combinations of the RGBW sub-pixels is 24 (4×3× 2×1=24), the actual number becomes one half that, i.e., 12, if the horizontal symmetrical characteristic is considered.

FIGS. 16A through 16L illustrate the results of the sub-pixel error checking processing performed on the 12 candidates shown in FIGS. 15A through 15L, respectively. FIGS. 16A through 16L show that errors are relatively small when the pixel order "RGWB" shown in FIG. 16B is employed. The errors of the pixel orders "RGBW" shown in FIG. 16A and "RWBG" shown in FIG. 16F appear to be small. However, the luminance Lum deviates from the ideal state from the central position of the black color portion asymmetrically in the horizontal direction, and thus, the actual errors are greater than those of the pixel location "RGWB" shown in FIG. 16B. Accordingly, it can be seen that the results of the sub-pixel error checking processing are similar to those of the sub-pixel locating processing. That is, if two sub-pixels having smaller luminance levels are located at the edges of a display pixel, and if the two other sub-pixels are located at the central portion of the display pixel such that the absolute value of the difference between the luminance added value obtained from the adjacent sub-pixels located at the left edge and the luminance added value obtained from the adjacent sub-pixels at the right edge, errors can be reduced.

According to the sub-pixel locating processing of the second embodiment, the locations of the RGBW sub-pixels can be determined by fully considering the visual characteristics. By applying the locations of the sub-pixels to the image display device 100, luminance errors in display images can be reduced, and also, the edge blurring phenomenon recognized under visual observation can be decreased. Thus, the image display device 100 can display high-quality images.

Although in the above-described example the locations of the sub-pixels "BWGR") are determined by the sub-pixel locating processing, the locations of the sub-pixels are not restricted to those described above. The locations selected in the above-described example are determined based on the results shown in FIGS. 14A through 14C, and if results other than those shown in FIGS. 14A through 14C are obtained, pixel locations different from the above-described locations are determined.

Third Embodiment

A third embodiment of the invention is described below. In the first and second embodiments, the display pixels of the display unit 23 are disposed in a stripe pattern. In the third embodiment, however, the display pixels of the display unit 23 are disposed in a manner different from that of the first or second embodiment. Such a pixel arrangement is also referred to as the "display pixel arrangement".

Figure 17:
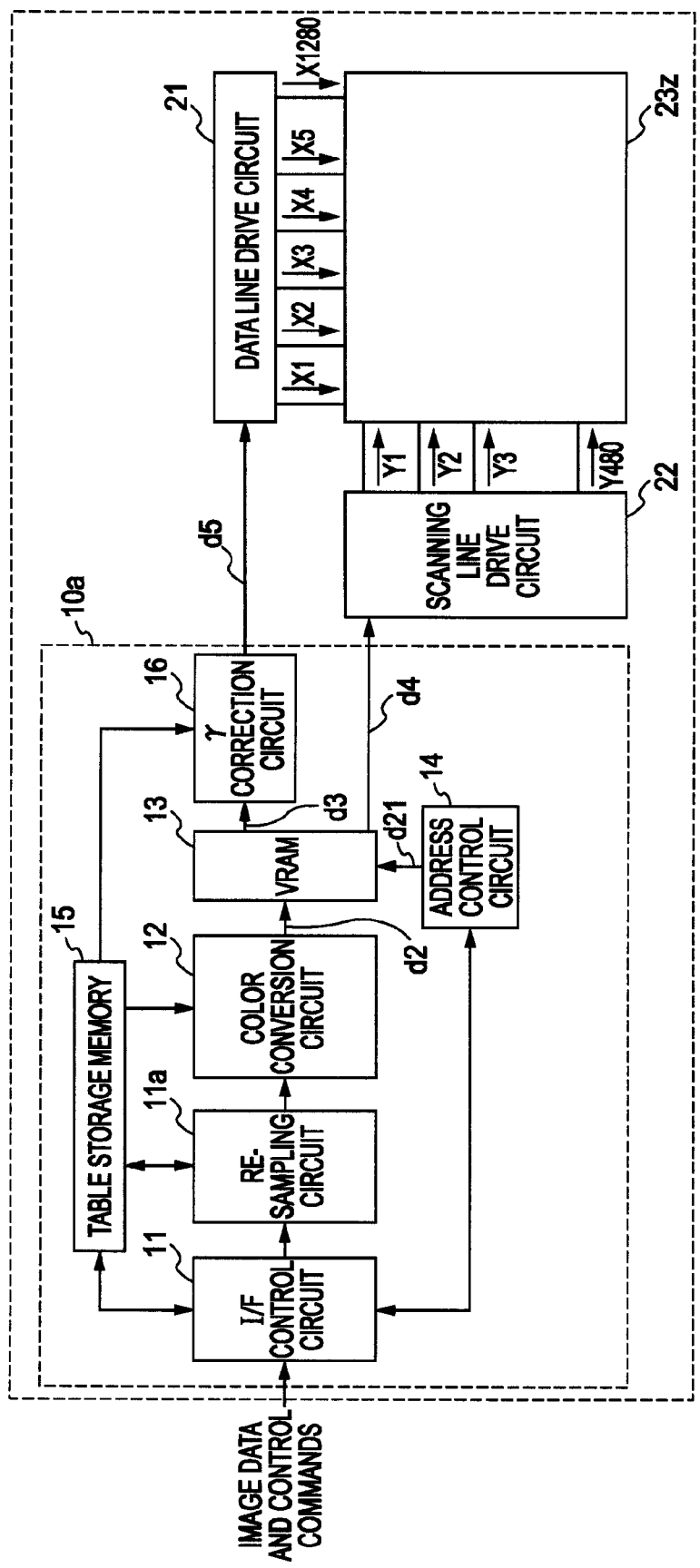
FIG. 17 is a block diagram illustrating the schematic configuration of an image display device according to a third embodiment of the invention.

FIG. 17 is a block diagram illustrating the schematic configuration of an image display device 101 of the third embodiment. The image display device 101 is different from the image display device 100 (see FIG. 1) of the first embodiment in that a re-sampling circuit 11a for input signals is added and the number of outputs of the data line drive circuit 21 is different from that of the image display device 100. Accordingly, elements and signals similar to those of the image display device 100 are designated with like reference numerals, and an explanation thereof is thus omitted here.

The re-sampling circuit 11a changes the number of pixels in the horizontal direction so that the pixels can match the display pixel arrangement of a display unit 23z. For example, the re-sampling circuit 11a changes the number of pixels by temporarily converting an input digital signal into an analog signal by using a digital-to-analog (D/A) converter and by re-sampling the analog signal on the time axis. Alternatively, the re-sampling circuit 11a may change the number of pixels by resealing the digital signal without performing A/D conversion.

The data line drive circuit 21 supplies data line drive signals X1 through X1280 to the 1280 data lines. The number of outputs of the data line drive circuit 21 is discussed below with reference to FIGS. 19A and 19B.

Before describing the display pixel arrangement in the third embodiment, changing the display pixel arrangement from a stripe pattern when three colors are used is discussed first.

Figure 18A:
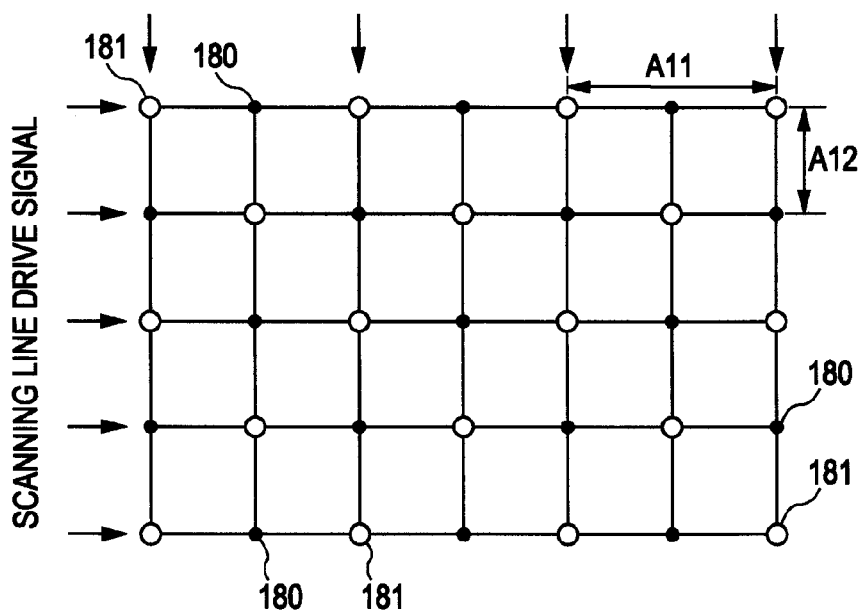
FIGS. 18A and 18B illustrate an example of a case where the display pixel arrangement having three RGB pixels is changed.
Figure 18B:
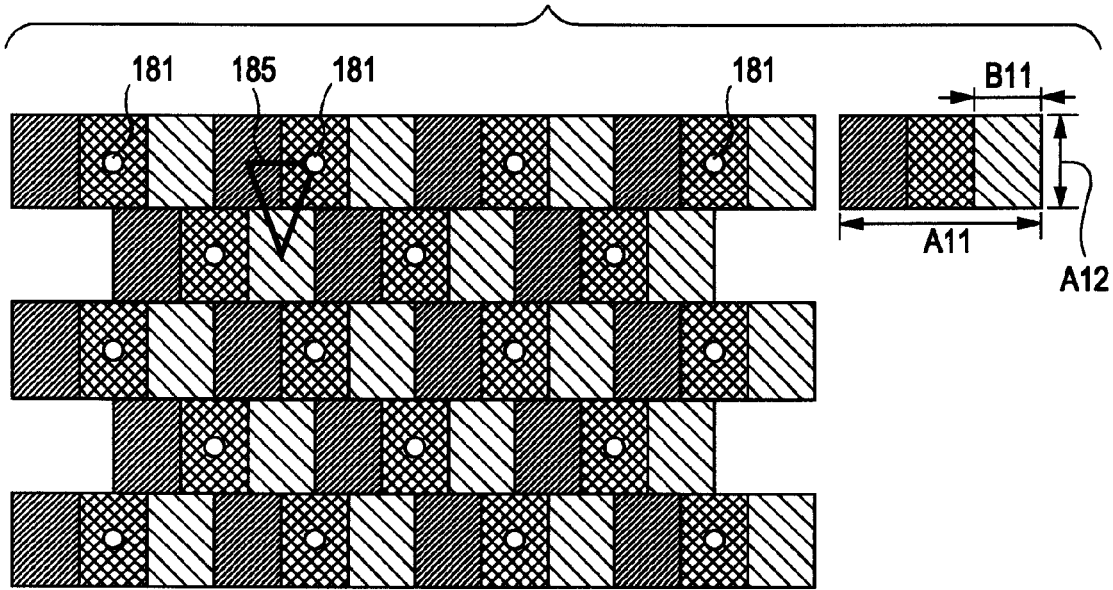

FIGS. 18A and 18B illustrate an example of a case where the display pixel arrangement having three RGB pixels is changed. In FIG. 18A, small black dots 180 in a lattice-like form correspond to points of input data. If the display unit 23z is a VGA-size display, there are 480×640 black dots 180. The arrows in FIG. 18A indicate the inputs of the data line drive signals and the scanning line drive signals, and white dots 181 are points of input data after the display pixel arrangement is changed (such points are also referred to as "sample points").

The re-sampling circuit 11a changes the number of pixels in the horizontal direction so that the pixels can match the display pixel arrangement of the display unit 23z. In this case, the pitch A11 of the white dot 181 (in other words, the horizontal length of a display pixel) is doubled so that the number of display pixels is reduced to one half that. More specifically, when the vertical length A12 of a display pixel is 1.0, the horizontal length A11 of the display pixel becomes 2.0 (A11=A12×2=2.0). The sample points are vertically displaced from each other by half a pitch (A11/2). In this manner, images can be displayed without the considerable loss in the quality even if the number of pixels in the horizontal direction is reduced.

The display pixel arrangement using the three colors is specifically discussed below with reference to FIG. 18B. In this case, each display pixel has three sub-pixels, and since the horizontal pitch A11 of a display pixel is 2.0, the horizontal width of a sub-pixel is 0.667 (B11=A11/3=0.667) (see at the right portion of FIG. 18B). The left portion of FIG. 18B shows that the display pixels are vertically displaced from each other by half a pitch (A11/2). Accordingly, the same types of sub-pixels are also displaced from each other by A11/2. When considering the display pixel arrangement in units of sub-pixels, the sub-pixels are displayed from each other by B11/2. In the display unit 23z having the three colors, when looking at one set of three colors over two lines, the three colors are positioned at the vertices of an inverted triangle as indicated by reference numeral 185. Upon receiving an output of the re-sampling circuit 11a, a data control circuit (not shown) adjusts the output timing of the data line drive signals and the scanning line drive signals to the data lines and the scanning lines to suitably control the data line drive circuit 21 and the scanning line drive circuit 22, respectively. As a result, the image display device 101 can implement suitable display in accordance with the changed display pixel arrangement.

The display pixel arrangements in the third embodiment are specifically discussed below with reference to FIGS. 19A through 211B.

Figure 19A:
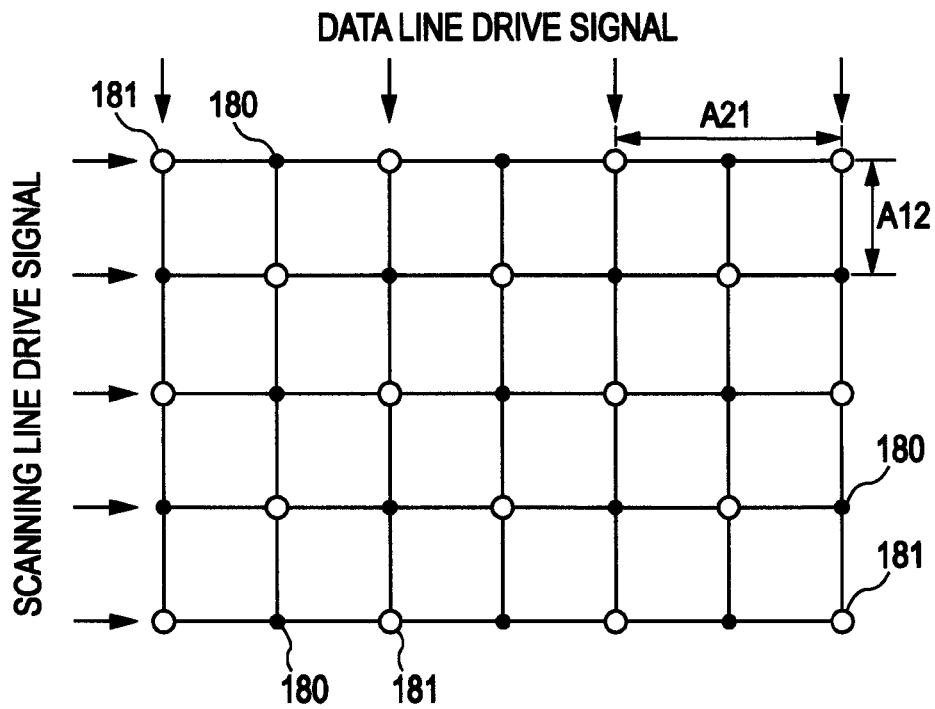
FIGS. 19A and 19B illustrate the display pixel arrangement according to a first example of the third embodiment.
Figure 19B:
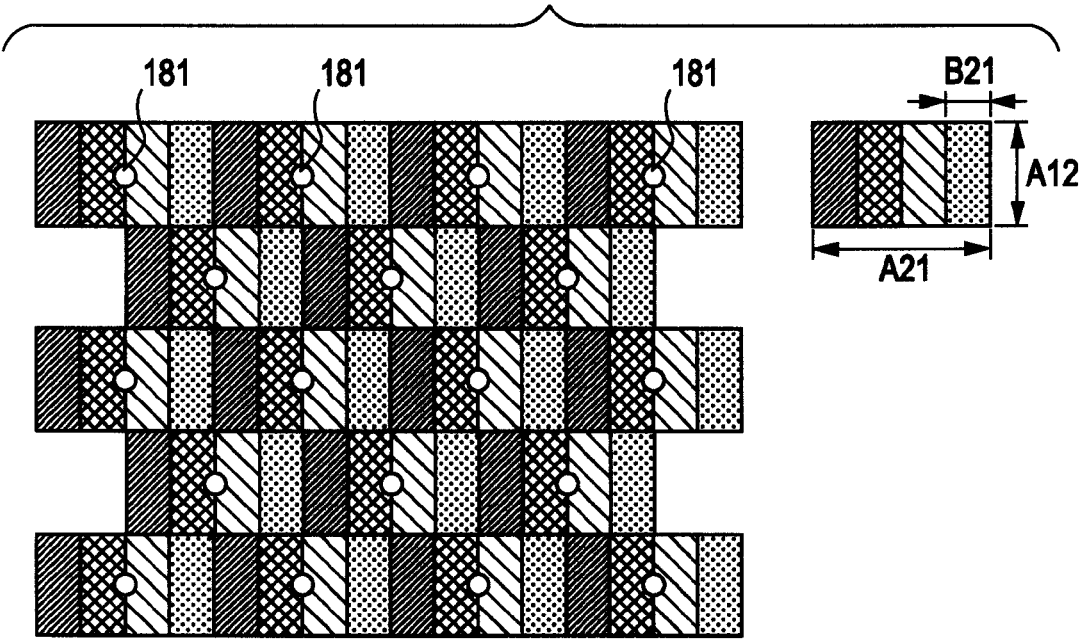

FIGS. 19A and 19B illustrate a first example of the display pixel arrangement in the third embodiment. FIG. 19A shows that the re-sampling conditions are similar to those shown in FIG. 18A. That is, when the vertical width A12 of a display pixel is 1.0, the horizontal length A21 of the display pixel is 2.0 (A21=A12×2=2.0). In this case, inputs and outputs into and from the re-sampling circuit 11a are three color signals although the display unit 23z has four colors. Accordingly, the three colors are converted into the four colors in the color conversion circuit 12. FIG. 19B illustrates the display pixel arrangement. The right portion of FIG. 19B shows that the horizontal width B21 of a sub-pixel is 0.5 (B21=A21/4=0.5). The left portion of FIG. 19B shows that the display pixels are vertically displaced from each other by half a pitch (A21/2), and thus, the same types of sub-pixels are also vertically displaced from each other by A21/2. When considering the display pixel arrangement in units of sub-pixels, the sub-pixels are not vertically displaced from each other, unlike the case where each pixel is formed of three colors (see FIG. 18B). In other words, the boundaries of the sub-pixels in one line are vertically the same as those of the sub-pixels in another line.

In the display unit 23z having the display pixel arrangement shown in FIGS. 19A and 19B, when the input data has a VGA size, the number of re-sampled display pixels becomes 480×320. In this case, the number of horizontal sub-pixels is 1280 (320×4=1280). The image display device 101 shown in FIG. 17 uses the display unit 23z having the display pixel arrangement shown in FIGS. 19A and 19B. Accordingly, the data line drive circuit 21 supplies the data line drive signals X1 through X1280 to the 1280 data lines. In contrast, in the image display device 100 having a stripe pattern (see FIG. 1), the number of outputs from the data line drive circuit 21 to the display unit 23z is 2560 (640×4=2560). Accordingly, the use of the display pixel arrangement of the first example makes it possible to reduce the number of outputs from the data line drive circuit 21 to the display unit 23z while the number of inputs remains the same. As a result, the cost of the image display device 101 can be reduced.

Figure 20A:
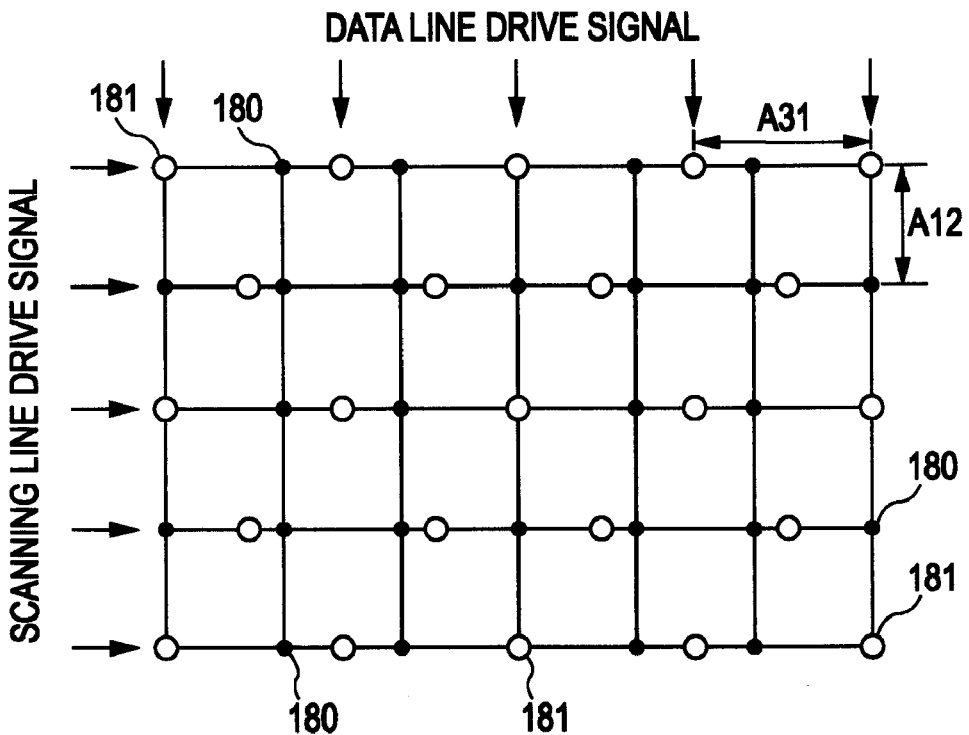
FIGS. 20A and 20B illustrate the display pixel arrangement according to a second example of the third embodiment.
Figure 20B:
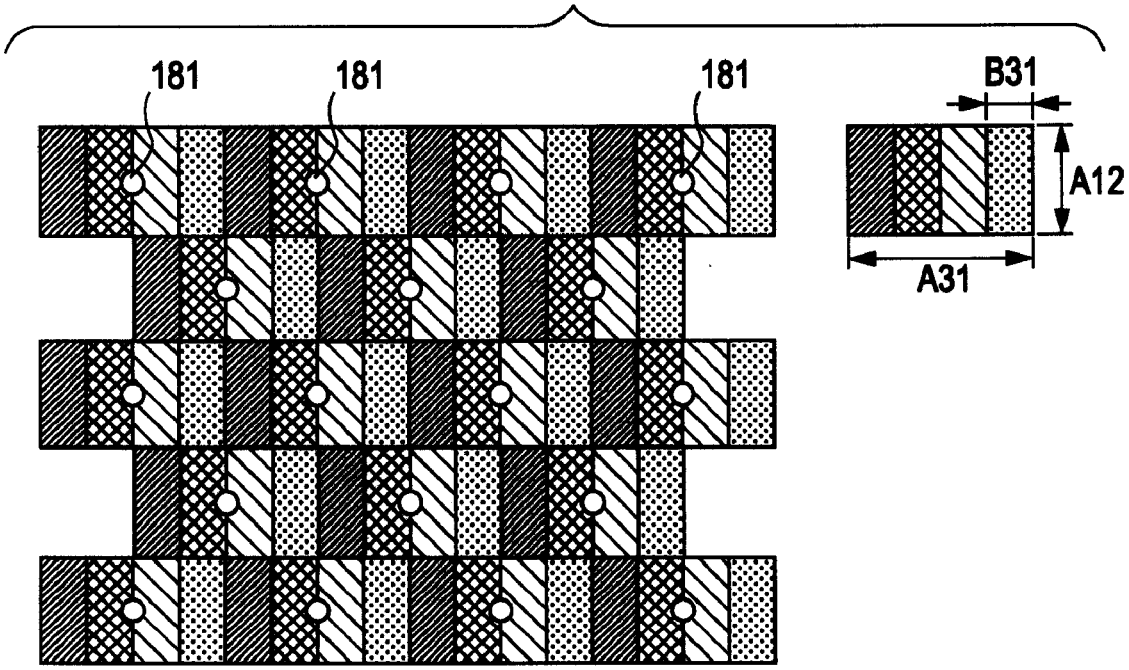

FIGS. 20A and 20B illustrate a second example of the display pixel arrangement in the third embodiment. FIG. 20A shows that, when the vertical width A12 of a display pixel is 1.0, the horizontal length A31 of the display pixel is 1.5 (A31=A12×1.5=1.5). FIG. 20B illustrates the display pixel arrangement. The right portion of FIG. 20B shows that the horizontal width B31 of a sub-pixel is 0.375 (B31=A31/4=0.375). The left portion of FIG. 20B shows that the display pixels are vertically displaced from each other by half a pitch (A31/2), and thus, the same types of sub-pixels are also vertically displaced from each other by A31/2. When considering the display pixel arrangement in units of sub-pixels, the sub-pixels are not vertically displaced from each other. Accordingly, the use of the display pixel arrangement of the second example makes it possible to reduce the number of outputs from the data line drive circuit 21 while the number of inputs remains the same. As a result, the cost of the image display device 101 can be reduced.

Figure 21A:
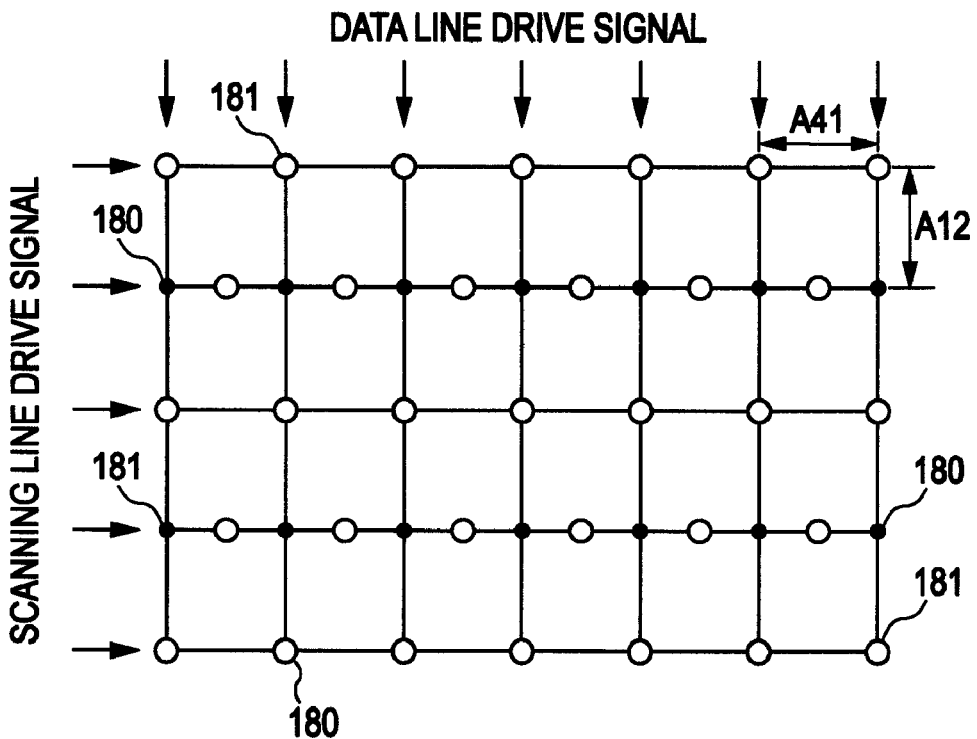
FIGS. 21A and 21B illustrate the display pixel arrangement according to a third example of the third embodiment.
Figure 21B:
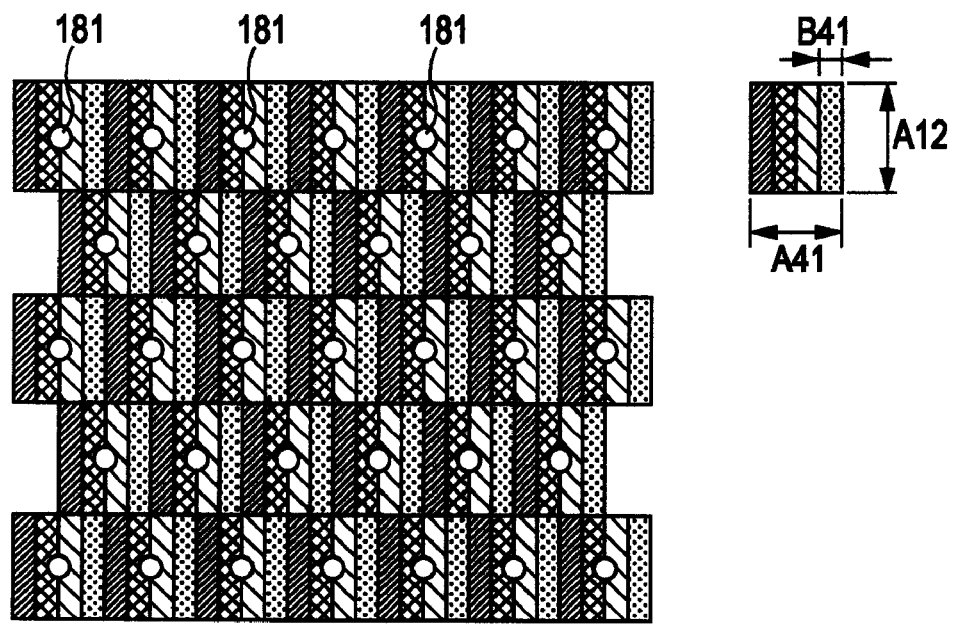

FIGS. 21A and 21B illustrate a third example of the display pixel arrangement in the third embodiment. FIG. 21A shows that, when the vertical length A12 of a display pixel is 1.0, the horizontal length A41 of the display pixel is 1.0 (A41=A12× 1.0=1.0). FIG. 21B illustrates the display pixel arrangement. The right portion of FIG. 21B shows that the horizontal width B41 of a sub-pixel is 0.25 (B41=A41/4=0.25). The left portion of FIG. 21B shows that the display pixels are vertically displaced from each other by half a pitch (A41/2), and thus, the same types of sub-pixels are also vertically displaced from each other by A41/2. When considering the display pixel arrangement in units of sub-pixels, the sub-pixels are not vertically displaced from each other. Accordingly, by using the display pixel arrangement of the third example, the number of outputs from the data line drive circuit 21 to the display unit 23z is the same as that of the image display device 100 having the display unit 23 using a stripe pattern (see FIG. 2). However, since the display pixels are vertically displaced from each other by half a pitch, the apparent resolution in the horizontal direction is enhanced.

In the display pixel arrangements of the first through third examples, for the locations of the sub-pixels forming each display pixel, the sub-pixel locations determined by the sub-pixel locating processing of the first or second embodiment may be used. That is, also in a case where the display pixels are displaced from each other by half a pitch, the locations of the RGBC sub-pixels or the RGBW sub-pixels can be determined by fully considering the visual characteristics. More specifically, when the four RGBC colors are used, the pixel locations determined by the sub-pixel locating processing of the first embodiment are used, and when the four RGBW colors are used, the pixel locations determined by the sub-pixel locating processing of the second embodiment are used.

Accordingly, the sub-pixel locating processing of the first embodiment or the second embodiment can be applied to the display pixel arrangements discussed in the third embodiment. The reason for this is as follows. The number of inputs into and outputs from the re-sampling circuit 11a of the image display device 101 of the third embodiment is three, and thus, the re-sampling circuit 101 produces very little influence on four colors. Accordingly, when the image display device 101 displays a black and white pattern using four colors, it can be operated exactly the same as the image display device 100 of the first or second embodiment. In the third embodiment, since the horizontal width of a sub-pixel is different from that of the first or second embodiment, the filtering characteristics reflecting the visual characteristics become different, and yet, the degrees of errors depending on the locations of sub-pixels can be reflected as they are. Thus, the sub-pixel locations determined by the sub-pixel locating processing of the first or second embodiment can be used for the display pixel arrangements of the third embodiment.

As described above, according to the third embodiment in which the display pixels are vertically displaced from each other by half a pitch, color component errors in a display image can be reduced, and also, the color breakup phenomenon recognized under visual observation can be decreased.

In the third embodiment, the horizontal length of a display pixel (pitch of a display pixel) is changed, such as A21=2.0, A31=1.5, and A41=1.0. However, the invention is not restricted to such lengths, and may use other lengths to form different display pixel arrangements.

Fourth Embodiment

A fourth embodiment of the invention is described below. In the fourth embodiment, the composition of the multiple colors is different from that of the first embodiment. More specifically, in the fourth embodiment, instead of green (G), yellowish green is used, and also, instead of cyan (C), emerald green is used. That is, colors are represented by red, yellowish green, blue, and emerald green, which are also referred to as "R", "YG", "B", and "EG", respectively. In the fourth embodiment, an image display device similar to the image display device 100 is used, and an explanation thereof is thus omitted.

FIGS. 24A through 24D illustrate examples of display characteristics of the display unit 23. More specifically, FIG. 24A is a diagram illustrating the spectral characteristics of the color filter 23c of the display unit 23 in which the horizontal axis represents the wavelength (nm) and the vertical axis indicates the transmission factor (%). The spectral characteristics shown in FIG. 24A show that the spectral bandwidths of YG and EG are narrower than those of G and C, respectively, of the first embodiment. FIG. 24B is a diagram illustrating the light emission characteristic of the light source of the backlight unit 23i in which the horizontal axis indicates the wavelength (nm) and the vertical axis represents the relative luminance. FIG. 24C is a diagram illustrating the transmission characteristics of the four R, YG, B, and EG colors. In FIG. 24C, the horizontal axis indicates the wavelength (nm) and the vertical axis designates the relative luminance. FIG. 24D is a diagram illustrating tristimulus values of the four colors with respect to the light emission characteristics of the four colors, the tristimulus values being calculated and plotted on an xy chromaticity diagram.

The sub-pixel locating method according to the fourth embodiment is as follows. Also in the fourth embodiment, two sub-pixels having smaller luminance levels are located at the edges of a display pixel, and the two other sub-pixels are located at the central portion of the display pixel such that the absolute value of the difference between the luminance added value obtained from the adjacent sub-pixels located at the left edge and the luminance added value obtained from the adjacent sub-pixels at the right edge can be reduced.

FIG. 26 is a flowchart illustrating the sub-pixel locating processing on the R, YG, B, and EG sub-pixels. This processing is executed by a program read by a computer or a program recorded on a recording medium. The sub-pixel locating processing is executed, for example, when the image display device 100 is designed.

In step S401, XYZ values of each of the R, YG, B, and EG colors are input. The XYZ values of each of the R, YG, B, and EG colors can be determined by the spectral characteristics of the color filter 23c or the backlight unit 23i by simulations or actual measurement. Then, in step S402, the XYZ values are converted into a luminance and opponent-color space, and the luminance and opponent-color space is represented by Lum, R/G, and B/Y components.

In step S403, the locations of R, YG, B, and EG are determined based on the levels of luminance Lum obtained in step S402. More specifically, the levels of luminance Lum and the luminance added values of R, YG, B, and EG are obtained, for example, the tables shown in FIGS. 25A through 25C are obtained.

FIGS. 25A and 25B illustrate tables indicating specific examples of the luminance and luminance added values. In the table shown in FIG. 25A, the Lum component, the R/G component, and the B/Y component calculated from the XYZ values of each of the R, YG, B, and EG colors are indicated. In the table shown in FIG. 25B, the value obtained by adding the luminance levels of two colors (first color and second color) selected from the R, YG, B, and EG colors, i.e., the luminance added value, is indicated. In FIG. 25C, the upper part indicates the absolute value of the difference of the two luminance added values when BR (left set) and YG and EG (right set) are combined (i.e., the order is "B, R, YG, EG"), and the lower part indicates the absolute value of the difference of the two luminance added values when B and YG (left set) and R and EG (right set) are combined (i.e., the order is "B, YG, R, EG").

FIG. 25A shows that the luminance levels of B and EG are smaller than those of the other colors. FIG. 25C shows that the absolute value of the difference of the luminance added values is smaller when B and YG (left set) and R and EG (right set) are combined than that when BR (left set) and YG and EG (right set) are combined. Accordingly, it can be assumed that errors can be reduced if the order "B, YG, R, EG" is employed rather than the order "B, R, YG, EG".

Referring back to the flowchart in FIG. 26, in step S403, the locations of the R, YG, B, and EG sub-pixels are determined. Two sub-pixels having smaller levels of luminance Lum are located at the edges of a display pixel. If the results shown in FIG. 25A are obtained, the B and EG sub-pixels are located at the edges of the display pixel. Then, the luminance added value of the adjacent sub-pixels located at the left edge and the luminance added value of the adjacent sub-pixels located at the right edge are obtained, and the absolute value of the difference of the two luminance added values is calculated. That is, two absolute values calculated as described above depending on the combination of sub-pixels are obtained. Then, the combination of sub-pixels having a smaller absolute value is selected. More specifically, a combination of BR (left set) and YG and EG (right set) and a combination of B and YG (left set) and R and EG (right set) can be considered, and if the results shown in FIG. 25C are obtained, the combination of B and YG (left set) and R and EG (right set) having a smaller absolute value of the difference of the luminance added values is selected. Then, the pixel order "B, YG, R, EG" is determined. "B, YG, R, EG" and "EG, R, YG, B" are the same order. After step S403, the processing is completed.

According to the sub-pixel order "B, YG, R, EG" determined as described above, sub-pixel errors can be minimized, as in the first embodiment. That is, according to the sub-pixel locating processing of the fourth embodiment, the locations of the R, YG, B, and EG sub-pixels can be determined by fully considering the visual characteristics. By applying the locations of the sub-pixels to the image display device 100, luminance errors in display images can be reduced, and also, the edge blurring phenomenon recognized under visual observation can be decreased. Thus, the image display device 100 can display high-quality images.

Although in the above-described example the locations of the sub-pixels "B, YG, R, EG" are determined by the sub-pixel locating processing, the locations of the sub-pixels are not restricted to the locations described above. The locations selected in the above-described example are determined based on the results shown in FIGS. 25A through 25C, and if results other than those shown in FIGS. 25A through 25C are obtained, pixel locations different from the above-described locations are determined.

Fifth Embodiment

A fifth embodiment of the invention is described below. As in the fourth embodiment, in the fifth embodiment, four colors, such as R, YG, B, and EG, are used. The fifth embodiment is different from the fourth embodiment only in the spectral characteristics of the color filter 23c and the light emission characteristics of the four R, YG, B, and EG colors. Accordingly, the features of the fifth embodiment different from the fourth embodiment are discussed below.

Figure 27A:
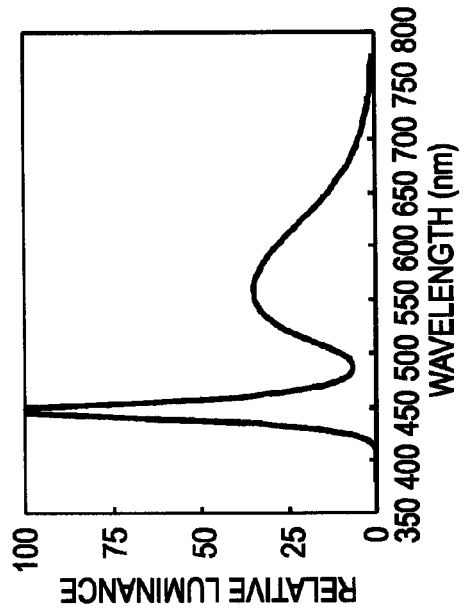
FIGS. 27A through 27D illustrate examples of the display characteristics of the display unit according to a fifth embodiment of the invention.
Figure 27B:
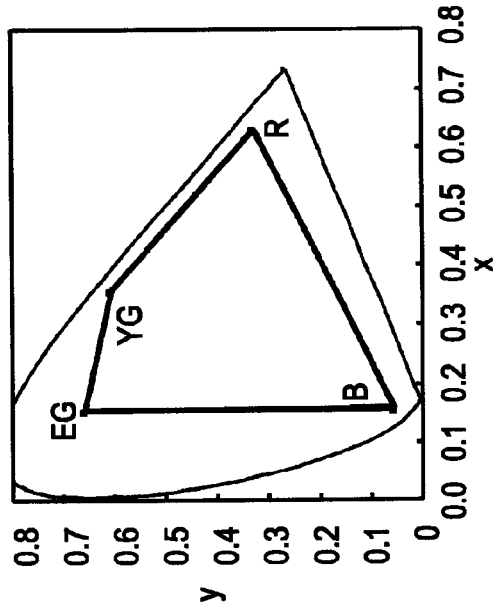
Figure 27C:
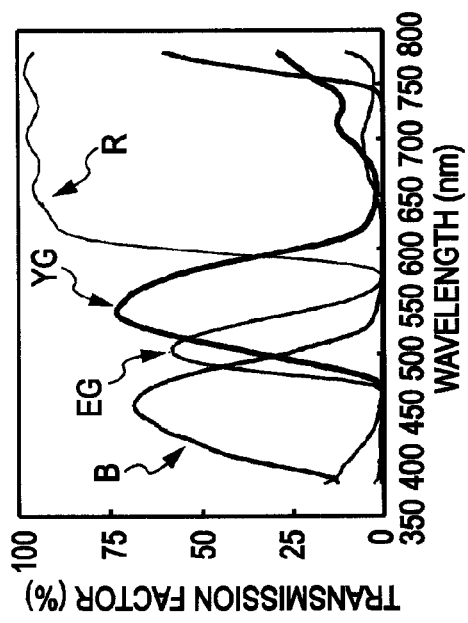
Figure 27D:
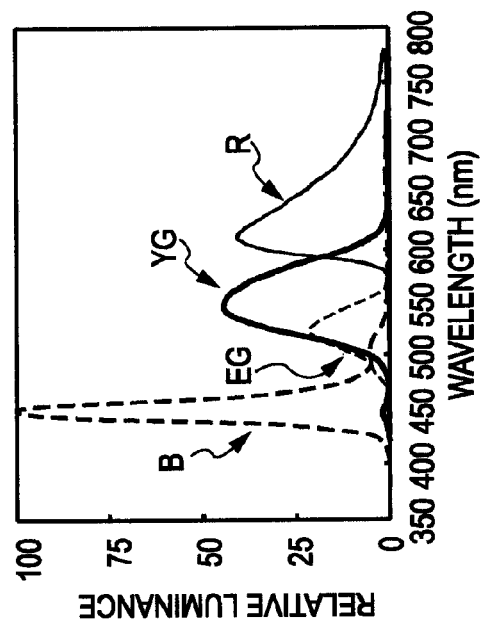

FIGS. 27A through 27D illustrate examples of display characteristics of the display unit 23. More specifically, FIG. 27A is a diagram illustrating the spectral characteristics of the color filter 23c of the display unit 23 in which the horizontal axis represents the wavelength (nm) and the vertical axis indicates the transmission factor (%). The spectral characteristics shown in FIG. 27A show that the spectral bandwidth of EG is narrower than that of C of the first embodiment. FIG. 27B is a diagram illustrating the light emission characteristic of the light source of the backlight unit 23i in which the horizontal axis indicates the wavelength (nm) and the vertical axis represents the relative luminance. FIG. 27C is a diagram illustrating the transmission characteristics of the four R, YG, B, and EG colors. In FIG. 27C, the horizontal axis indicates the wavelength (nm) and the vertical axis designates the relative luminance. FIG. 27D is a diagram illustrating tristimulus values of the four colors with respect to the light emission characteristics of the four colors, the tristimulus values being plotted on an xy chromaticity diagram.

The sub-pixel locating method according to the fifth embodiment is as follows. In the fifth embodiment, two sub-pixels having small luminance levels are located at the edges of a display pixel, and the two other sub-pixels are located at the central portion of the display pixel such that the absolute value of the difference between the luminance added value obtained from the adjacent sub-pixels located at the left edge and the luminance added value obtained from the adjacent sub-pixels located at the right edge can be reduced. The flowchart indicating the sub-pixel locating processing of the fifth embodiment is the same as that of the fourth embodiment.

In step S401, XYZ values of each of the R, YG, B, and EG colors are input. Then, in step S402, the XYZ values are converted into the luminance and opponent-color space, and the luminance and opponent-color space is represented by Lum, R/G, and B/Y components.

In step S403, the locations of the R, YG, B, and EG sub-pixels are determined based on the levels of luminance Lum obtained in step S402. More specifically, the luminance Lum and the luminance added values of R, YG, B, and EG are obtained. For example, the tables shown in FIGS. 28A through 28C are obtained. Two sub-pixels having smaller levels of luminance Lum are located at the edges of a display pixel. If the results shown in FIG. 28A are obtained, the B and EG sub-pixels are located at the edges of the display pixel. Then, the luminance added value of the adjacent sub-pixels located at the left edge and the luminance added value of the adjacent sub-pixels located at the right edge are obtained, and the absolute value of the difference between the two luminance added values is calculated. That is, two absolute values calculated as described above depending on the combination of sub-pixels are obtained. Then, the combination of sub-pixels having a smaller absolute value is selected. More specifically, a combination of BR (left set) and YG and EG (right set) and a combination of B and YG (left set) and R and EG (right set) can be considered, and if the results shown in FIG. 28C are obtained, the combination of B and YG (left set) and R and EG (right set) having a smaller absolute value of the difference of the luminance added values is selected. Then, the pixel order "B, YG, R, EG" is determined. "B, YG, R, EG" and "EG, R, YG, B" are the same order. After step S403, the processing is completed.

According to the sub-pixel locations, such as "B, YG, R, EG", determined as described above, sub-pixel errors can be minimized, as in the first embodiment. By applying the locations of the sub-pixels to the image display device 100, luminance errors in display images can be reduced, and also, the edge blurring phenomenon recognized under visual observation can be decreased. Thus, the image display device 100 can display high-quality images.

Sixth Embodiment

A sixth embodiment of the invention is described below. In the sixth embodiment, the composition of multiple colors is different from that of the first embodiment.

In the sixth embodiment, an image display device configured substantially the same as the image display device 100 is used, and an explanation thereof is thus omitted here. The sixth embodiment is different from the first embodiment in that the data line drive circuit 21 supplies data line drive signals to 3200 data lines.

Overall Configuration

In the sixth embodiment, the image display device 100 can display five colors, such as red, green, blue, emerald green, and yellow (hereinafter simply referred to as "R", "G", "B", "EG", and "Y").

The color conversion circuit 12 performs processing for converting the image data d1 from three colors into five colors. In this case, the color conversion circuit 12 performs image processing, such as color conversion, by referring to data stored in the table storage memory 15. Image data d2 subjected to image processing in the color conversion circuit 12 is written into the VRAM 13. The image data d2 written into the VRAM 13 is read out to the γ correction circuit 16 as image data d3 on the basis of the control signal d21 output from the address control circuit 14, and is also read out to the scanning line drive circuit 22 as the address data d4. The reason for supplying the image data d2 as the address data d4 is that the scanning line drive circuit 22 provides synchronization based on the address data. The γ correction circuit 16 performs γ correction on the obtained image data d3 by referring to the data stored in the table storage memory 15. The γ correction circuit 16 then supplies image data d5 subjected to γ correction to the data line drive circuit 21.

The data line drive circuit 21 supplies data line drive signals X1 through X3200 to the 3200 data lines. The scanning line drive circuit 22 supplies scanning line drive signals Y1 through Y480 to the 480 scanning lines. The data line drive circuit 21 and the scanning line drive circuit 22 drive the display unit 23 while being synchronized with each other. The display unit 23 is formed of a liquid crystal device (LCD) and displays images by using the five R, G, B, EG, and Y colors. The display unit 23 is a VGA-size display having 480×640-unit pixels (hereinafter referred to as "display pixels"), each pixel having a set of the five R, G, B, EG, and Y pixels (hereinafter such pixels are referred to as "sub-pixels"). Accordingly, the number of data lines is 3200 (640×5=3200). The display unit 23 displays images, such as characters or video, when a voltage is applied to the scanning lines and data lines.

Figure 29:
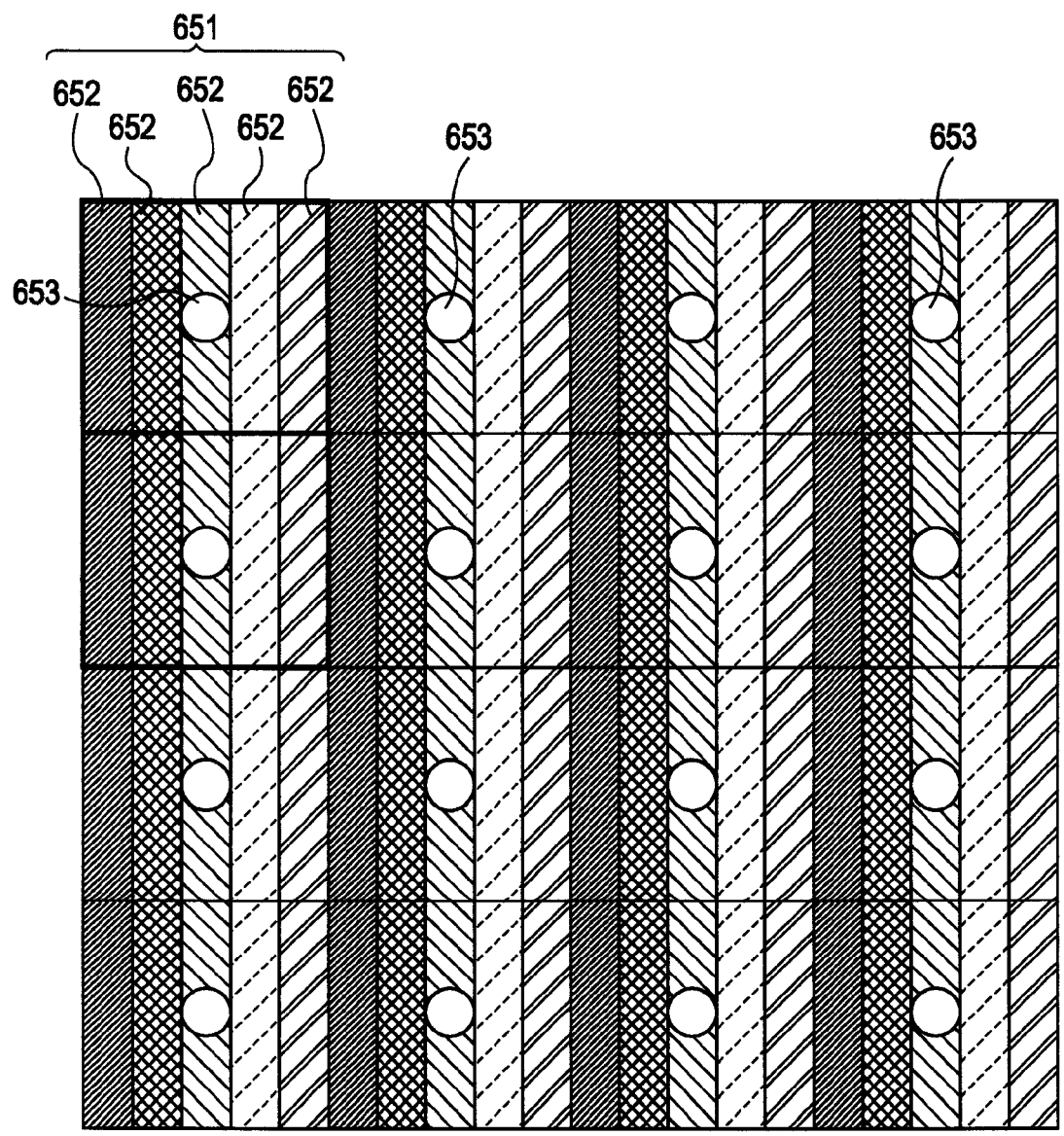
FIG. 29 is a schematic diagram illustrating enlarged pixels of a display unit of a image display device according to a sixth embodiment of the invention.

FIG. 29 is a schematic diagram illustrating the enlarged pixels of the display unit 23. White circles 653 indicate the positions of display pixels 651, and R, G, B, EG, and Y sub-pixels 652 are distinguished by different patterns of hatching. In this case, a plurality of columns of the display pixels 651 are disposed such that the same color is continuously arranged in the vertical direction, i.e., the display pixels 651 are disposed in a stripe pattern. The aspect ratio of the display pixels 651 is 1:1. Accordingly, when the length of the sub-pixel 652 in the vertical direction is 1, the width of the sub-pixel 652 in the horizontal direction becomes 0.2. In this specification, as stated above, the vertical direction is the direction orthogonal to the scanning direction, and the horizontal direction is the direction parallel to the scanning direction. Details of specific locations of the sub-pixels 652 and a method for determining the locations of the sub-pixels 652 are described below.

FIGS. 30A through 30D illustrate examples of display characteristics of the display unit 23. More specifically, FIG. 30A is a diagram illustrating the spectral characteristics of the color filter 23c of the display unit 23 in which the horizontal axis represents the wavelength (nm) and the vertical axis indicates the transmission factor (%). FIG. 30B is a diagram illustrating the light emission characteristic of the light source of a backlight unit composed of a white LED as a combination of a fluorescent lamp and a blue LED. In FIG. 30B, the horizontal axis indicates the wavelength (nm) and the vertical axis represents the relative luminance. FIG. 30C is a diagram illustrating the spectral characteristics of the R, G, B, EG, and Y sub-pixels. In FIG. 30C, the horizontal axis indicates the wavelength (nm) and the vertical axis designates the relative luminance. FIG. 30D is a diagram illustrating the chromaticity of the five colors corresponding to the light emission characteristics of the five colors, the chromaticity values being plotted on an xy chromaticity diagram. The colors that can be reproduced by the display unit 23 are restricted to the range surrounded by the pentagon indicated in the diagram of FIG. 30D, and the pentagon corresponds to the color reproduction region of the display unit 23, and the vertices of the pentagon correspond to the five R, G, B, EG, and Y colors. Color reproduction is conducted by using the additive color mixture of the five R, G, B, EG, and Y colors, and then, sharper and wider-range colors can be reproduced compared with the color reproduction obtained by using the three colors.

Sub-pixel Error Checking Method

In the sixth embodiment, the five R, G, B, EG, and Y sub-pixels are located by fully considering the influence of the pixel locations on the visual characteristics. The visual characteristics to be taken into consideration when determining the locations of the sub-pixels are described first, in other words, the influence on the visual characteristics when the locations of the sub-pixels are changed is described first.

To check the influence of the pixel locations on the visual characteristics, the sub-pixel error checking processing is performed. In this processing, errors occurring in a reproduction image with respect to an original image are checked. The "original image" is an image how an ideal display portion formed by mixing a plurality of different colors in a color space without using sub-pixels can be observed by the human eye at a distance X. The "reproduction image" is an image how a display portion using the five R, G, B, EG, and Y sub-pixels can be observed by the human eye at a distance X.

In an image display device using sub-pixels, the pixels are disposed in a matrix, and light components having a plurality of different colors are emitted from adjacent pixels and are mixed so that a desired color can be reproduced and recognized by an observer as the desired color. In this case, depending on the locations of the pixels, edge blurring or color breakup (false color) may occur due to the visual characteristics. Accordingly, by performing the sub-pixel error checking processing, errors, such as the levels of edge blurring or color breakup, are checked. In this case, the errors are represented by the differences of L*, u*, and v* components between the original image and the reproduction image.

Figure 31:
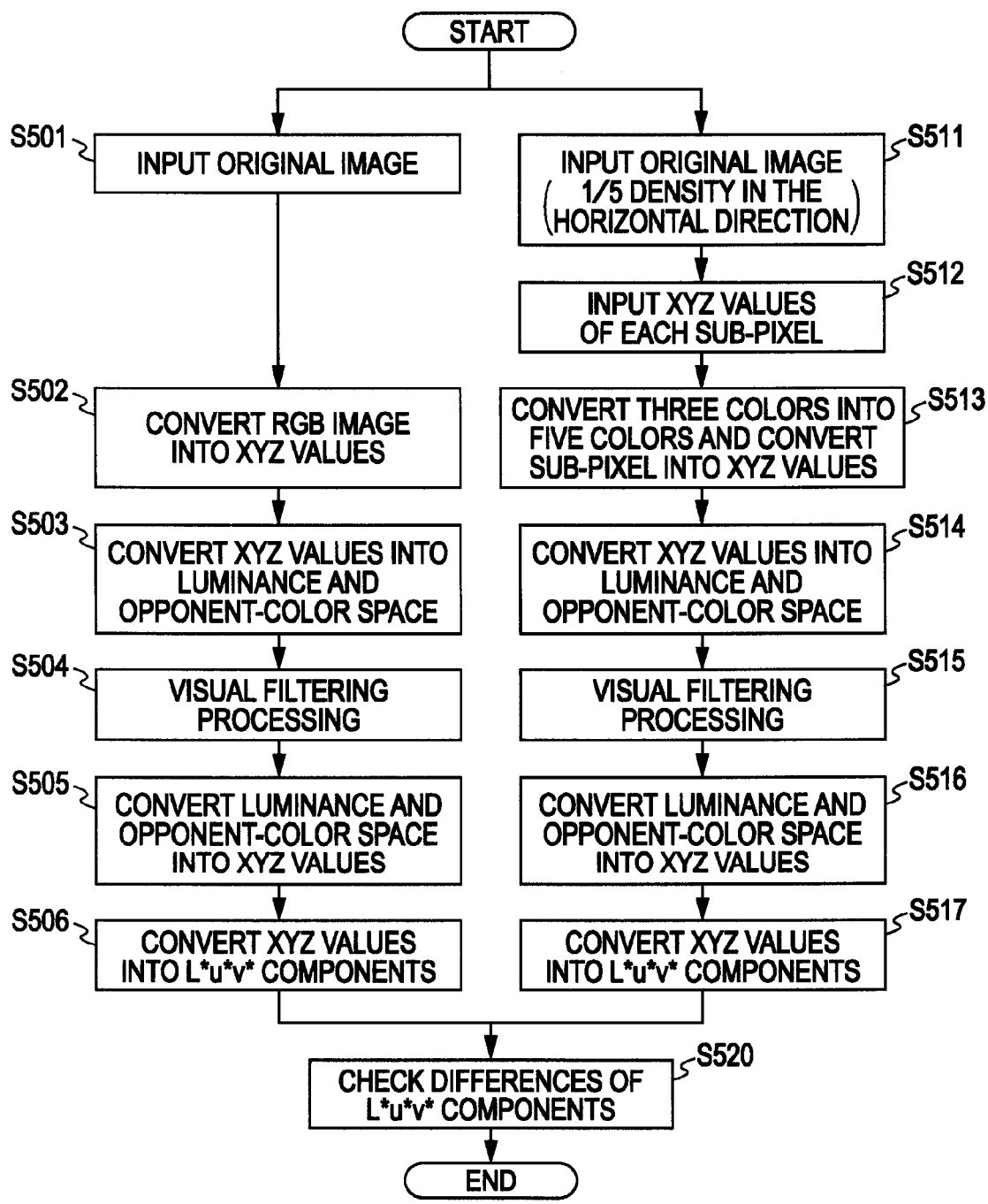
FIG. 31 is a flowchart illustrating sub-pixel error checking processing according to the sixth embodiment.

FIG. 31 is a flowchart illustrating the sub-pixel error checking processing executed by, for example, a computer.

The generation of an original image is discussed first. In step S501, an RGB image is input as an original image. Then, in step S502, the RGB image is converted into XYZ values. In step S503, the XYZ values are converted into a luminance and opponent-color space, and the luminance and opponent-color space is represented by Lum, R/G, and B/Y components. For converting the XYZ values, a known conversion method can be used. Then, in step S504, in the luminance and opponent-color space, filtering processing in accordance with the visual characteristics is performed, and details thereof are given below. In step S505, the luminance and opponent-color space of each color is converted into the XYZ values. Then, in step S506, the XYZ values are converted into L*u*v* components. As a result, an original image is generated.

Then, the generation of a reproduction image is discussed. In step S511, an original image having a ⅕ density in the horizontal direction is input. Then, in step S512, XYZ values of each color are input. The XYZ values of each color can be determined by the spectral characteristics of the color filter 23c or the backlight unit 23i by simulations or actual measurement. In step S513, the three RGB colors are converted into the five R, G, B, EG, and Y colors by using the XYZ values of each color so that one pixel is decomposed into five sub-pixels in accordance with the candidates for the locations of the R, G, B, EG, and Y sub-pixels, and the five sub-pixels are converted into XYZ values. Then, in step S514, the XYZ values are converted into the luminance and opponent-color space. In step S515, in the luminance and opponent-color space, filtering processing in accordance with the visual characteristics is performed. In step S516, the luminance and opponent-color space is converted into the XYZ values. Then, in step S517, the XYZ values are converted into $L^*u^*v^*$ components. As a result, a reproduction image is generated.

Subsequently, in step S520, the differences of the $L^*$, $u^*$, $v^*$ components between the original image and the reproduction image are checked. After step S520, the processing is completed.

Figure 32:
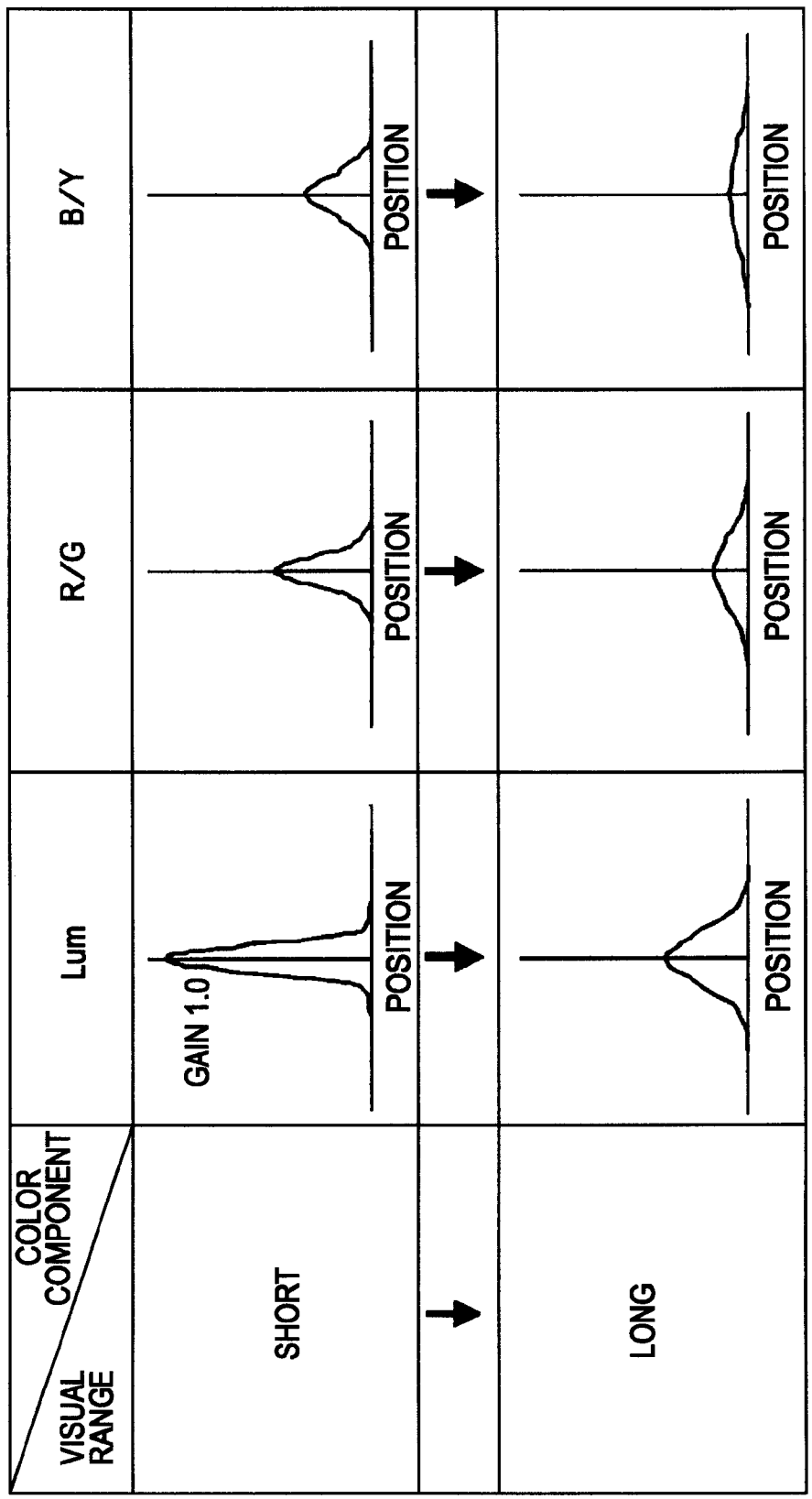
FIG. 32 illustrates the filtering characteristics with respect to the luminance/opponent-color components.

FIG. 32 illustrates the filtering characteristics with respect to the luminance/opponent-color components. In FIG. 32, the leftmost graphs indicate Lum components, the central graphs indicate R/G components, and the rightmost graphs indicate B/Y components. In all the graphs, the horizontal axis represents the position of an image, and the vertical axis designates a weight (more specifically, the relative value when the Lum component in a short visual range is 1). The upper graphs indicate the filtering characteristics when the visual range is short, and the lower graphs indicate the filtering characteristics when the visual range is long. FIG. 32 shows that the filtering characteristics have different amplitude characteristics and spreading widths for the luminance component and the opponent color components. The filtering characteristics are changed in accordance with the visual range since they are associated with the visual characteristics. FIG. 32 also shows that the amplitude of the R/G component is larger than that of the B/Y component.

Figure 33A:
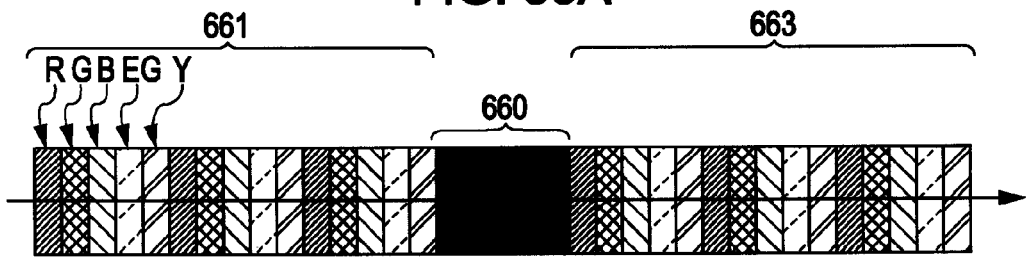
FIGS. 33A through 33D illustrate examples of the results obtained by the sub-pixel error checking processing.

FIGS. 33A through 33D illustrate examples of the results of the sub-pixel error checking processing indicated by the flowchart in FIG. 31. FIG. 33A illustrates a spatial pattern used for the sub-pixel error checking processing. More specifically, display pixels, each being arranged in the order of R, G, B, EG, and Y, are used, and a display pixel 660 positioned at the center of the spatial pattern is turned OFF (total shielding), while display pixel sets 661 and 663, each pixel set being positioned on either side of the display pixel 660, are turned ON (total transmission). That is, the spatial pattern in which the central portion is displayed in black and the portions horizontally next to the central portion are displayed in white (hereinafter such a pattern is referred to as the "black and white pattern"). In this specification, the pixel location of "R, G, B, EG, and Y" of sub-pixels means that the sub-pixels are located in the order of R, G, B, EG, and Y from the left to the right or from the right to the left. The pixel location "Y, EG, B, G, and R, which is reversed from R, G, B, EG, and Y, is the same as the pixel location R, G, B, EG, and Y.

Figure 33B:
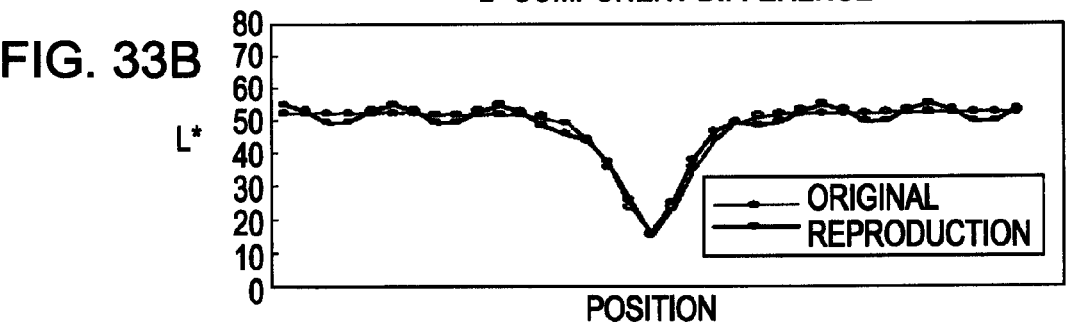
Figure 33C:
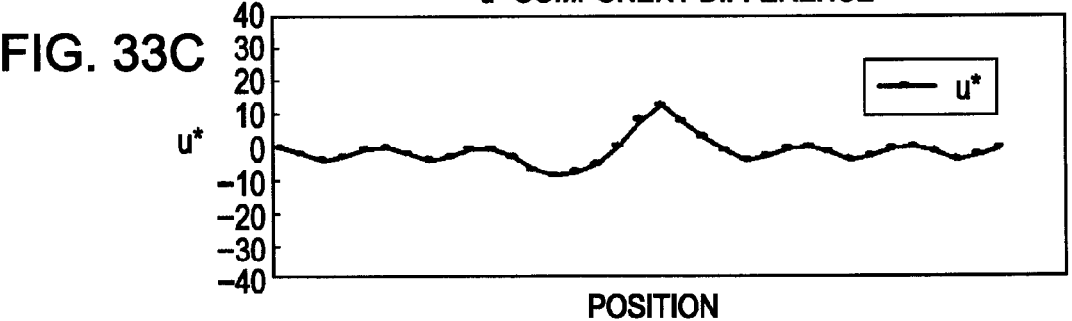
Figure 33D:
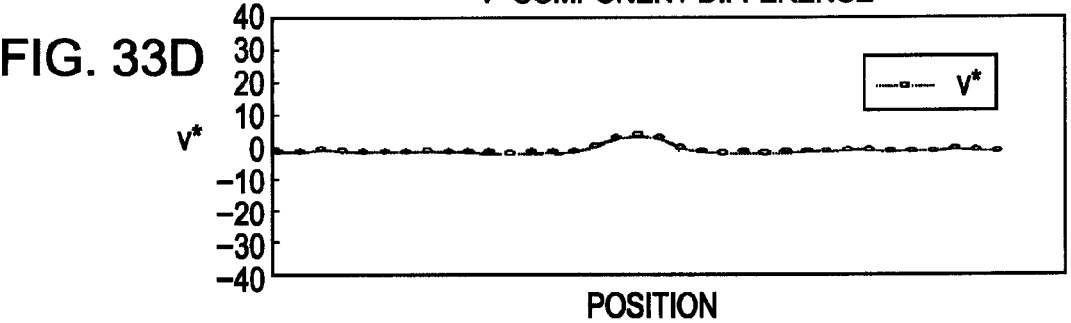

In FIGS. 33B, 33C, and 33D, the horizontal axes designate the position of the image having the black and white pattern shown in FIG. 33A, and the vertical axes represent $L^*$ component, $u^*$ component, and $v^*$ component, respectively. In FIG. 33B, the original image in which a plurality of different colors are fully mixed in a color space without using sub-pixels is also shown. FIG. 33B reveals that the luminance slopes of the black pixel 660 around the edges become different from that of the other portions of the black pixel 660 by being influenced by the surrounding sub-pixels. As the luminance slope becomes smaller, edge blurring becomes increased. Additionally, as the value obtained by adding the differences of the $L^*$ components between the original image and the reproduction image becomes greater, the luminance slope of the black pixel 660 around the edges becomes smaller, and also, the contrast (the difference between the maximum luminance and the minimum luminance) becomes lower, thereby increasing edge blurring. FIGS. 33C and 33D show that both the $u^*$ components and $v^*$ components, respectively, are increased by being influenced by the surrounding sub-pixels, thereby causing color breakup.

By taking the results and assumptions shown in FIGS. 31 through 33D into consideration, the sub-pixel locating processing is performed on candidates for the pixel order of the five R, G, B, EG, and Y sub-pixels.

Figure 34:
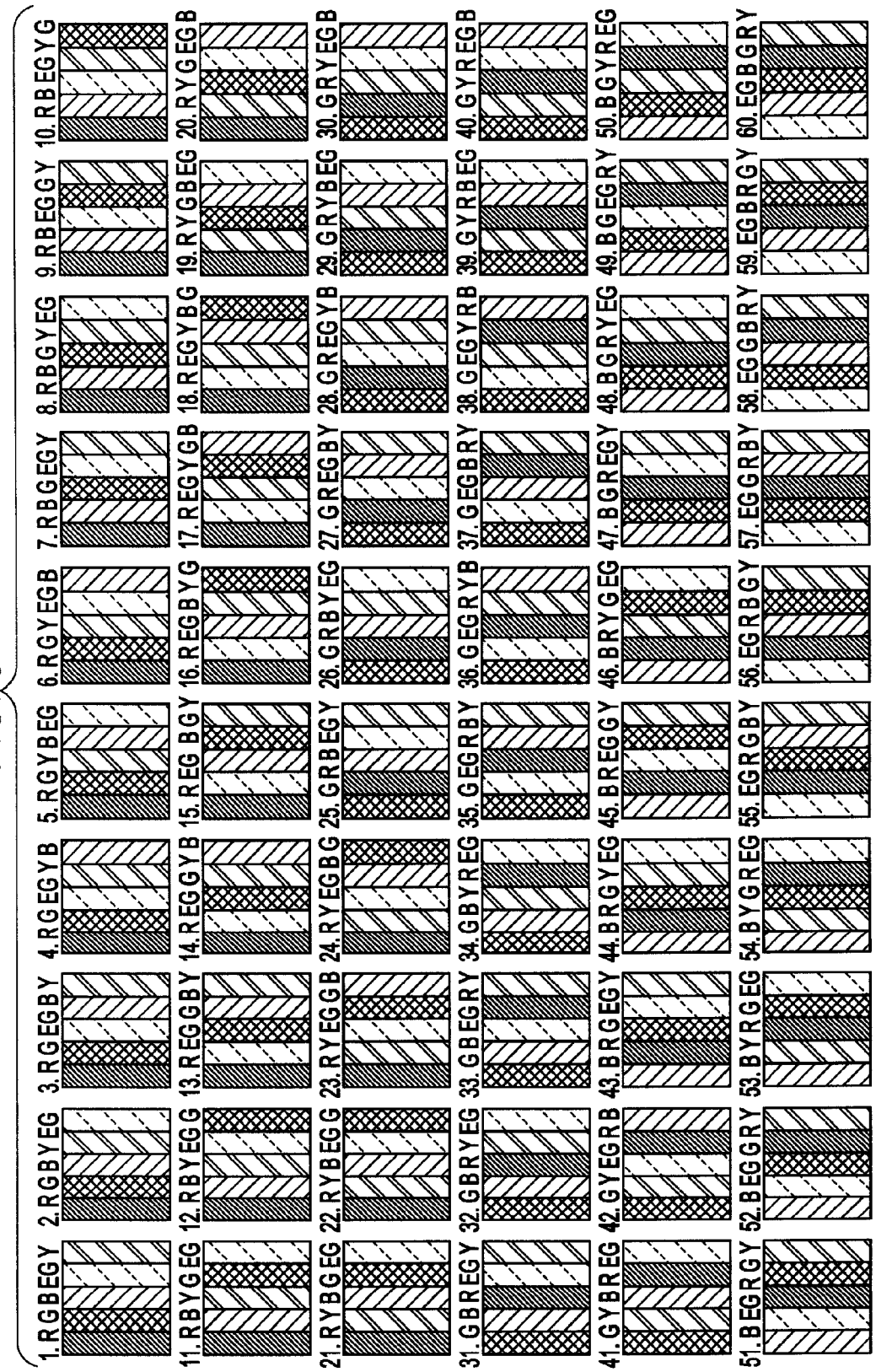
FIG. 34 illustrates candidates for the pixel order of R, G, B, EG, and Y sub-pixels.

FIG. 34 illustrates candidates for the order of the five R, G, B, EG, and Y sub-pixels. In this case, although the number of combinations of the R, G, B, EG, and Y sub-pixels is 120 (5×4×3×2×1=120), the actual number becomes one half that, i.e., 60, if the horizontal symmetrical characteristic is considered. That is, for example, "R, G, B, EG, and Y" and "Y, EG, B, G, and R" are considered to be the same order.

Figure 35:
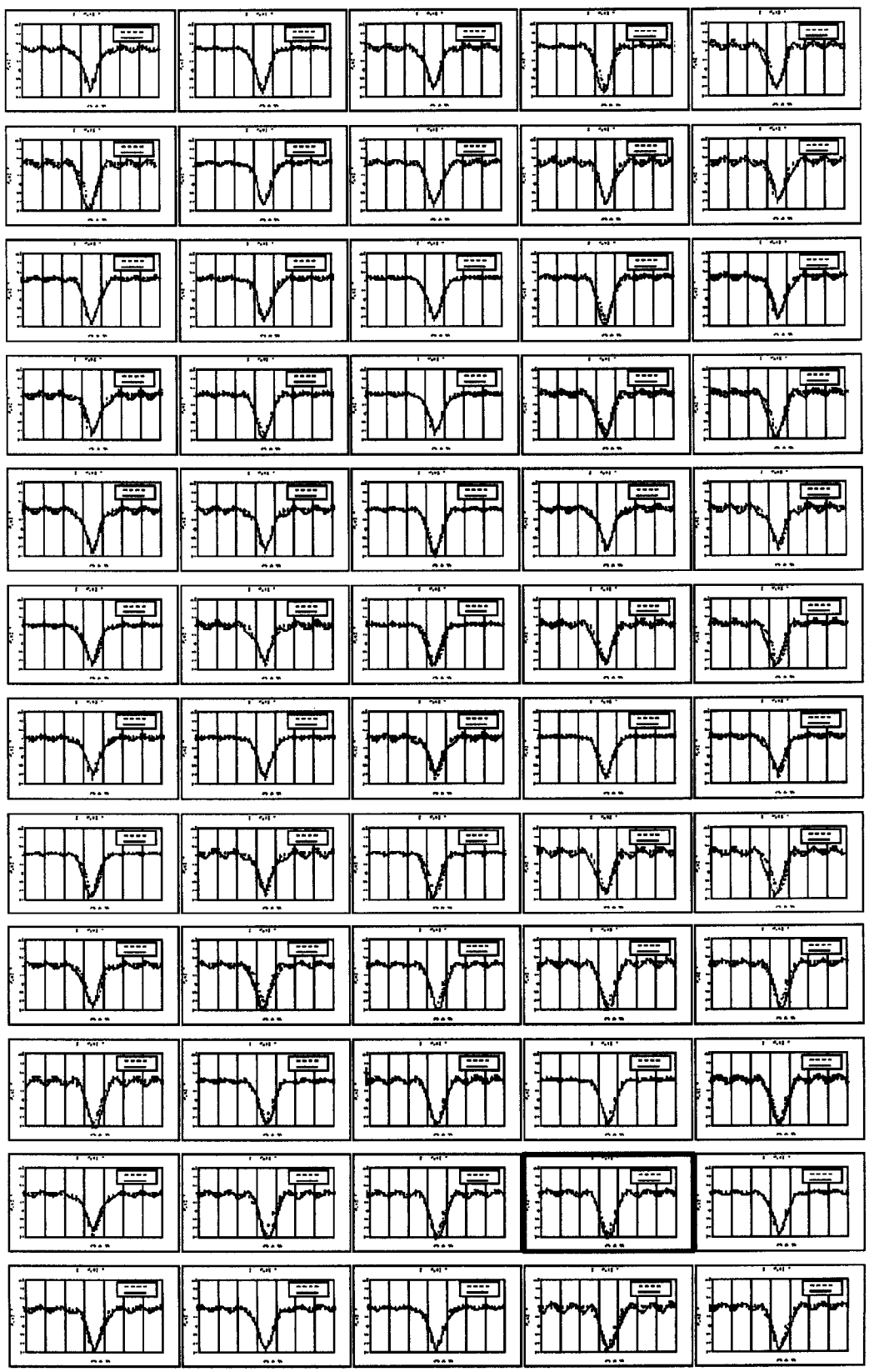
FIG. 35 illustrates the results obtained from the sub-pixel error checking processing performed on the 60 candidates shown in FIG. 34.

FIG. 35 illustrates the results of the sub-pixel error checking processing performed on the 60 candidates shown in FIG. 34. In the graphs shown in FIG. 35, the horizontal axes each indicate the position of a black and white pattern image, and the vertical axes represent the $L^*$ components. In each graph, both the original image and the reproduction image are shown. FIG. 35 shows that, when the pixel location "B, Y, G, R, EG" (the graph surrounded by the thick lines in FIG. 35) is selected, the value obtained by adding the differences of the $L^*$ components between the original image and the reproduction image is relatively small.

Sub-pixel Locating Method

The sub-pixel locating method according to the sixth embodiment is discussed below. In the sixth embodiment, sub-pixels are located in accordance with a first condition, a second condition, and a third condition discussed below.

The first condition is that sub-pixels having smaller levels of luminance are located at the edges of a display pixel. The reason for this is as follows. It can be assumed that, when performing filtering processing reflecting the visual characteristics on the black and white pattern shown in FIG. 33A, the $L^*$ component differences around the edges of the black portion can be decreased if sub-pixels having small luminance levels are located at the edges of a display pixel composed of five sub-pixels. In other words, if the luminance of sub-pixels located at the edges of a display pixel is high, the luminance becomes increased when a white color is displayed, and as a result of filtering processing on the white color and the black color, the luminance, which causes edge blurring, is increased.

The second condition is that sub-pixels are located such that the luminance of the sub-pixels is increased from the edges toward the center of a display pixel. The reason for this is that sub-pixels located closer to the edges of a display pixel, which may be the interfaces between a black portion and a white portion, produce a greater influence on the luminance slope due to the configuration of a visual filter. In this manner, by locating sub-pixels such that the luminance of the sub-pixels is increased from the edges toward the center of a display pixel, the value obtained by adding the $L^*$ component differences around the edges of a black portion around a white portion can be decreased, and the luminance slope can be increased.

The third condition is that sub-pixels are located such that the difference between the luminance added value of the adjacent sub-pixels located at the left edge and the luminance added value of the adjacent sub-pixels located at the right edge can be decreased. The reason for this is as follows. If the difference of the two luminance added values is large, edge blurring occurs only at one edge. That is, by decreasing the difference of the luminance added value between the left edge and the right edge of a display pixel, the luminance slopes at the left and right edges can be maintained substantially at the same degree.

FIGS. 36A through 36C illustrate tables specifically indicating the luminance and luminance added values of R, G, B, EG, and Y. More specifically, FIG. 36A indicates the Lum, R/G and B/Y components determined from the XYZ values of each of the R, G, B, EG, and Y colors. FIG. 36B illustrates the value obtained by adding the luminance levels of two colors (first color and second color) selected from the R, G, B, EG, and Y colors, i.e., the luminance added value, is indicated. In FIG. 36C, the upper part indicates the absolute value of the difference of the two luminance added values when BY (left set) and R and EG (right set) are combined (i.e., the order is "B, Y, G, R, EG"), and the lower part indicates the absolute value of the difference of the two luminance added values when BR (left set) and Y and EG (right set) are combined (i.e., the order is "B, R, G, Y, EG").

Determining the locations of the sub-pixels in accordance with the first, second, and third conditions when the results shown in FIGS. 36A through 36C are obtained is now considered.

FIG. 36A shows that the luminance levels of B and EG are smaller than those of the other colors. Accordingly, the B and EG sub-pixels are located at the edges of a display pixel in accordance with the first condition. With this arrangement of the sub-pixels, the value obtained by adding the L* component differences around the edges of a black portion can be reduced.

FIG. 36A also shows that the sub-pixels having the smallest luminance after B and EG are R and Y. Accordingly, the R and Y sub-pixels are located at the second positions from the edges of the display pixel in accordance with the second condition. With this arrangement of the sub-pixels, the value obtained by adding the L* component differences around the edges of a black portion can be reduced, and also, the luminance slope can be increased.

When locating the second sub-pixels from the edges of a display pixel, two candidates can be considered: one candidate having a pixel order "B, Y, G, R, EG" in which B and Y are located at the left edge and EG and R are located at the right edge; and the other candidate having a pixel order "B, R, G, Y, EG" in which B and R are located at the left edge and EG and Y are located at the right edge. FIG. 36C shows that the absolute value of the difference of the luminance added values is smaller when BY (left set) and EG and R (right set) are combined than that when BR (left set) and EG and Y (right set) are combined. Accordingly, the combination of BY (left set) and EG and R (right set) can be determined in accordance with the third condition, resulting in the order "B, Y, G, R, EG". With this arrangement of the sub-pixels, the luminance slopes of the left and right edges of a display pixel can be maintained substantially at the same degree.

It can be seen from the foregoing description that the results obtained by executing the sub-pixel locating processing of the sixth embodiment match the results obtained by the sub-pixel error checking processing performed on the 60 location candidates (see FIG. 35). That is, by locating the sub-pixels in accordance with the first through third conditions, errors can be reduced.

Sub-pixel Locating Processing

The sub-pixel locating processing of the sixth embodiment is described below with reference to the flowchart in FIG. 37. This processing is executed by a program read by a computer or a program recorded on a recording medium. This processing is executed, for example, when the image display device 100 is designed.

In step 601, XYZ values of each of the R, G, B, EG, and Y are input. The XYZ values of each color can be determined by the spectral characteristics of the color filter 23c or the backlight unit 23i by simulations or actual measurement. Then, in step S602, the XYZ values are converted into a luminance and opponent-color space, and the luminance and opponent-color space is represented by Lum, R/G, and B/Y components.

In step S603, sub-pixels having smaller levels of luminance Lum are determined based on the luminance Lum obtained in step S602. In this case, based on the calculated luminance Lum, two sub-pixels having smaller levels of luminance Lum are located at the edges of a display pixel. That is, the sub-pixels are located in accordance with the first condition. If the results shown in FIG. 36A are obtained, B and EG having smaller luminance Lum are located at the edges of a display pixel. Then, luminance added values by using B and EG as the first colors are calculated. Then, the table shown in FIG. 36B is obtained.

In step S604, two sub-pixels having the smallest luminance after B and EG are located at the second positions from the edges of the display pixel. More specifically, among the sub-pixels which have not been located, sub-pixels having the smallest luminance are located at the second positions from the edges. That is, the sub-pixels are located in accordance with the second condition. If the results shown in FIG. 36A are obtained, the sub-pixels having the smallest luminance after B and EG are R and Y. Accordingly, R or Y is located next to B or EG. Then, two candidates for the pixel order, one "B, Y, G, R, EG" and the other one "B, R, G, Y, EG" are determined. Since R or Y is located next to B or EG, it can be automatically determined that G is located at the center of the display pixel. G has the largest luminance among the five sub-pixels.

In step S605, the candidate for the pixel order that can reduce the difference of the luminance added value between the left and right edges is selected, and the second sub-pixels positioned from the edges are determined. That is, the locations of the sub-pixels are determined in accordance with the third condition. If the results shown in FIG. 36C are obtained, the absolute value of the difference of the luminance added values is smaller when BY are located at the left edge and EG and R are located at the right edge than when BR are located at the left edge and EG and Y are located at the right edge. Accordingly, Y is located next to B and R is located next to EG, resulting in the order "B, Y, G, R, EG".

It is then determined in step S606 whether the locations of all the sub-pixels have been determined. If the locations of all the sub-pixels have been determined, the processing is completed. If there is any sub-pixel whose location has not been determined, the process returns to step S604. If the locations of five sub-pixels are determined as described above, it is sufficient if steps S604 through S606 are performed only once, and then, the locations of all the five sub-pixels can be determined. Although in the above-described example the order "B, Y, G, R, EG" is determined, the order may be determined to be "EG, R, G, Y, B" since the two location orders are the same.

According to the sub-pixel locating processing of the sixth embodiment, the location order of the R, G, B, EG, and Y sub-pixels can be determined by fully considering the visual characteristics. By applying the determined location order of the sub-pixels to the image display device 100, the value obtained by adding the L* component differences around the edges of a black portion can be decreased, and the edge blurring phenomenon recognized by humans can be reduced. As a result, the image display device 100 can display high-quality images.

Although in the above-described example the location order of the sub-pixels "B, Y, G, R, EG" is determined by the sub-pixel locating processing, the locations of the sub-pixels are not restricted to the order described above. The order selected in the above-described example is determined based on the results shown in FIGS. 36A through 36C, and if results other than those shown in FIGS. 36A through 36C are obtained, the order different from the above-described order is determined.

Seventh Embodiment

A seventh embodiment is described below. In the seventh embodiment, the composition of the multiple colors is different from that of the sixth embodiment. More specifically, in the seventh embodiment, instead of yellow, white (W) is used. That is, colors are represented by R, G, B, EG, and W. In the seventh embodiment, an image display device similar to the image display device 100 is used, and an explanation thereof is thus omitted. Additionally, instead of a color layer, a transparent resin layer is used for W sub-pixels.

FIGS. 38A through 38D illustrate examples of display characteristics of the display unit 23. More specifically, FIG. 38A is a diagram illustrating the spectral characteristics of the color filter 23c (R, G, B, and EG) of the display unit 23 in which the horizontal axis represents the wavelength (nm) and the vertical axis indicates the transmission factor (%). The spectral characteristic of the W color is not shown since the color filter 23c is not used for the W sub-pixels. FIG. 38B is a diagram illustrating the light emission characteristic of the light source of a backlight unit composed of a white LED as a combination of a fluorescent lamp and a blue LED. In FIG. 38B, the horizontal axis indicates the wavelength (nm) and the vertical axis represents the relative luminance. FIG. 38C is a diagram illustrating the spectral characteristics of the R, G, B, EG, and W sub-pixels. In FIG. 38C, the horizontal axis indicates the wavelength (nm) and the vertical axis designates the relative luminance. FIG. 38D is a diagram illustrating the chromaticity of the five colors corresponding to the light emission characteristics of the five colors, the chromaticity values being plotted on an xy chromaticity diagram. The colors that can be reproduced by the display unit 23 are restricted to the range surrounded by the quadrilateral indicated in the diagram of FIG. 38D, and the quadrilateral corresponds to the color reproduction region of the display unit 23. The vertices of the quadrilateral correspond to the R, G, B, and EG colors, and W is positioned inside the quadrilateral. Although this color reproduction range is similar to that of the four R, G, B, and EG colors, the use of the five R, G, B, and EG colors by adding the W color increases the transmission factor. Accordingly, the luminance on the surface of the display unit 23 can be increased.

The sub-pixel locating processing of the seventh embodiment is described below with reference to the flowchart in FIG. 39. As in the sixth embodiment, in the seventh embodiment, the locations of the sub-pixels are determined in accordance with the first, second, and third conditions. This processing is executed by a program read by a computer or a program recorded on a recording medium. This processing is executed, for example, when the image display device 100 is designed.

In step 701, XYZ values of each of the R, G, B, EG, and W are input. The XYZ values of each color can be determined by the spectral characteristics of the color filter 23c or the backlight unit 23i by simulations or actual measurement. Then, in step S702, the XYZ values are converted into a luminance and opponent-color space, and the luminance and opponent-color space is represented by Lum, R/G, and B/Y components. For example, the table shown in FIG. 40A is obtained.

FIGS. 40A through 40C illustrate tables specifically indicating the luminance and luminance added values of R, G, B, EG, and W. More specifically, FIG. 40A indicates the Lum, R/G and B/Y components determined from the XYZ values of each of the R, G, B, EG, and W colors. FIG. 40B illustrates the value obtained by adding the luminance levels of two colors (first color and second color) selected from the R, G, B, EG, and W colors, i.e., the luminance added value, is indicated. In FIG. 40C, the upper part indicates the absolute value of the difference of the two luminance added values when BR (left set) and EG and G (right set) are combined (i.e., the order is "B, R, W, G, EG"), and the lower part indicates the absolute value of the difference of the two luminance added values when BG (left set) and EG and R (right set) are combined (i.e., the order is "B, G, W, R, EG").

FIG. 40A shows that the luminance levels of B and EG are smaller than those of the other colors. FIG. 40C shows that the absolute value of the difference of the luminance added values is smaller when BG (left set) and EG and R (right set) are combined. That is, the absolute value of the difference of the luminance added values becomes smaller when the pixel order is "B, G, W, R, EG" than "B, R, W, G, EG".

Referring back to FIG. 39, in step S703, sub-pixels having smaller levels of luminance Lum are determined based on the luminance Lum obtained in step S702. In this case, based on the calculated luminance Lum, two sub-pixels having smaller levels of luminance Lum are located at the edges of a display pixel. That is, the sub-pixels are located in accordance with the first condition. If the results shown in FIG. 36A are obtained, B and EG having smaller luminance Lum are located at the edges of a display pixel. Then, luminance added values by using B and EG as the first color are calculated. Then, the table shown in FIG. 40B is obtained.

In step S704, two sub-pixels having smallest luminance after B and EG are located at the second positions from the edges of the display pixel. More specifically, among the sub-pixels which have not been located, sub-pixels having the smallest luminance are located at the second positions from the edges. That is, the sub-pixels are located in accordance with the second condition. If the results shown in FIG. 40A are obtained, the sub-pixels having the smallest luminance after B and EG are R and G. Accordingly, R or G is located next to B or EG. Thus, two candidates for the pixel order, one "B, R, W, G, EG" and the other one "B, G, W, R, GE", are obtained. Since R or G is located next to B or EG, it can be automatically determined that W is located at the center of the display pixel. W has the largest luminance among the five sub-pixels.

In step S705, the sub-pixels are located at the second positions from the edges of the display pixel such that the difference of the luminance added values between the left and right edges can be decreased. That is, the locations of the sub-pixels are determined in accordance with the third condition. If the results shown in FIG. 40C are obtained, the absolute value of the difference of the luminance added values is smaller when BG are located at the left edge, and EG and R are located at the right edge than when BR are located at the left edge, and EG and G are located at the right edge. Accordingly, G is located next to B and R is located next to EG, resulting in the order "B, G, W, R, EG".

It is then determined in step S706 whether the locations of all the sub-pixels have been determined. If the locations of all the sub-pixels have been determined, the processing is completed. If there is any sub-pixel whose location has not been determined, the process returns to step S704. If the locations of five sub-pixels are determined as described above, it is sufficient if steps S704 through S706 are performed only once, and then, the locations of all the five sub-pixels can be determined. Although in the above-described example the order "B, G, W, R, EG" is determined, the order may be determined to be "EG, R, W, G, B" since the two orders are the same.

The results obtained by the above-described sub-pixel locating processing are compared with the results obtained by the sub-pixel error checking processing executed on the location candidates for the five R, G, B, EG, and W sub-pixels.

Figure 41:
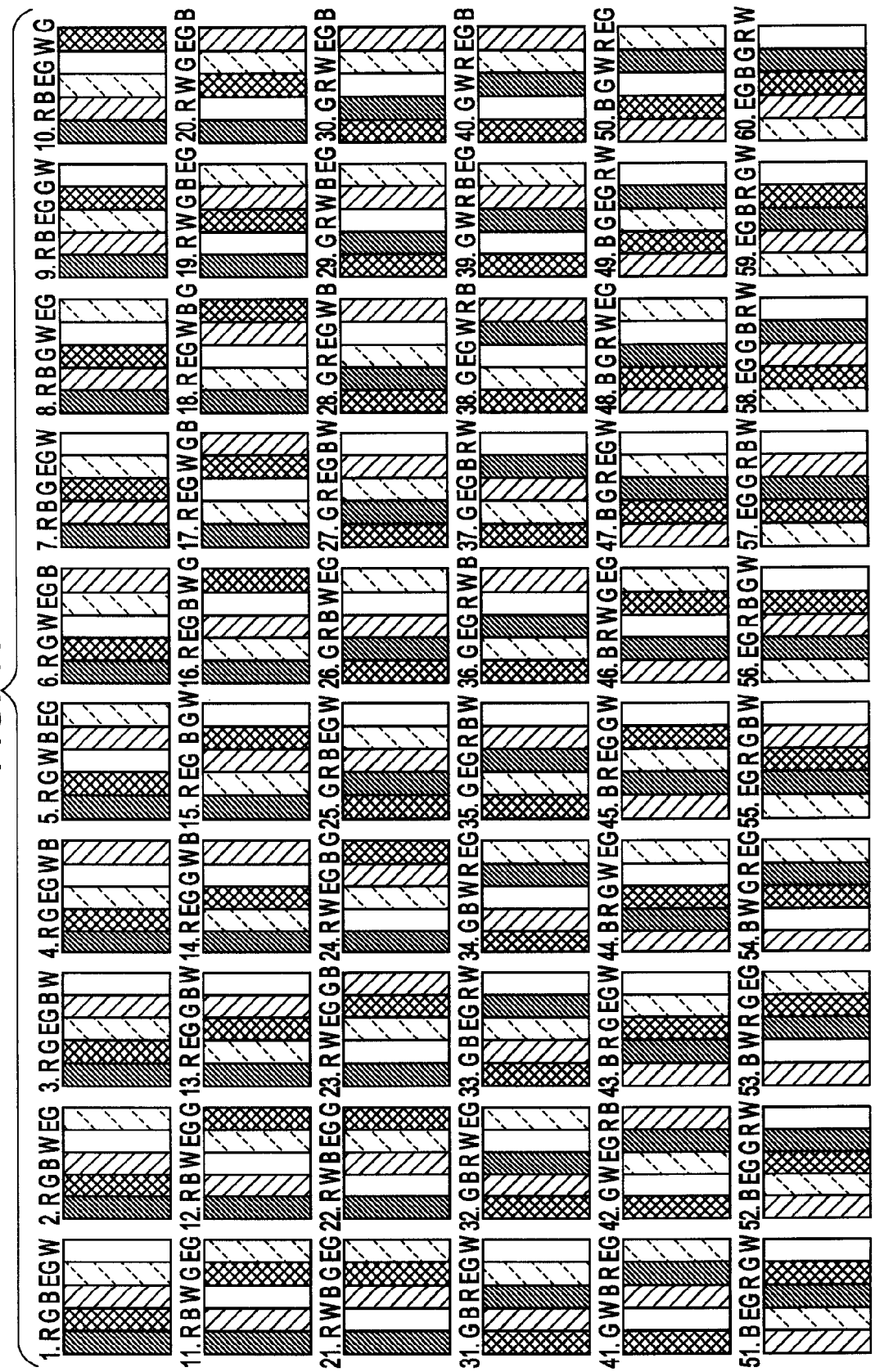
FIG. 41 illustrates candidates for the pixel order of R, G, B, EG, and W sub-pixels.

FIG. 41 illustrates candidates for the order of the five R, G, B, EG, and W sub-pixels. In this case, although the number of combinations of the R, G, B, EG, and W sub-pixels is 120 (5×4×3×2×1=120), the actual number becomes one half that, i.e., 60, if the horizontal symmetrical characteristic is considered.

Figure 42:
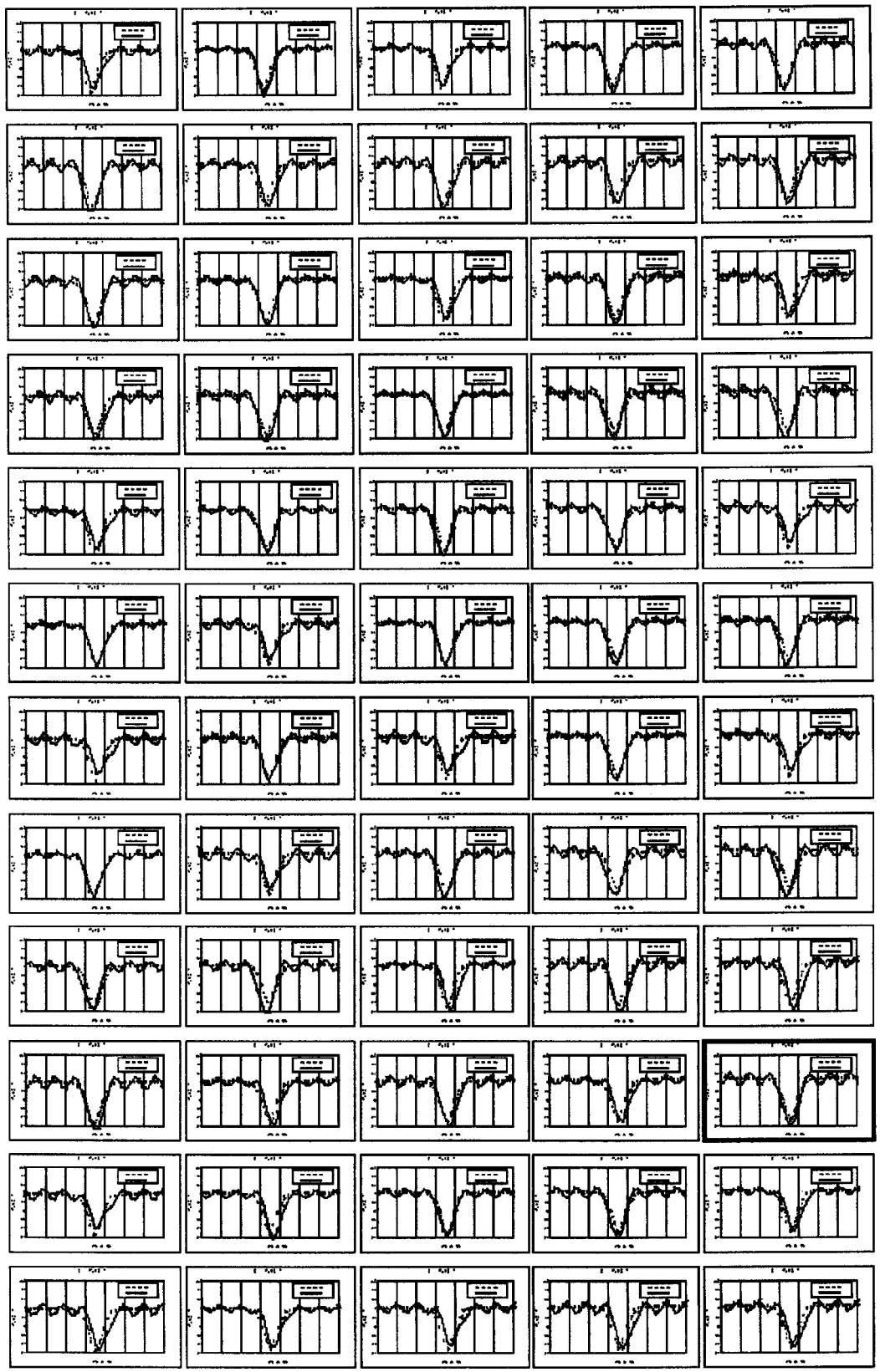
FIG. 42 illustrates the results obtained from the sub-pixel error checking processing performed on the 60 candidates shown in FIG. 41.

FIG. 42 illustrates the results of the sub-pixel error checking processing performed on the 60 candidates shown in FIG. 41. In the graphs shown in FIG. 42, the horizontal axes each indicate the position of a black and white pattern image, and the vertical axes represent the L* components. In each graph, both the original image and the reproduction image are shown. FIG. 42 shows that, when the pixel location "B, G, W, R, EG" (the graph surrounded by the thick lines in FIG. 42) is selected, the value obtained by adding the differences of the L* components between the original image and the reproduction image is relatively small. Accordingly, it can be seen that the results obtained by the sub-pixel locating processing of the seventh embodiment are the same as the results obtained by the sub-pixel error checking processing executed on the 60 candidates (see FIG. 42). That is, by locating the sub-pixels in accordance with the first through third conditions, errors can be decreased.

According to the sub-pixel locating processing of the seventh embodiment, the location order of the R, G, B, EG, and W sub-pixels can be determined by fully considering the visual characteristics. By applying the determined location order of the sub-pixels to the image display device 100, the value obtained by adding the L* component differences around the edges of a black portion can be decreased, and the edge blurring phenomenon recognized by humans can be reduced. As a result, the image display device 100 can display high-quality images.

Although in the above-described example the location order of the sub-pixels "B, G, W, R, EG" is determined by the sub-pixel locating processing, the locations of the sub-pixels are not restricted to the order described above. The order selected in the above-described example is determined based on the results shown in FIGS. 40A through 40C, and if results other than those shown in FIGS. 40A through 40C are obtained, the order different from the above-described order is determined.

Eighth Embodiment

An eighth embodiment is described below. In the eighth embodiment, the composition of the multiple colors is different from that of the sixth or seventh embodiment. More specifically, in the eighth embodiment, colors are represented by six colors, i.e., R, G, B, EG, Y, and W. In the eighth embodiment, an image display device similar to the image display device 100 is used, and an explanation thereof is thus omitted. In the image display device of the eighth embodiment, the data line drive circuit 21 supplies data line drive signals to 3840 data lines.

FIGS. 43A through 43D illustrate examples of display characteristics of the display unit 23. More specifically, FIG. 43A is a diagram illustrating the spectral characteristics of the color filter 23c (R, G, B, EG, and Y) of the display unit 23 in which the horizontal axis represents the wavelength (nm) and the vertical axis indicates the transmission factor (%). The spectral characteristic of the W color is not shown since the color filter 23c is not used for the W sub-pixels. FIG. 43B is a diagram illustrating the light emission characteristic of the light source of a backlight unit composed of a white LED as a combination of a fluorescent lamp and a blue LED. In FIG. 43B, the horizontal axis indicates the wavelength (nm) and the vertical axis represents the relative luminance. FIG. 43C is a diagram illustrating the spectral characteristics of the R, G, B, EG, Y, and W sub-pixels. In FIG. 43C, the horizontal axis indicates the wavelength (nm) and the vertical axis designates the relative luminance. FIG. 43D is a diagram illustrating the chromaticity of the six colors corresponding to the light emission characteristics of the six colors, the chromaticity values being plotted on an xy chromaticity diagram. The colors that can be reproduced by the display unit 23 are restricted to the range surrounded by the pentagon indicated in the diagram of FIG. 43D, and the pentagon corresponds to the color reproduction region of the display unit 23. The vertices of the pentagon correspond to the R, G, B, EG, and Y colors, and W is positioned inside the pentagon.

The sub-pixel locating processing of the eighth embodiment is described below. As in the sixth and seventh embodiments, in the eighth embodiment, the locations of the sub-pixels are determined in the following procedure in accordance with the first, second, and third conditions.

Among the R, G, B, EG, Y, and W sub-pixels, two sub-pixels having smallest levels of luminance are located at the left and right edges of a display pixel. The location determined in this manner is referred to as the "first location". The first location is determined in accordance with the first condition.

Then, sub-pixels having smallest luminance after the sub-pixels positioned at the edges are located adjacent to the sub-pixels positioned at the edges.

Then, sub-pixels having the smallest luminance after the sub-pixels located at the edges are located next to the sub-pixels located at the edges. The location determined in this manner is referred to as the "second location". The second location is determined in accordance with the second condition. Then, the sub-pixels are located such that the difference of the luminance added value between the adjacent sub-pixels located at the left edge and the adjacent sub-pixels located at the right edge can be decreased. This location determined in this manner is referred to as the "third location". More specifically, the third location is determined by the comparison between the luminance added value obtained from the two sub-pixels at the left edge and that obtained from the two sub-pixels at the right edge. The third location is determined in accordance with the third condition. Then, the locations of the four sub-pixels can be determined.

Then, the locations of the remaining two sub-pixels are determined. In this case, the two sub-pixels which have not been located are located at the remaining positions. This location determined in this manner is referred to as the "fourth location". The fourth location is determined in accordance with the second condition. Then, the two sub-pixels are located such that the difference of the luminance added value between the sub-pixels located at the left edge and the sub-pixels located at the right edge can be reduced. This location determined in this manner is referred to as the "fifth location". More specifically, the luminance added value obtained from the three sub-pixels at the left edge is compared with that obtained from the three sub-pixels at the right edge. The fifth location is determined in accordance with the third condition. As a result, the locations of the six sub-pixels can be determined.

FIGS. 44A through 44E illustrate tables specifically indicating the luminance and luminance added values of R, G, B, EG, Y, and W. More specifically, FIG. 44A indicates the Lum, R/G and B/Y components determined from the XYZ values of each of the R, G, B, EG, Y, and W colors. The table shown in FIG. 44A is referred to when the first location is determined.

FIG. 44B illustrates the value obtained by adding the luminance levels of two colors (first color and second color) selected from the R, G, B, EG, Y, and W colors, i.e., the luminance added value, is indicated. More specifically, FIG. 44B indicates the luminance added values obtained from four assumed combinations of sub-pixels when B or EG having smaller luminance is selected as the first color. FIG. 44C indicates the absolute values of the differences of the luminance added values shown in FIG. 44B. The table shown in FIG. 44C is referred to when the third location is determined.

FIG. 44D illustrates the luminance added values of three colors when Y is located next to B and when R is located next to EG and when W or G is located next to BY or EG and R. More specifically, FIG. 44D indicates the luminance added values obtained from the four assumed combinations of the sub-pixels. FIG. 44E illustrates the absolute values of the differences of the luminance added values shown in FIG. 44D. The table shown in FIG. 44E is referred to when the fifth location is determined.

Determining the locations of the sub-pixels when the results shown in FIGS. 44A through 44E are obtained is now considered. FIG. 44A shows that the luminance levels of B and EG are smaller than those of the other colors. Accordingly, B and EG are located at the edges of a display pixel in the first location. FIG. 44A also shows that the sub-pixels having the smallest luminance after B and EG are R and Y. Accordingly, R or Y is located next to B or EG in the second location. Then, the luminance added values shown in FIG. 44B are obtained. Based on the luminance added values shown in FIG. 44B, the absolute values of the differences of the luminance added values shown in FIG. 44C are obtained.

In the third location, by referring to the table shown in FIG. 44C, the locations of the sub-pixels are determined such that the absolute value of the difference of the luminance added values can be reduced. Accordingly, in the third location, Y is located next to B and R is located next to EG. Then, in the fourth location, the remaining sub-pixel G or W is located next to BY or EG and R. In the fourth location, the luminance added values shown in FIG. 44D are obtained. Based on the luminance added values shown in FIG. 44D, the absolute values of the differences of luminance added values shown in FIG. 44E are obtained. In the fifth location, by referring to the table shown in FIG. 44E, the locations of the sub-pixels are determined such that the absolute value of the difference of the luminance added values can be reduced. Then, W is located next to BY and G is located next to EG and R, resulting in the order "B, Y, W, G, R, EG".

Figure 45:
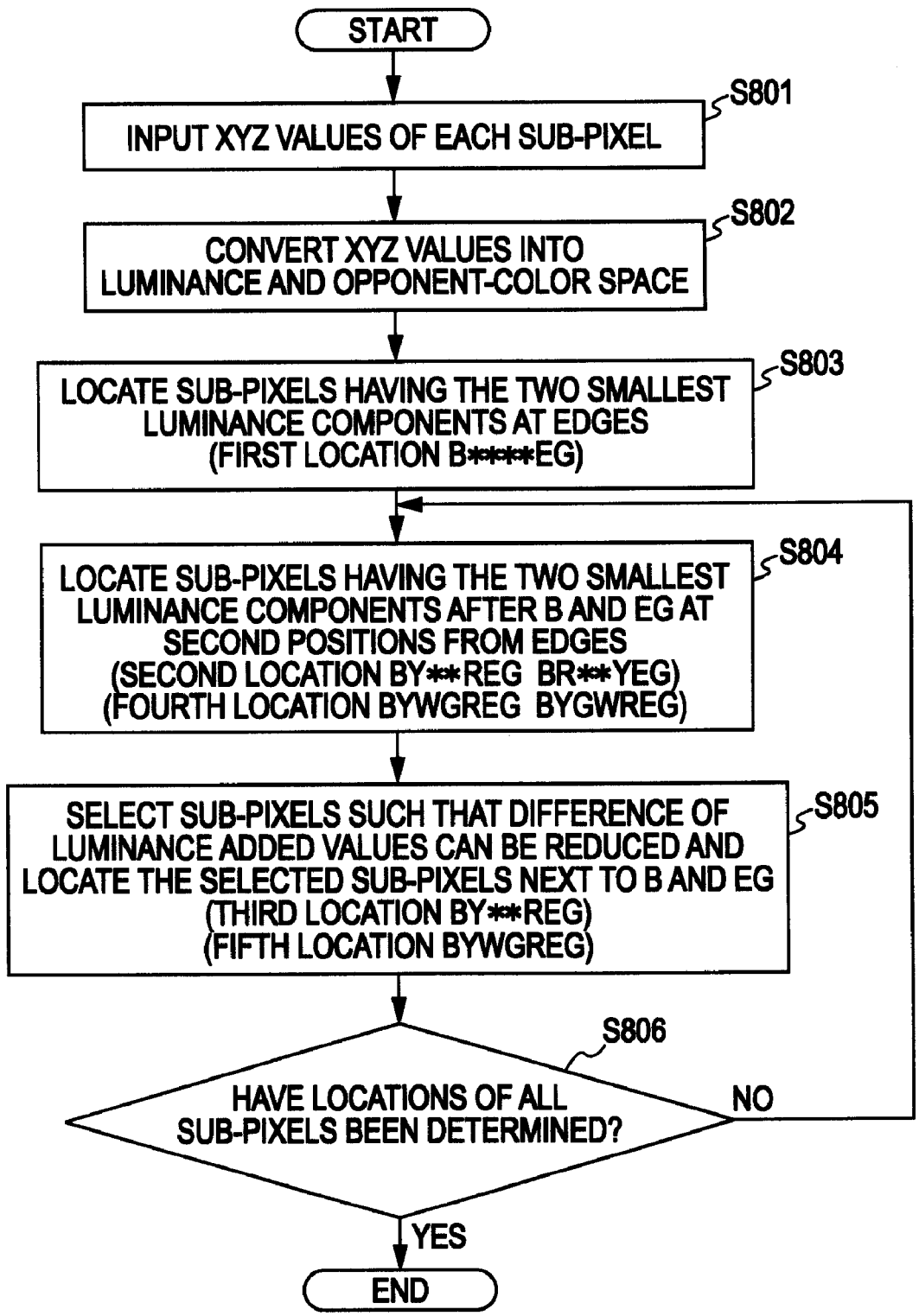
FIG. 45 is a flowchart illustrating sub-pixel locating processing according to the eighth embodiment.

The sub-pixel locating processing of the eighth embodiment is described below with reference to the flowchart in FIG. 45. As in the sixth or seventh embodiment, in the eighth embodiment, the locations of the sub-pixels are determined in accordance with the first, second, and third conditions. This processing is executed by a program read by a computer or a program recorded on a recording medium. This processing is executed, for example, when the image display device 100 is designed.

In step 801, XYZ values of each of the R, G, B, EG, Y, and W are input. The XYZ values of each color can be determined by the spectral characteristics of the color filter 23c or the backlight unit 23i by simulations or actual measurement. Then, in step S802, the XYZ values are converted into a luminance and opponent-color space, and the luminance and opponent-color space is represented by Lum, R/G, and B/Y components. For example, the table shown in FIG. 44A is obtained.

In step S803, sub-pixels located at the edges of a display pixel are determined based on the luminance Lum obtained in step S802. In this case, based on the calculated luminance Lum, two sub-pixels having smaller luminance are located at the edges. That is, the locations of the sub-pixels are determined in accordance with the first condition. The first location is now discussed. If the results shown in FIG. 44A are obtained, B and EG having smaller luminance Lum are located at the edges of a display pixel in the first location.

Then, in step S804, two sub-pixels having the smallest luminance after B and EG are located at the second positions from the edges of the display pixel. More specifically, among the sub-pixels which have not been located, sub-pixels having the smallest luminance are located at the second positions from the edges. That is, the sub-pixels are located in accordance with the second condition. The second condition is now discussed. If the results shown in FIG. 44A are obtained, the sub-pixels having the smallest luminance after B and EG are R and Y. Accordingly, R or Y is located next to B or EG. Thus, two candidates for the pixel order, one "BYREG" and the other one "BRYEG" (* indicates that the sub-pixel to be located is not determined), are obtained.

In step S805, the sub-pixels are located at the second positions from the edges such that the difference of the luminance added values between the left and right edges can be reduced. That is, the locations of the sub-pixels are determined in accordance with the third condition. If the results shown in FIG. 44C are obtained, the absolute value of the difference of the luminance added values is smaller when BY are located at the left edge and EG and R are located at the right edge than when BR are located at the left edge and EG and Y are located at the right edge. Accordingly, in the third location, Y is located next to B and R is located next to EG, resulting in the order "BY**REG".

It is then determined in step S806 whether the locations of all the sub-pixels have been determined. If the locations of all the sub-pixels have been determined, the processing is completed. If there is any sub-pixel whose location has not been determined, the process returns to step S804. That is, the locations of the sub-pixels are determined again. If the locations of the six sub-pixels are determined as described above, it is not sufficient if steps S804 through S806 are performed only once because the locations of only the four sub-pixels are determined in steps S804 and S806. That is, only the first location through the third location are determined, and the fourth location and the fifth location have not been determined. Accordingly, after step S806, steps S804 through S806 are executed again.

The fourth and fifth locations determined by steps S804 through S806 are as follows. If the results shown in FIG. 44D are obtained, in step S804, G or W which has not been determined is located next to BY or EG and R. Accordingly, in the fourth location, two candidates "B, Y, W, G, R, EG" and "B, Y, G, W, R, EG" are determined.

In step S805, the pixel order is determined such that the absolute value of the difference of the luminance added values can be reduced. More specifically, if the results shown in FIG. 44E are obtained, the absolute value of the difference of the luminance added values is smaller when W is located next to BY and G is located next to EG and R than when G is located next to BY and W is located next to EG and R. Accordingly, in the fifth location, W is located next to BY and G is located next to EG and R. That is, the locations of the six sub-pixels are determined.

It is then determined in step S806 that the locations of all the sub-pixels have been determined. Thus, the processing is completed. Although in the above-described example "B, Y, G, W, R, EG" is determined, the order may be determined to be "EG, R, W, G, Y, B" since the two orders are the same.

According to the sub-pixel locating processing of the eighth embodiment, the location order of the R, G, B, EG, Y, and W sub-pixels can be determined by fully considering the visual characteristics. By applying the determined location order of the sub-pixels to the image display device 100, the edge blurring phenomenon recognized by humans can be reduced. As a result, the image display device 100 can display high-quality images.

Although in the above-described example the location order of the sub-pixels "B, Y, G, W, R, EG" is determined by the sub-pixel locating processing, the locations of the sub-pixels are not restricted to the order described above. The order selected in the above-described example is determined based on the results shown in FIGS. 44A through 44E, and if results other than those shown in FIGS. 44A through 44E are obtained, the order different from the above-described order is determined.

Ninth Embodiment

A ninth embodiment is described below. In the sixth through eighth embodiments, the display pixels are arranged in a stripe pattern. In the ninth embodiment, the display pixel arrangement is changed from a stripe pattern.

In the ninth embodiment, an image display device configured similar to the image display device 101 shown in FIG. 17 is used, and an explanation thereof is thus omitted. In the ninth embodiment, the data line drive circuit 21 supplies data line drive signals X1 through X1600 to 1600 data lines. The number of outputs of the data line drive circuit 21 is described below with reference to FIGS. 47A and 47B.

Before describing the display pixel arrangement in the ninth embodiment, changing the display pixel arrangement from a stripe pattern when three colors are used is discussed first.

Figure 46A:
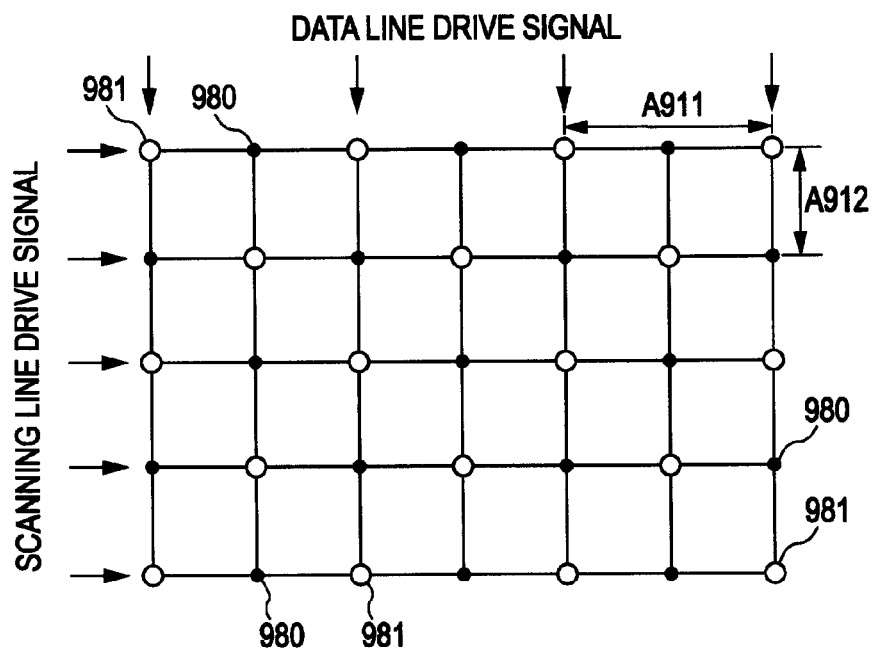
FIGS. 46A and 46B illustrate an example of a case where the display pixel arrangement having three RGB pixels is changed.
Figure 46B:
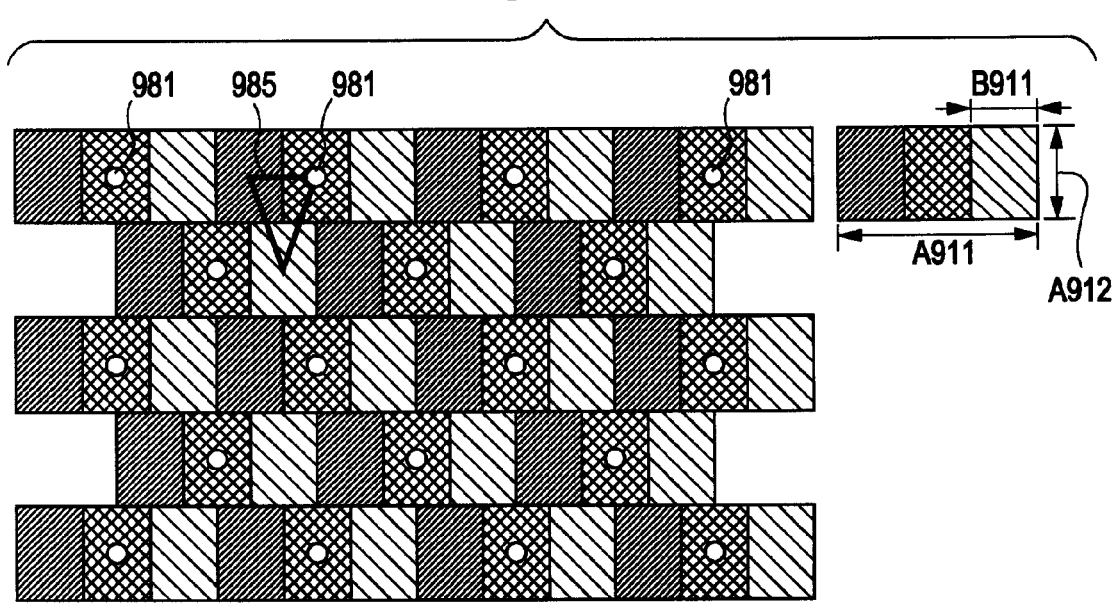

FIGS. 46A and 46B illustrate an example of a case where the display pixel arrangement having three RGB pixels is changed. In FIG. 46A, small black dots 980 in a lattice-like form correspond to points of input data. If the display unit 23z is a VGA-size display, there are 480×640 black dots 980. The arrows in FIG. 46A indicate the inputs of the data line drive signals and the scanning line drive signals, and white dots 981 are points of input data after the display pixel arrangement is changed (such points are also referred to as "sample points").

The re-sampling circuit 11a changes the number of pixels in the horizontal direction so that the pixels can match the display pixel arrangement of the display unit 23z. In this case, the pitch A911 of the white dot 981 (in other words, the horizontal length of a display pixel) is doubled so that the number of display pixels is reduced to one half that. More specifically, when the vertical width A912 of a display pixel is 1.0, the horizontal length A911 of the display pixel becomes 2.0 (A911=A912×2=2.0). The sample points are vertically displaced from each other by half a pitch (A911/2). In this manner, images can be displayed without the considerable loss in the quality even if the number of pixels in the horizontal direction is reduced.

The display pixel arrangement using the three colors is specifically discussed below with reference to FIG. 46B. In this case, each display pixel has three sub-pixels, and since the horizontal pitch A911 of a display pixel is 2.0, the horizontal width of a sub-pixel is 0.667 (B911=A911/3=0.667) (see at the right portion of FIG. 46B). The left portion of FIG. 46B shows that the display pixels are vertically displaced from each other by half a pitch (A911/2). Accordingly, the same types of sub-pixels are also displaced from each other by A911/2. When considering the display pixel arrangement in units of sub-pixels, the sub-pixels are displayed from each other by B911/2. In the display unit 23z having the three colors, when looking at one set of three colors over two lines, the three colors are positioned at the vertices of an inverted triangle as indicated by reference numeral 985. Upon receiving an output of the re-sampling circuit 11a, a data control circuit (not shown) adjusts the output timing of the data line drive signals and the scanning line drive signals to the data lines and the scanning lines to suitably control the data line drive circuit 21 and the scanning line drive circuit 22, respectively. As a result, the image display device 101 can implement suitable display in accordance with the changed display pixel arrangement.

The display pixel arrangements in the ninth embodiment are specifically discussed below with reference to FIGS. 47A through 49B.

Figure 47A:
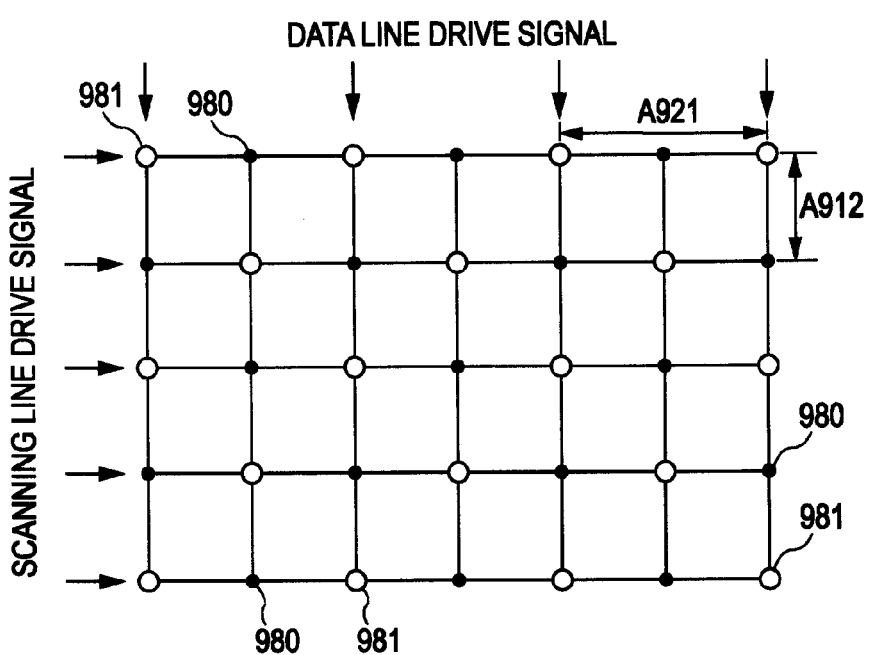
FIGS. 47A and 47B illustrate the display pixel arrangement according to a first example of the ninth embodiment.
Figure 47B:
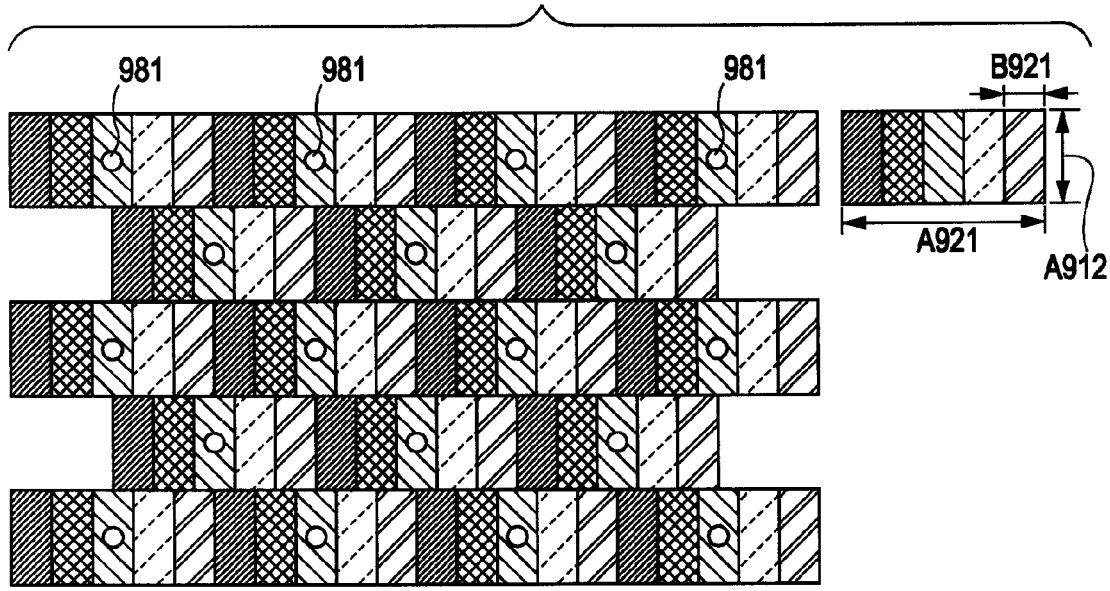

FIGS. 47A and 47B illustrate a first example of the display pixel arrangement in the ninth embodiment. FIG. 47A shows that the re-sampling conditions are similar to those shown in FIG. 46A. That is, when the vertical width A912 of a display pixel is 1.0, the horizontal length A921 of the display pixel is 2.0 (A921=A912×2=2.0). In this case, inputs and outputs into and from the re-sampling circuit 11a are three color signals although the display unit 23z has five colors. Accordingly, the three colors are converted into the five colors in the color conversion circuit 12. FIG. 47B illustrates the display pixel arrangement. The right portion of FIG. 47B shows that the horizontal width B921 of a sub-pixel is 0.4 (B921=A921/4=0.4). The left portion of FIG. 47B shows that the display pixels are vertically displaced from each other by half a pitch (A921/2), and thus, the same types of sub-pixels are also vertically displaced from each other by A921/2.

In the display unit 23z having the display pixel arrangement shown in FIGS. 47A and 47B, when the input data has a size equal to a VGA size, the number of re-sampled display pixels becomes 480×320. In this case, the number of horizontal sub-pixels is 1600 (320×5=1600). In the ninth embodiment, the image display device 101 shown in FIG. 17 uses the display unit 23z having the display pixel arrangement shown in FIGS. 47A and 47B. Accordingly, the data line drive circuit 21 supplies the data line drive signals X1 through X1600 to the 1600 data lines. In contrast, in the image display device 100 having a stripe pattern (see FIG. 1), the number of outputs from the data line drive circuit 21 to the display unit 23z is 3200 (640×5=3200). Accordingly, the use of the display pixel arrangement of the first example makes it possible to reduce the number of outputs from the data line drive circuit 21 to the display unit 23z while the number of inputs remains the same. As a result, the cost of the image display device 101 can be reduced.

Figure 48A:
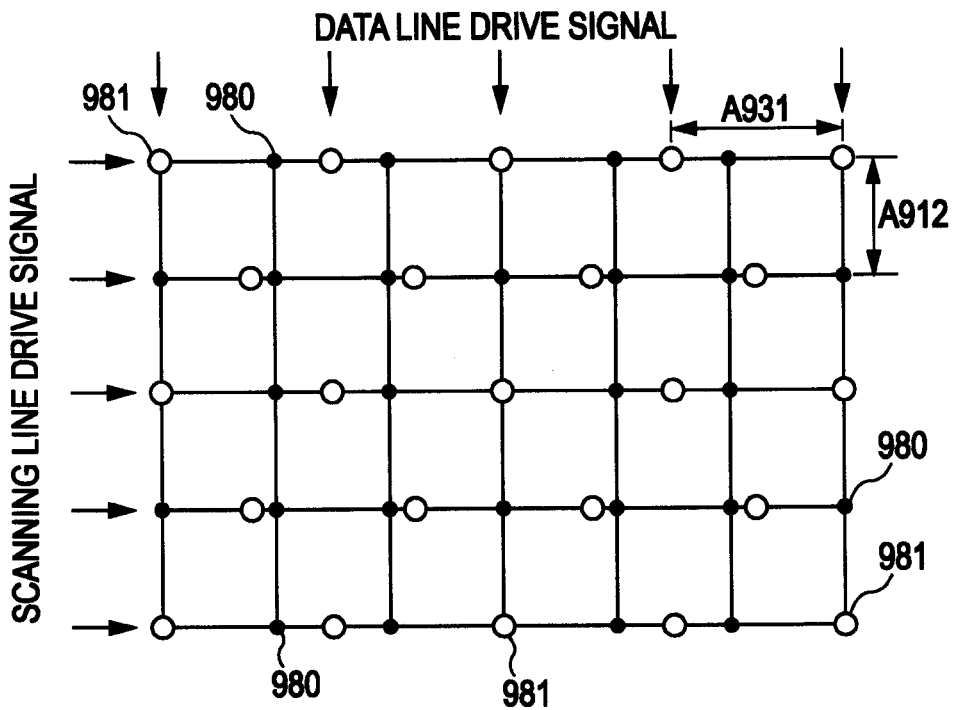
FIGS. 48A and 48B illustrate the display pixel arrangement according to a second example of the ninth embodiment.
Figure 48B:
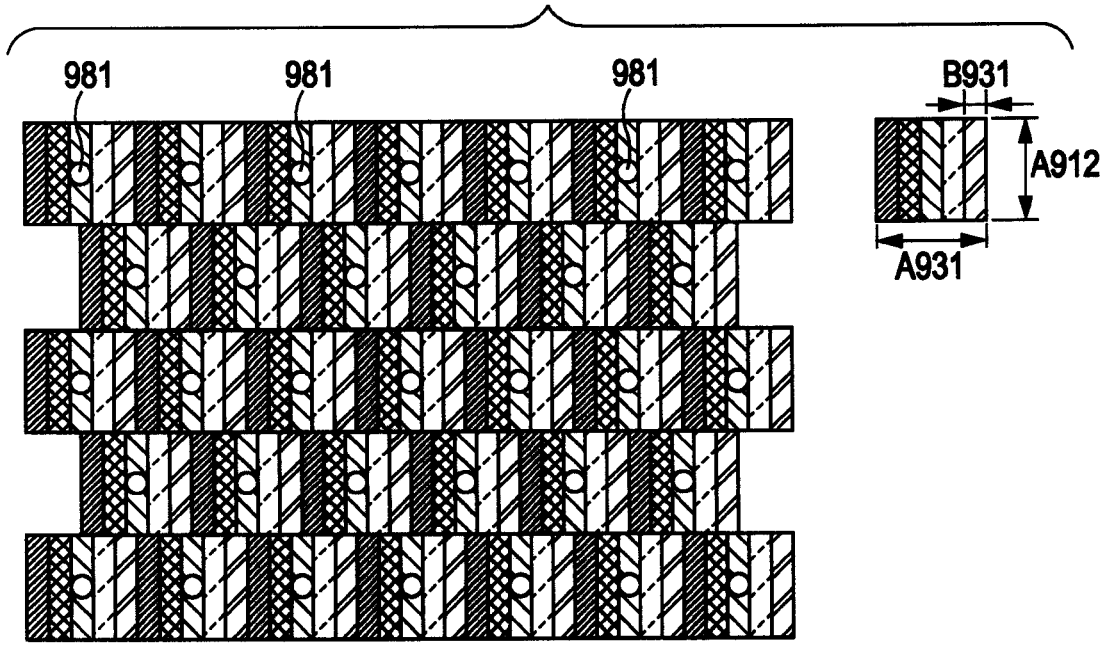

FIGS. 48A and 48B illustrate a second example of the display pixel arrangement in the ninth embodiment. FIG. 48A shows that, when the vertical width A912 of a display pixel is 1.0, the horizontal length A931 of the display pixel is 1.5 (A931=A912×1.5=1.5). FIG. 48B illustrates the display pixel arrangement. The right portion of FIG. 48B shows that the horizontal width B931 of a sub-pixel is 0.3 (B931=A931/5=0.3). The left portion of FIG. 48B shows that the display pixels are vertically displaced from each other by half a pitch (A931/2), and thus, the same types of sub-pixels are also vertically displaced from each other by A931/2. Accordingly, the use of the display pixel arrangement of the second example makes it possible to reduce the number of outputs from the data line drive circuit 21 while the number of inputs remains the same. As a result, the cost of the image display device 101 can be reduced.

Figure 49A:
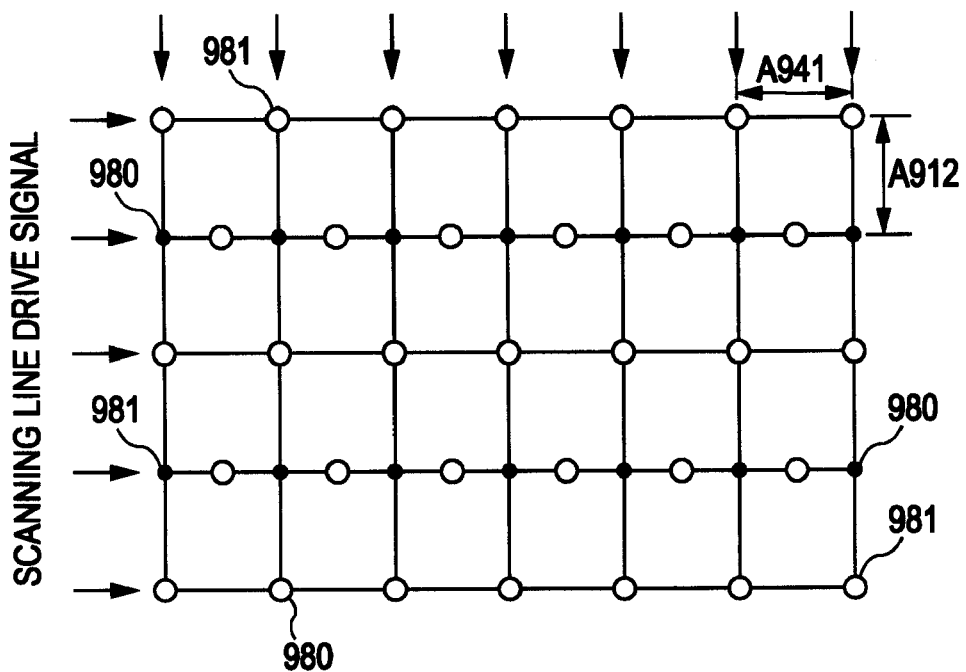
FIGS. 49A and 49B illustrate the display pixel arrangement according to a third example of the ninth embodiment.
Figure 49B:
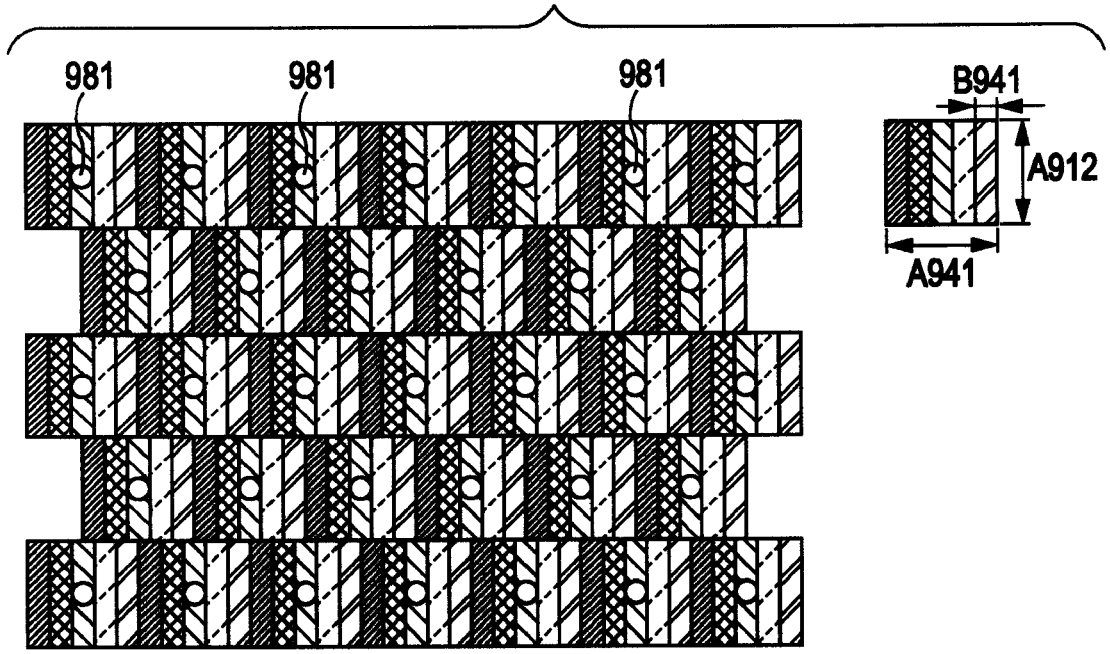

FIGS. 49A and 49B illustrate a third example of the display pixel arrangement in the ninth embodiment. FIG. 49A shows that, when the vertical length A912 of a display pixel is 1.0, the horizontal length A941 of the display pixel is 1.0 (A941=A912×1.0=1.0). FIG. 49B illustrates the display pixel arrangement. The right portion of FIG. 49B shows that the horizontal width B941 of a sub-pixel is 0.2 (B941=A941/5=0.2). The left portion of FIG. 49B shows that the display pixels are vertically displaced from each other by half a pitch (A941/2), and thus, the same types of sub-pixels are also vertically displaced from each other by A941/2. Accordingly, by using the display pixel arrangement of the third example, the number of outputs from the data line drive circuit 21 to the display unit 23z is the same as that of the image display device 100 having the display unit 23 using a stripe pattern (see FIG. 29). However, since the display pixels are vertically displaced from each other by half a pitch, the apparent resolution in the horizontal direction is enhanced.

In the display pixel arrangements of the first through third examples, the display pixel arrangement using the five colors has been discussed. However, the display pixels can be arranged similarly when six colors are used. For the locations of the sub-pixels forming the display pixels, the sub-pixel locations determined by the sub-pixel locating processing of one of the sixth through eighth embodiments may be used. That is, also in a case where the display pixels are displaced from each other by half a pitch, the locations of the R, G, B, EG, and Y sub-pixels, the R, G, B, EG, and W sub-pixels, or R, G, B, EG, Y, and W sub-pixels can be determined by fully considering the visual characteristics. More specifically, when the five R, G, B, EG, and Y colors are used, the pixel locations determined by the sub-pixel locating processing of the sixth embodiment are used, and when the five R, G, B, EG, and W colors are used, the pixel locations determined by the sub-pixel locating processing of the seventh embodiment are used. When the six R, G, B, EG, Y, and W colors are used, the pixel locations determined by the sub-pixel locating processing of the eighth embodiment are used.

Accordingly, the sub-pixel locating processing of the sixth through eighth embodiments can be applied to the display pixel arrangements discussed in the ninth embodiment. The reason for this is as follows. The number of inputs into and outputs from the re-sampling circuit 11a of the image display device 101 of the ninth embodiment is three, and thus, the re-sampling circuit 101 produces very little influence on five or six colors. Accordingly, when the image display device 101 displays a black and white pattern using five or six colors, it can be operated exactly the same as the image display device 100 of the sixth or seventh embodiment. In the ninth embodiment, since the horizontal width of a sub-pixel is different from that of the sixth or seventh embodiment, the filtering characteristics reflecting the visual characteristics become different, and yet, the degrees of errors depending on the locations of sub-pixels can be reflected as they are. Thus, the sub-pixel locations determined by the sub-pixel locating processing of the sixth through eighth embodiments can be used for the display pixel arrangements of the ninth embodiment.

As described above, according to the ninth embodiment in which the display pixels are vertically displaced from each other by half a pitch, the edge blurring phenomenon recognized under visual observation can be decreased.

In the ninth embodiment, the horizontal length of a display pixel (pitch of a display pixel) is changed, such as A921=2.0, A931=1.5, and A941=1.0. However, the invention is not restricted to such lengths, and may use other lengths to form different display pixel arrangements.

Modified Examples

In the invention, as four sub-pixel colors, colors other than RGBC or RGBW may be used. Colors other than R, YG, B and EG may be used. For example, instead of C or W, yellow may be used. Additionally, in the above-described embodiments, the backlight unit composed of a white LED as a combination of a fluorescent lamp and a blue LED is used. However, a backlight unit including another type of LED may be used. For example, a backlight unit including three RGB LEDs may be used.

When five sub-pixel colors are used, colors other than R, G, B, EG, and Y or R, G, B, EG, and W may be used. When six sub-pixels colors are used, colors other than R, G, B, EG, Y, and W may be used. Instead of five or six colors, four or seven or more colors may be used. As described above, yellowish green (YG) may be used instead of G.

In the invention, the image display device is not restricted to a liquid crystal device (LCD). For example, another type of plane-display image display device, such as an organic electroluminescent (EL) display device (OLED), a plasma display device (PDP), a cathode ray tube display device (CRT), or a field emission display device (FED), may be used. The invention is applicable, not only to transmissive-type liquid crystal devices, but also to reflective-type or transflective-type image display devices.

As the multiple colors used by the image display device, RGBC are used as a specific example. In this case, the multiple colors include RGB and yellow (Y), cyan (C), and magenta (M), which are complementary colors of RGB, and also include colors between RGB and YCM, for example, yellowish green and dark green.

Although in the above-described embodiments four colors are mainly used, five or more colors may be employed. In this case, by locating two sub-pixels having smaller luminance at the edges of a display pixel and by locating the remaining sub-pixels such that the absolute value of the difference between the two sub-pixels located at the left edge and those located at the right edge can be reduced, advantages similar to those of the foregoing embodiments can be achieved.

Electronic Apparatus

Examples of an electronic apparatus using the image display device 100 or 101 are described below. FIG. 22 is a block diagram schematically illustrating the overall configuration of an electronic apparatus according to an embodiment of the invention. The electronic apparatus shown in FIG. 22 includes a liquid crystal display device 700 as an image display unit and a controller 410 for controlling the liquid crystal display device 700. The image display device 100 or 101 can be disposed within the liquid crystal display device 700. The liquid crystal display device 700 includes a panel structure 403 and a drive circuit 402, such as a semiconductor integrated circuit (IC). The controller 410 includes a display information output source 411, a display information processing circuit 412, a power supply circuit (power supply device) 413, and a timing generator 414.

The display information output source 411 includes a memory, such as a read only memory (ROM) or a random access memory (RAM), a storage unit, such as a magnetic recording disk or an optical recording disc, and a tuning circuit that tunes and outputs a digital image signal. The display information output source 411 supplies display information to the display information processing circuit 412 as an image signal of a predetermined format on the basis of various clock signals supplied from the timing generator 414.

The display information processing circuit 412 includes various circuits, such as a serial-to-parallel circuit, an amplifier/inversion circuit, a rotation circuit, a γ correction circuit, and a clamping circuit. The display information processing circuit 412 processes the received display information and supplies the resulting image information to the drive circuit 402 together with the clock signal CLK. The drive circuit 402 includes a scanning line drive circuit, a data line drive circuit, and an inspection circuit. The power supply circuit 413 supplies predetermined voltages to the corresponding elements.

Specific examples of the electronic apparatus are described below with reference to FIGS. 23A and 23B.

Figure 23A:
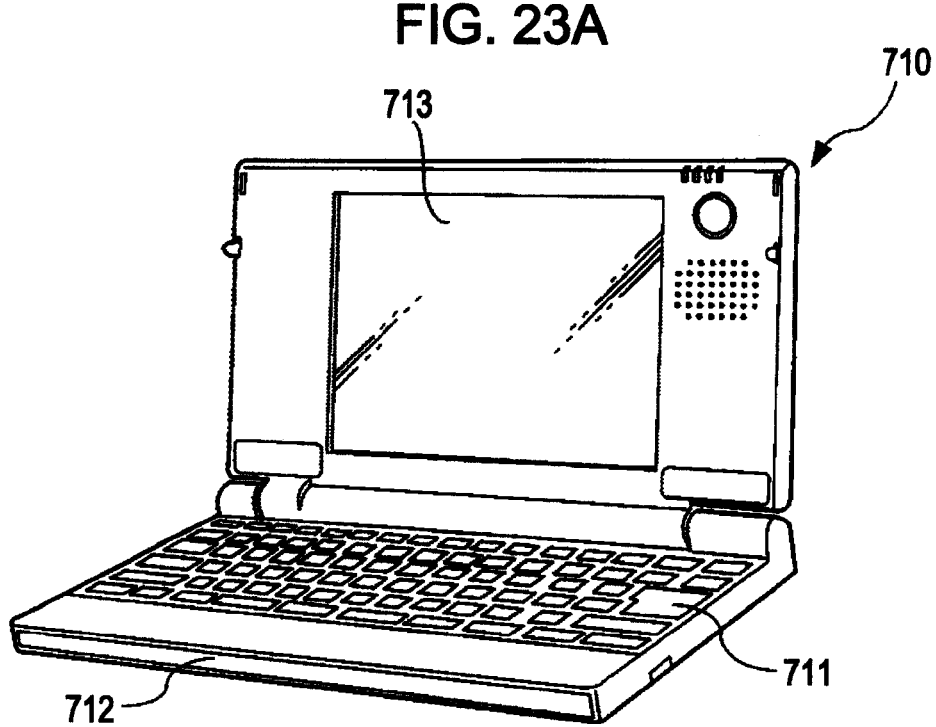
FIGS. 23A and 23B are perspective views illustrating specific examples of electronic apparatuses.

FIG. 23A is a perspective view illustrating a portable personal computer (so-called "notebook PC") 710 as an example of the electronic apparatus using the image display device 100 or 101. The personal computer 710 includes a main unit 712 having a keyboard 711 and a display unit 713 using the image display device 100 or 101.

Figure 23B:
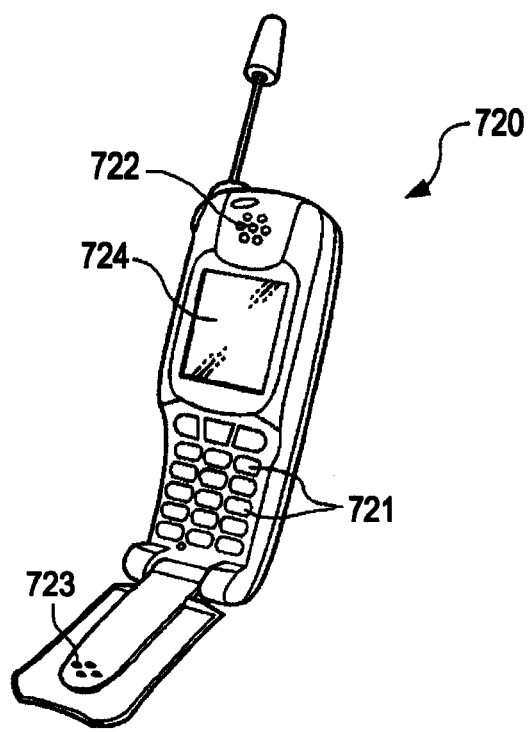

FIG. 23B is a perspective view illustrating a cellular telephone 720 as another example of the electronic apparatus using the image display device 100 or 101. The cellular telephone 720 includes a plurality of operation buttons 721, an earpiece 722, a mouthpiece 723, and a display unit 724 using the image display device 100 or 101.

The electronic apparatuses using the image display device 100 or 101 also include liquid crystal televisions, videophones, etc.

Other Embodiments

Although the foregoing embodiments have been discussed such that multiple colors (color region) include RGBC and R, YG, B, and EG, the invention is not limited such colors. One pixel may be formed of color regions of other four colors.

In this case, the four color regions include, within a visible light region (380 to 780 nm) where hue changes according to wavelength, a bluish hue color region (may also be referred to as a "first color region"), a reddish hue color region (may also be referred to as a "second color region"), and two hue color regions selected from among hues ranging from blue to yellow (may also be referred to as a "third color region" and a "fourth color region"). The word "-ish" is used because, for example, the bluish hue is not limited to pure blue and includes violet, blue green, etc. The reddish hue is not limited to red and includes orange. Each of the color regions may be formed by using a single color layer or by laminating a plurality of color layers of different hues. Although the color regions are described in terms of hue, hue is the color that can be set by appropriately changing the chroma and lightness.

The specific range of each hue is as follows:

the bluish hue color region ranges from violet to blue green, and more preferably ranges from indigo to blue;

the reddish hue color region ranges from orange to red;

one of the two color regions selected from among hues ranging from blue to yellow ranges from blue to green, and more preferably ranges from blue green to green; and the other color region selected from among hues ranging from blue to yellow ranges from green to orange, and more preferably ranges from green to yellow or from green to yellowish green.

Each of the color regions does not use the same hue. For example, when greenish hues are used in the two color regions selected from among hues ranging from blue to yellow, a green hue is used in one region, while a bluish hue or a yellowish green hue is used in the other region.

Accordingly, a wider range of colors can be reproduced, compared with known RGB color regions.

By way of another specific example, the color regions may be described in terms of the wavelength of light passing therethrough:

the bluish color region is a color region where the peak of the wavelength of light passing therethrough is within 415-500 nm, and more preferably within 435-485 nm;

the reddish color region is a color region where the peak of the wavelength of light passing therethrough is greater than or equal to 600 nm, and more preferably greater than or equal to 605 nm;

one of the two color regions selected from among hues ranging from blue to yellow is a color region where the peak of the wavelength of light passing therethrough is within 485-535 nm, and more preferably within 495-520 nm; and the other color region selected from among hues ranging from blue to yellow is a color region where the peak of the wavelength of light passing therethrough is within 500-590 nm, and more preferably within 510-585 nm or within 530-565 nm.

Those wavelengths are, in the case of transmission display, values obtained by allowing illumination light emitted from a lighting device to pass through color filters, and, in the case of reflection display, values obtained by allowing external light to be reflected.

By way of another specific example, the four color regions may be described in terms of the x, y chromaticity diagram:

the bluish color region is a color region where $x \leq 0.151$ and $y \leq 0.200$, more preferably $0.134 \leq x \leq 0.151$ and $0.034 \leq y \leq 0.200$;

the reddish color region is a color region where $0.520 \leq x$ and $y \leq 0.360$, more preferably $0.550 \leq x \leq 0.690$ and $0.210 \leq y \leq 0.360$;

one of the two color regions selected from among hues ranging from blue to yellow is a color region where $x \leq 0.200$ and $0.210 \leq y$, more preferably $0.080 \leq x \leq 0.200$ and $0.210 \leq y \leq 0.759$; and the other color region selected from among hues ranging from blue to yellow is a color region where $0.257 \leq x$ and $0.450 \leq y$, more preferably $0.257 \leq x \leq 0.520$ and $0.450 \leq y \leq 0.720$.

The x, y chromaticity diagram shows, in the case of transmission display, values obtained by allowing illumination light emitted from a lighting device to pass through color filters, and, in the case of reflection display, values obtained by allowing external light to be reflected.

When sub-pixels are provided with transmission regions and reflection regions, the four color regions are also applicable to the transmission regions and the reflection regions within the above-described ranges.

When the four color regions in this example are used, an LED, a fluorescent lamp, or an organic EL may be used as a backlight for RGB light sources. Alternatively, a white light source may be used. The white light source may be a source generated using a blue illuminator and an yttrium aluminum garnet (YAG) phosphors.

Preferably, the RGB light sources are as follows:

for B, the peak of the wavelength is within 435-485 nm;

for G, the peak of the wavelength is within 520-545 nm; and for R, the peak of the wavelength is within 610-650 nm.

By appropriately selecting the above-described color filters on the basis of the wavelengths of the RGB light sources, a wide range of colors can be reproduced. Alternatively, a light source where the wavelength has a plurality of peaks, such as at 450 nm and 565 nm, may be used.

Specifically, the four color regions may include:
color regions where the hues are red, blue, green, and cyan (blue green);
color regions where the hues are red, blue, green, and yellow;
color regions where the hues are red, blue, dark green, and yellow;
color regions where the hues are red, blue, emerald green, and yellow;
color regions where the hues are red, blue, dark green, and yellow green; and
color regions where the hues are red, blue green, dark green, and yellow green.

What is claimed is:

1. An image display device, comprising:
a plurality of display pixels that display an image, each display pixel including four sub-pixels that provide different colors;
the four sub-pixels including two edge sub-pixels disposed at opposite lateral edges of the display pixel and two interior sub-pixels disposed laterally between the two edge sub-pixels, such that the two edge sub-pixels have a smaller level of luminance, and an absolute value of a difference between a luminance added value, which is a value obtained by adding luminance levels of one of the two edge sub-pixels and an adjacent pixel, and a luminance added value, which is a value obtained by adding luminance levels of the other edge sub-pixel and an adjacent pixel, is reduced as compared to the absolute value of other possible configurations of the four sub-pixels, the luminance and the luminance added value being defined in a luminance and opponent-color space.

2. The image display device according to claim 1, the luminance and the luminance added value being defined based on a visual space characteristic in the luminance and opponent-color space.

3. The image display device according to claim 1, the four sub-pixels including red, green, blue, and cyan, the red sub-pixel being disposed adjacent the cyan sub-pixel, the green sub-pixel being disposed adjacent the red sub-pixel, and the blue sub-pixel being disposed adjacent the green sub-pixel.

4. An image display device, comprising:
a plurality of display pixels that display an image, each display pixel including at least four sub-pixels that provide different colors, the at least four sub-pixels defining an average level of luminance;
the at least four sub-pixels including two edge sub-pixels disposed at opposite lateral edges of the display pixel, the two edge sub-pixels having a level of luminance smaller than the average level of luminance of the at least four sub-pixels, the luminance and the luminance added value being defined in a luminance and opponent-color space.

5. The image display device according to claim 4, each display pixel including a center sub-pixel disposed between the two edge sub-pixels, the center sub-pixel having a luminance level that is larger than a luminance level of the other sub-pixels.

6. The image display device according to claim 4, the two edge sub-pixels having a smaller luminance level.

7. The image display device according to claim 4, each of the sub-pixels being located such that luminance is decreased from a center toward the edges of the display pixel.

8. The image display device according to claim 4, an absolute value of a difference between a luminance added value, which is a value obtained by adding luminance levels of a plurality of sub-pixels located at one side with respect to a center of the display pixel, and a luminance added value, which is a value obtained by adding luminance levels of a plurality of sub-pixels located at the other side with respect to the center of the display pixel, is reduced as compared to the absolute value of other possible configurations of the four sub-pixels.

9. A method for determining locations of sub-pixels of a display device that includes multiple display pixels, each display pixel including four of the sub-pixels, that provide different colors, the method comprising:
determining locations of two edge sub-pixels of the four sub-pixels at opposite lateral edges of the display pixel, the two edge sub-pixels having a smaller luminance level; and
determining locations of two central sub-pixels disposed between the two edge sub-pixels, such that an absolute value of a difference between a luminance added value, which is a value obtained by adding luminance levels of one of the two edge sub-pixels and an adjacent pixel, and a luminance added value, which is a value obtained by adding luminance levels of the other edge sub-pixel pixel and an adjacent pixel, is reduced as compared to the absolute value of other possible configurations of the four sub-pixels, the luminance and the luminance added value being defined in a luminance and opponent-color space.

10. A method of manufacturing a display that includes multiple display pixels, each of the display pixels including four sub-pixels, the method comprising:
displaying two edge sub-pixels at opposite lateral edges of each display pixel; and
displaying two interior sub-pixels of the four sub-pixels laterally between the two edge sub-pixels, such that the two edge sub-pixels have a smaller level of luminance, and an absolute value of a difference between a luminance added value, which is a value obtained by adding luminance levels of one of the two edge sub-pixels and an adjacent pixel, and a luminance added value, which is a value obtained by adding luminance levels of the other edge sub-pixel and an adjacent pixel, is reduced as compared to the absolute value of other possible configurations of the four sub-pixels, the luminance and the luminance added value being defined in a luminance and opponent-color space.

* * * * *